(12) United States Patent
Chong et al.

(10) Patent No.: US 11,645,934 B2
(45) Date of Patent: *May 9, 2023

(54) SYSTEMS AND METHODS FOR CUSTOMIZED LESSON CREATION AND APPLICATION

(71) Applicant: Neuron Fuel, Inc., Mountain View, CA (US)

(72) Inventors: Kelvin Voon-Kit Chong, Mountain View, CA (US); Srinivas A. Mandyam, Los Altos, CA (US); Vidya S. Mandyam, Los Altos, CA (US); Krishna Vedati, Los Altos, CA (US)

(73) Assignee: NEURON FUEL, INC., Los Altos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/479,611

(22) Filed: Sep. 20, 2021

(65) Prior Publication Data

US 2022/0005370 A1 Jan. 6, 2022

Related U.S. Application Data

(63) Continuation of application No. 16/663,148, filed on Oct. 24, 2019, now Pat. No. 11,158,202, which is a continuation of application No. 14/180,253, filed on Feb. 13, 2014, now Pat. No. 10,510,264.

(60) Provisional application No. 61/804,069, filed on Mar. 21, 2013.

(51) Int. Cl.
*G09B 5/12* (2006.01)

(52) U.S. Cl.
CPC ..................... *G09B 5/12* (2013.01)

(58) Field of Classification Search
CPC ....................................... G09B 5/12
See application file for complete search history.

(56) References Cited

U.S. PATENT DOCUMENTS

| 6,324,498 | B1* | 11/2001 | Wajda | G06F 8/34 703/27 |
| 7,152,229 | B2* | 12/2006 | Chong | G06F 8/10 717/146 |
| 7,370,315 | B1* | 5/2008 | Lovell | G06F 11/3664 717/109 |
| 7,962,890 | B2* | 6/2011 | Kratschmer | G09B 19/0053 717/102 |
| 9,612,826 | B2* | 4/2017 | Leupold | G06F 8/71 |
| 2007/0168946 | A1* | 7/2007 | Drissi | G06F 8/36 717/110 |
| 2008/0320438 | A1* | 12/2008 | Funto | G06F 8/33 717/106 |
| 2010/0050151 | A1* | 2/2010 | Balasubramanian | G06F 8/33 717/105 |

(Continued)

*Primary Examiner* — Eddy Saint-Vil
(74) *Attorney, Agent, or Firm* — Edlavitch Law PLLC

(57) ABSTRACT

A computer-implemented method according to various aspects of the present disclosure includes modifying a lesson module, by a computer system. The modifying the lesson module includes generating an activity. The activity includes a coding puzzle and a puzzle runner mode. The method also includes, in the puzzle runner mode, displaying an indication that the coding puzzle is solved after the coding puzzle is solved and displaying a code runtime area showing a step-by-step execution of manipulated code of the lesson module.

20 Claims, 42 Drawing Sheets

(56) References Cited

U.S. PATENT DOCUMENTS

| | | | | |
|---|---|---|---|---|
| 2010/0050154 A1* | 2/2010 | Balasubramanian | ..... | G06F 8/33 717/113 |
| 2013/0006609 A1* | 1/2013 | Dhoolia | ................ | G06F 40/253 704/E11.001 |
| 2013/0239090 A1* | 9/2013 | Hamlin | ..................... | G06F 8/34 717/123 |
| 2014/0113257 A1* | 4/2014 | Spiridonov | ............ | G09B 19/00 434/118 |
| 2014/0173563 A1* | 6/2014 | Dias | ......................... | G06F 8/74 717/123 |
| 2014/0359558 A1* | 12/2014 | Chamberlain | ............ | G06F 8/36 717/104 |
| 2015/0044642 A1* | 2/2015 | Resig | ................ | G09B 19/0053 717/113 |
| 2015/0347274 A1* | 12/2015 | Taylor | ................. | G06F 11/362 717/125 |
| 2016/0019800 A1* | 1/2016 | Rodmell | ................. | G09B 5/02 434/219 |

* cited by examiner

SYSTEMS AND METHODS FOR CUSTOMIZED LESSON CREATION AND APPLICATION

CROSS-REFERENCE TO RELATED APPLICATIONS

The present application claims priority to U.S. patent application Ser. No. 16/663,148, filed Oct. 24, 2019 and entitled "SYSTEMS AND METHODS FOR CUSTOMIZED LESSON CREATION AND APPLICATION", which claims priority to U.S. patent application Ser. No. 14/180,253, filed Feb. 13, 2014, now U.S. Pat. No. 10,510,264 issued on Dec. 17, 2019 and entitled "SYSTEMS AND METHODS FOR CUSTOMIZED LESSON CREATION AND APPLICATION", which claims priority to U.S. Prov. Pat. App. Ser. No. 61/804,069, filed Mar. 21, 2013 and entitled "SYSTEMS AND METHODS FOR GOAL-BASED PROGRAMMING INSTRUCTION", the disclosures of which are hereby incorporated herein by reference in their entirety.

Also, the present application is related to U.S. patent application Ser. No. 13/837,719, filed Mar. 15, 2013, now U.S. Pat. No. 9,595,205 issued on Mar. 14, 2017 and entitled "SYSTEMS AND METHODS FOR GOAL-BASED PROGRAMMING INSTRUCTION", which claims priority to Prov. U.S. Patent App. Ser. No. 61/738,799, filed Dec. 18, 2012 and entitled "PROGRAMMING LEARNING CENTER", the disclosures of which are hereby incorporated herein by reference in their entirety.

BACKGROUND

Computers are ubiquitous and used for business, education, recreation and so on. Familiarity with the principles of computer programming and experience in computer programming is a useful skill. While familiarity with commonly used programming languages may be beyond the competency of many younger children, even at a young age children can learn the basic principles of computer programming.

SUMMARY

Embodiments of the present disclosure may be used to efficiently teach various concepts (including concepts related to computer programming) to students of various age groups. Lessons can be customized for individual students based on, for example, the student's age, proficiency with a particular type of subject matter, and/or other criteria. A computer-implemented method according to various aspects of the present disclosure includes: retrieving, by a computer system, a lesson module from a database; receiving, by the computer system, information regarding a student; modifying the lesson module, by the computer system, based on the information regarding the student; and providing the lesson module to the student.

The present disclosure includes various methods, apparatuses (including computer systems) that perform such methods, and computer readable media containing instructions that, when executed by computing systems, cause the computing systems to perform such methods.

Other features will be apparent from the accompanying drawings and from the detailed description which follows.

BRIEF DESCRIPTION OF DRAWINGS

FIG. 6 and FIG. 7 are simplified diagrams illustrating operation of a graphics user interface used to generate lesson modules for a project designed to run within a learning center runtime in accordance with an implementation.

FIG. 11, FIG. 12 and FIG. 13 are simplified diagrams illustrating operation of a graphics user interface used to run lesson modules within a learning center runtime in accordance with an implementation.

FIGS. 27A-27F illustrate another example of providing a customized lesson plan based on an identified goal for the student.

DETAILED DESCRIPTION

Figure 1:
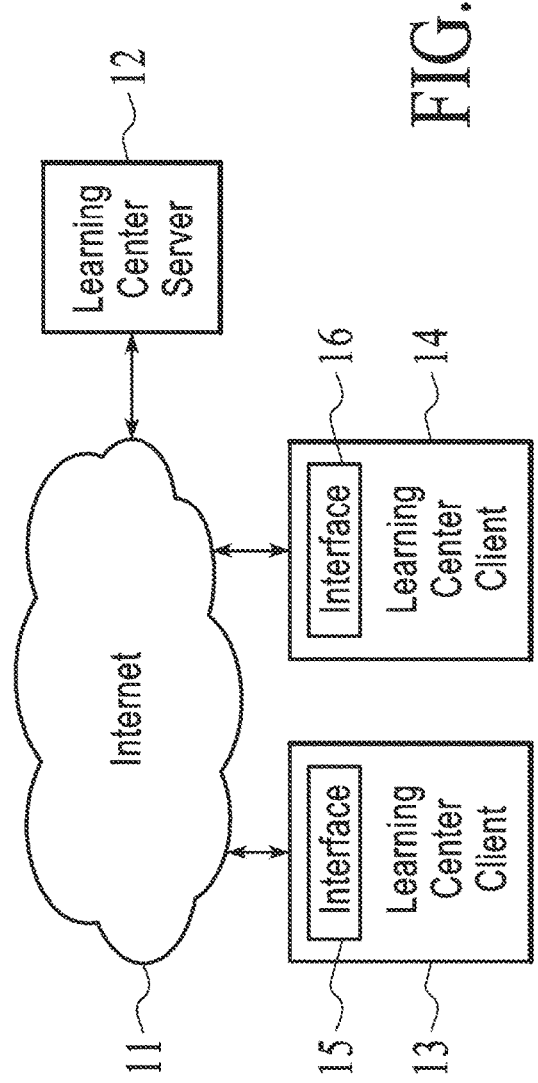
FIG. 1 is a simplified block diagram of a learning center that teaches basic programming principles in accordance with an implementation.

FIG. 1 is a simplified block diagram of a learning center that includes a learning center server 12 that can be accessed through the Internet 11 by multiple learning center clients. Multiple learning center clients are represented in FIG. 1 by a learning center client 13 and a learning center client 14. Learning center client may be implemented, for example, on a personal or laptop computer, a tablet computer, a smart phone, or any other computing device capable of accessing learning center server 12 through the internet 11. An interface 15 within learning center client 13 is, for example a web browser or specialty software that allows a user to interact with learning center 12 through internet 11. Likewise, an interface 16 within learning center client 14 is, for example a web browser or specialty software, such as an app, that allows a user to interact with learning center 12 through internet 11.

For example, the learning center integrates social learning and unique game mechanics with a guided curriculum to deliver a highly engaging and rewarding experience to children of all ages. The learning center allows children to perform creative activities such as write digital storybooks and scrapbooks, build video games, animate their favorite characters and share these with friends and family.

Figure 2:
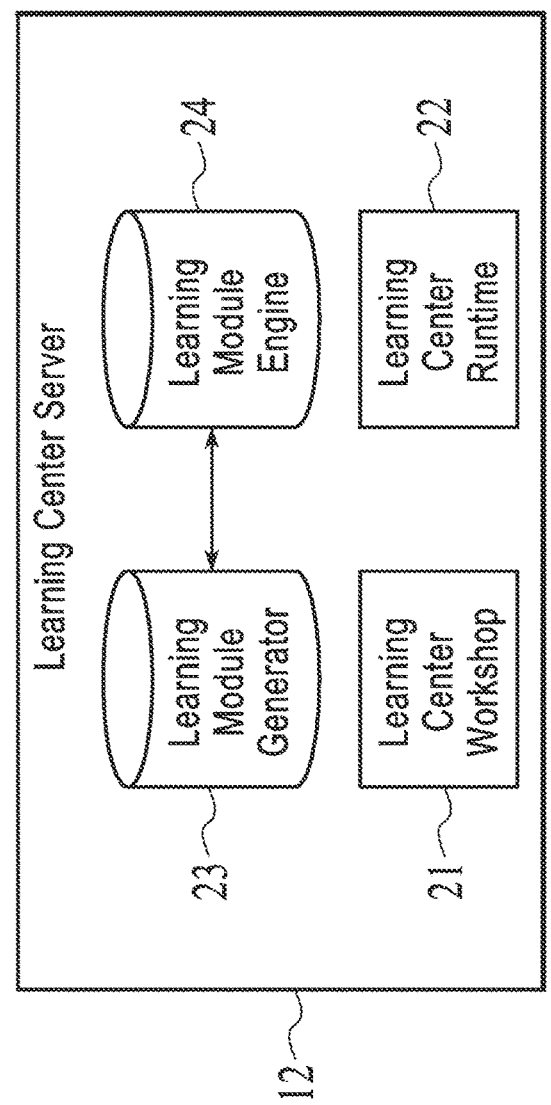
FIG. 2 is a simplified block diagram of a learning center server of the learning center shown in FIG. 1 in accordance with an implementation.

FIG. 2 is a simplified block diagram showing that learning center server 12 includes a learning center workshop 21, a learning center runtime 22, a learning module generator 23 and a learning module engine 24.

Learning center workshop 21 allows a user on a learning center client to build learning center programs visually using the interface for the learning center client. Learning center runtime 22 allows a user on a learning center client to run learning center programs.

Learning module generator 23 allows a user on a learning center client to generate learning modules from learning center programs. Learning module engine 24 allows a user on the learning center client to run learning modules and guides the user to build a learning center program. The learning module engine validates all known triggers and keeps parameters within a known range.

Table 1 below, sets out an example of a language specification for the learning center.

TABLE 1

```
<scripts> ::= <script> | <script> <scripts>
<script> ::= <entry-block> <blocks>
<blocks> ::= {empty} | <exit-block> | <inline-block> <blocks>
<inline-block> := <container-block> | <block>
<entry-block> ::= <label>
<exit-block> ::= <label>
<block> ::= <label>
<container-block> ::= <label> <containers>
<containers> ::= <container> | <container> <containers>
<container> ::= "{" <blocks> "}"
<label> ::= {string} <params>
<params> ::= {empty} | <param> <params>
<param> ::= {string} | {number} | {boolean} | <label-block>
<label-block> ::= {string} <params>
```

Table 2 below, sets out an example of language blocks for the learning center.

TABLE 2

```
CONTROL
on start
when {choice:keys} pressed
when actor clicked broadcast
{events} broadcast {events}
and wait
send message {events} to
{actor} with {string}
send message {events} to
{actor} with {string} and wait
received value
received source
when I receive {events}
clone startup
wait {number:1} secs
forever
repeat {number:10}
create clone of {actor}
name of last cloned actor
delete this clone
forever if {boolean}
if {boolean}
if {boolean} else wait
until {boolean} repeat
until {boolean} stop
{choice:stop}
stop script
stop all
MOTION
move {number:10} steps turn
CW {angle:15} degrees turn
CCW {angle:15} degrees
point in direction {angle:90} degrees
point towards {where}
go to x: {number:0} y: {number:0}`
blockMotionGoTowards
glide {number:1} secs to x:
{number:0} y: {number:0}
```

TABLE 2-continued change x by {number:10}`
set x to {number:0} change y
by {number:10}` set y to
{number:0}
if on edge, bounce x position
y position direction
LOOKS
switch to costume {costumes}
next costume costume

set label to {string:Hello}
say {string:Hello} for {number:2} secs say
{string:Hello}
think {string:Hmm} for {number:2} secs think
{string:Hmm}
change {choice:effect} effect by {number:25}
set {choice:effect} effect to {number:0}
clear graphic effects
change size by {number:10} set
size to {number:100}% size #
show hide
go to front
go to back
go back {number:1} layers
go forward {number:1} layers switch
to background {costumes} next
background
background #
SENSING
touching {where}?
touching color {color}?
color {color} is touching {color}?
ask {string:What is your name} and wait
answer
mouse x mouse y
mouse down?
key {choice:keys} pressed?
distance to {whereall}?
reset timer timer
{choice:spriteprop} of {whereall}
name of actor {number}
# of actors
loudness loud?
sensor {string:button pressed}?
sensor {string:button pressed}?
{choice:datetime} of date/time
screen left
screen right screen
top screen bottom
SOUND
play sound {sounds}
play sound {sounds} until done stop
all sounds
play drum {choice:instrument} for {number:0.2} beats rest
for {number:0.2} beats
play note {number:60} for {number:0.5} beats set
instrument to {choice:instrument}
change volume by {number:−10} set
volume to {number:100}% volume
change tempo by {number:20} set
tempo to {number:60} bpm tempo
OPERATOR
{number} + {number}
{number} − {number}
{number} * {number}
{number} / {number}
pick random {number:1} to {number:10}
{string} < {string}
{string} = {string}
{string} > {string}
{boolean} and {boolean}
{boolean} or {boolean}
not {boolean}
join {string:hello} {string:world} letter
{number:1} of {any:world} length of
{string:world}
{number} mod {number}
round {number}
{choice:math} of {number:10}
{choice:constants}

TABLE 2-continued

PEN
clear
pen up
set pen color to {color}
change pen color by {number:10}
set pen color to {number:0}
change pen shade by {number:10} set pen
shade to {number:50} change pen size by
{number:1}
set pen size to {number:1}
stamp
set font to {choice:fontstyle} {choice:fontsize} {choice:font}
draw text {string}
when drawing actor
redraw actor
set fill color to {color}
no fill
draw bezier at x1:{number:0} y1:{number:0} to x2:{number:0} y2:{number:0} with
control points cx1:{number:0} cy1:{number:0} and cx2:{number:0}
cy2:{number:0}`
draw point at x:{number:0} y:{number:0}
draw line from x1:{number:0} y1:{number:0} to x2:{number:0} y2:{number:0}
draw rectangle at x:{number:0} y:{number:0} with width:{number:0}
height:{number:0}
draw triangle with points x1:{number:0} y1:{number:0} x2:{number:0}
y2:{number:0} x3:{number:0} y3:{number:0}
draw ellipse at x:{number:0} y:{number:0} with width:{number:0}
height:{number:0}
draw text {string} at x:{number:0} y:{number:0} draw rectangle with
width:{number:0} height:{number0}`
draw ellipse with width:{number:0} height:{number:0}
PHYSICS
when actor collides
collided with {where}? apply
force {number:0} apply
impulse {number:0}
apply force {number:0} at {number:0}
degrees
apply impulse {number:0} at {number:0}
degrees
apply horizontal {number:0} and vertical
{number:0} force
apply horizontal {number:0} and vertical
{number:0} impulse apply
torque {number:0} set static
{boolean}
set shape to {choice:geometry}
set density to {number:10}
set friction to {number:0.5}
set restitution to {number:0.2}
set angular damping to {number:0}
set angular velocity to {number:0}
set linear damping to {number:0}
set linear velocity to {number:0} by {number:0}
density friction
restitution angular
velocity inertia
is awake?
x linear velocity y
linear velocity
set gravity to {number:0} by {number:10}
start physics stop
physics
VARIABLES
set {properties} of {actor} to {string:0}
property {properties} of {actor}
set {variables} to {string:0}
change {variables} by {number:1}
show variable {variables}
hide variable {variables}
LISTS
add {string:thing} to {lists}
delete {choice:lastall} of {lists}
insert {string:thing} at {choice:lastany} of {lists}
replace item {choice:lastany} of {lists} with {string:thing}
item {choice:lastany} of {lists}
length of {lists}
{lists} contains {string:thing}

A user from a learning center client accesses learning center workshop 21 through an interface. For example, the interface is a web browser or a dedicated app located on a computing device such as a personal computer or a tablet. When learning is launched, a user can build a project, which is essentially a computer program. Learning center workshop 21 allows a user to construct a project (computer program) and save it. The computer program can be run using learning center runtime 22.

Upon entering learning center workshop 21, a user can elect to build a new computer program from scratch or open an existing computer program.

To build a computer program from scratch, the user utilizes blocks of programming instructions represented visually as building blocks within learning center workshop 21. The tools provided within learning center workshop 21 allow a user to create a scene that includes a background, main objects and actors. Learning center workshop 21 allows a user to add computer program logic to the actors and the background. The user acts by dragging and dropping visual blocks into code areas. The visual blocks snap into place to form logic sequences.

Learning center workshop 21 saves the computer program and all its assets as the computer program is being built. For example, learning center workshop 21 saves the computer program in a persistent format so that the computer program can be loaded later. This can be done, for example in a Javascript Object Notation (JSON) format, Extensible Markup Language (XML) or some other structured syntax. The computer program file may be stored on learning center server 12 and, in addition or instead of, stored on the learning center client used by the user.

Figure 3:
FIG. 3 is a simplified diagram illustrating operation of a graphics user interface used to program a project that runs within a learning center runtime for the learning center shown in FIG. 1 in accordance with an implementation.

FIG. 3 shows a user interface 90 for learning center workshop 21. An area 90 shows a stage area where selected stages and actors are displayed. An actor area 92 shows available actors that can be selected by a user. A horizontal bar 93 includes a code tab 94 and a properties tab 95. When code tab 94 is selected available code blocks are shown displayed and available in a code block area 97. The code blocks can be dragged and dropped by a user into work area 96 to form a computer program (project).

The flying bird project illustrated within interface 90 shown in FIG. 3 can be stored in file using language blocks for the learning center. For example, Table 3 below sets out contents for such a file.

TABLE 3

```
{"name":"Tropical Bird","description":"Help the tropical bird fly out to sea.
   ","background":
{"scaleType":"stretch","width":-.-600,"height":-.-400,
   "canvasWidth":480,"canvasHeight":320,"currentBackground":
1,"scripts":[ ],"backgrounds":[{"name":"beach","img":"/assets/Images/
   Backgrounds/Outdoor/
4fcf9088692f886b16000e53.jpg","cx":512,"cy":341.5}],"sounds":[ ],"
   documentation":
{"description":"","inboundEvents":[ ],"outboundEvents":[ ],"properFes ":[ ]}},
   "sprites":[{"label":"Parrot","scripts":
[{"func":"registerFlagTrigger","id":6,"values":[ ],"containers":[ ],"next
   ":{"func":"blockControlForever","id":7,"values":
   ]"containers":[{"func":"blockLooksNextCostume","id":8,"values":
[ ], "containers":[ ],"next":
   {"func":"blockControlWait","id":9,"values":[{"type":"number","value
   ":".2"}],"containers":[ ],"next":
{"func":"blockMotionMove","id":11,"values":[{"type":"number",
   "value":"6"}],"containers":[ ],"next":
{"func":"blockMotionBounceOnEdge","id":13,"values":[ ],"containers ":[
   ]}}}}]},"x":82,"y":43}],"costumes":
[{"name":"Bird
1","img":"/assets/user/50312c85692f88c95000006b.png"},{"name":"Bird
   2","img":"/assets/user/
50312caa692f88ba5000007f.png","cx":80.5,"cy":56.5},{"name":"Bird
   3","img":"/assets/user/
50312cb1692f88d550000075.png","cx":80.5,"cy":56.5},{"name":"Bird
   4","img":"/assets/user/
   50312cb6692f88e050000078.png","cx":80.5,"cy":56.5}],"currentCost
   ume":4,"sounds":[ ],"scale":
1.1090254493487,"x":142.77345132738003,"y":100.08159722222,"rotation":180,
   - "rota teLock":
1,"isHidden":false,"volume":100,"locked":false,"physics":
   {"isStatic":false,"isActive":true,"geometry":"circular","density":1,"frict- ion":0.5,
   "restitution":0.2},"varDefaults":
{ },"variables":{"auto start":true,"distance":6},"lists":
{ },"classname":"Parrot","id":"50369e94692f885c770000c2","documentation":
{"description":"Parrot flies around and
   screeches.","inboundEvents":[{"name":"[registerFlagTrigger]","de
   scription":"","visible":true}],"outboundEvents":[ ],"properties":[{"name":"auto
start","description":"If auto start=true, animate on start","visible":true},
{"name":"distance","description":"Speed of
   movement","visible":true}]}}],"models":[ ],"variables":{ },"lists":
{ },"physics":{"enabled":false,"gravity":{"x":0,"y":10}}}
```

A user can use learning center runtime 22, shown in FIG. 1, to run a computer program built in learning center workshop 21. For example, the interface by which the user accesses learning center runtime 22 is a web browser on a computing device such as a personal computer or a tablet or is an app running on a mobile phone or tablet computer. For example, the user may iterate through refining a computer program by making modifications such as adding and removing logic, changing the code blocks used and testing the computer program to see how the computer program runs.

Figure 4:
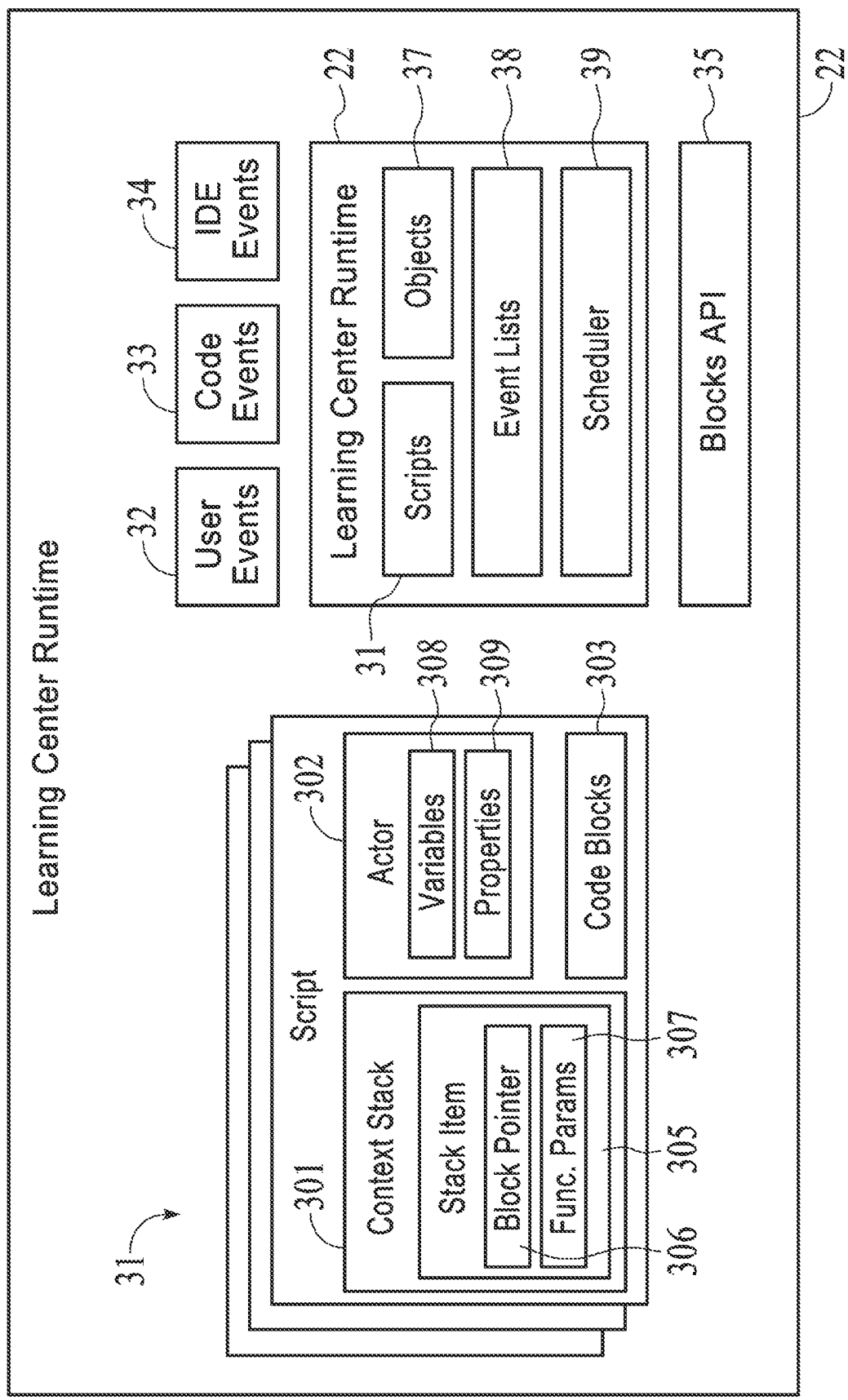
FIG. 4 is a simplified block of a learning center runtime for the learning center shown in FIG. 1 in accordance with an implementation.

FIG. 4 shows a simplified block diagram for learning center runtime 22. Learning center runtime 22 is shown to include scripts 31, objects 37, event lists 38 and a scheduler 39. User events 32, code events 33 and integrated development events (IDE) 34 are used to invoke learning center runtime 22. Learning center runtime 22 calls application programming interface (API) blocks. FIG. 4 also shows a script containing, for example, a context stack 301, an actor description 302 and code blocks 303. The context stack includes stack items represented by a stack item 305 having a block pointer 306 and function parameters 307. Actor description 302 includes variables 308 and properties 309.

Figure 20:
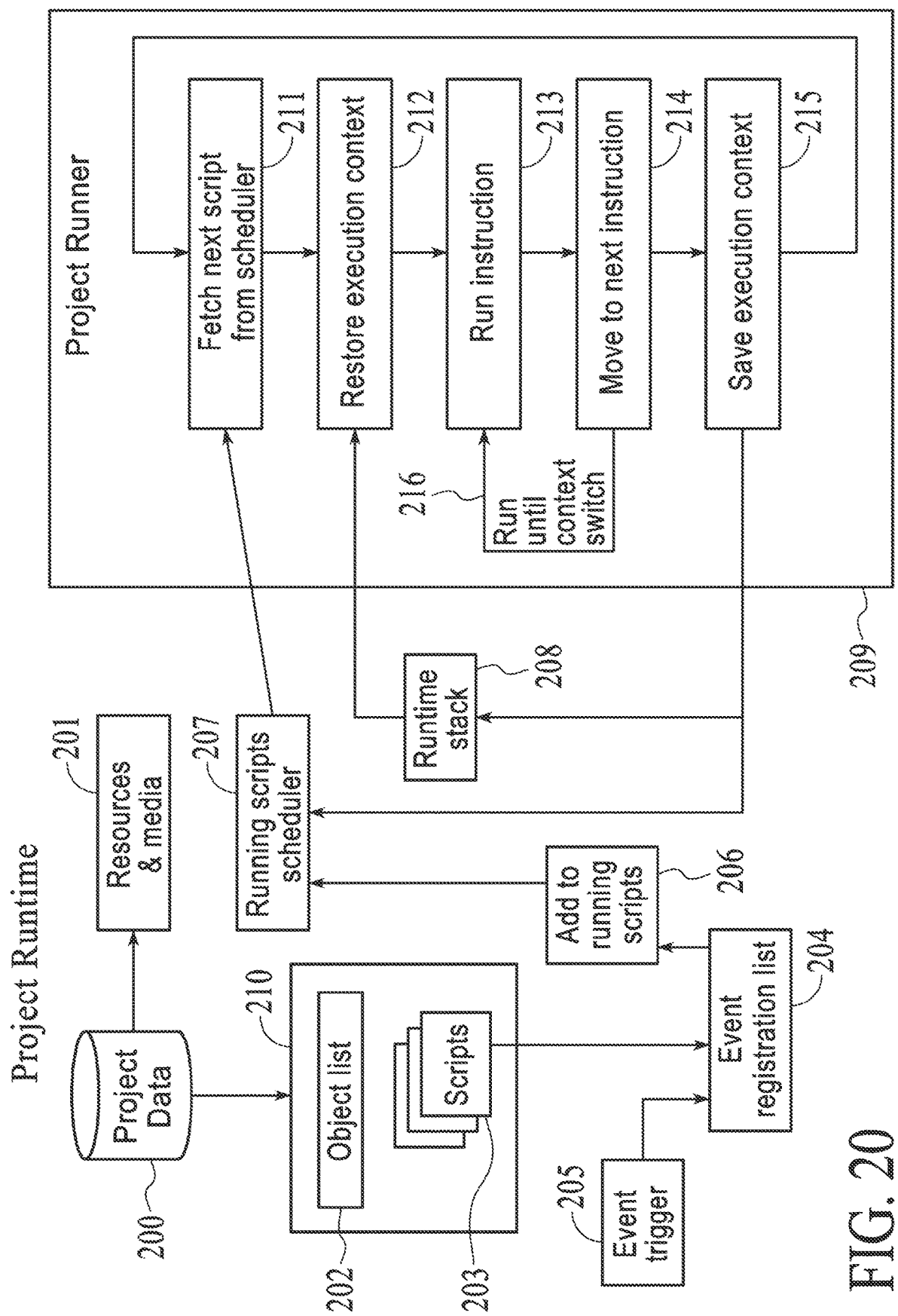
FIG. 20 is a block diagram illustrating a project runtime in accordance with an implementation.

FIG. 20 is a block diagram illustrating implementation of a project runtime. Project data 200 can utilize resources and media 201. When a project is loaded, the project is parsed and added to object lists for each object (actor). Each object entry in the object list maintains a reference to the scripts associated with an object (actor). The project resource and media pointers are referenced by various instructions in the scripts. A loaded project 210 includes, for example, an object list 202 and scripts 203.

Scripts are registered against specific event types (e.g. program start, key event, mouse event). As illustrated by arrow 206, an external trigger event 205 results in a script 203 that has been registered in event registrations list 204 being added to a scheduler 207, which is a list of running scripts. Run loop 209 picks up a script to execute from scheduler 207. The scripts are executed in parallel by scheduler 207. Scheduler 207 determines how to select the next script (e.g. round robin, priority queue, time queue). The execution context is restored from a runtime stack 208 specific to that script. The instruction is executed as a non-blocking process.

For example, within a project runner 209, in a block 211 a next script is fetched from the scheduler. In a block 212, execution context is restored for the fetched script. In a block 213 an instruction is run. In a block 214, context is moved to a next instruction. As illustrated by arrow 216, block 213 and block 214 are continued until there is a context switch. A context switches occurs, for example, when the script has executed a yield instruction, a time slice expires, user interrupts execution, etc. When there is a context switch, in a block 215, execution context is saved and context is returned to block 211. If the end of the script has not been reached, the script is retained in the scheduler 207. If the end of the script has been reached, the script is removed from runtime stack 208 and the list of running scripts within scheduler 207.

For example, for learning center runtime 22, scripts 31 are written using Javascript. Javascript is a single-threaded environment in a web browser. A sequence of instructions is executed sequentially until the sequence relinquishes control back to the web browser before other instruction sequences will execute. As a result, multiple Javascript sequences cannot run at the same time.

For example, the learning center represents instructions as blocks so that each block represents one instruction that executes atomically, that is without being interrupted by another block. Each block must relinquish control back to the web browser in a timely fashion. Scheduler 39, therefore, thins a context for each script sequence. Scheduler 39 selects a script sequence, switches to that script's context and executes a predetermined number of blocks for each turn. Scheduler 39 then selects the next script sequence and repeats until all scheduled scripts have run their turn. At this point scheduler 39 relinquishes control back to the web browser. The web browser starts up another time slice where another script sequence is executed. As a result, multiple scripts 31 can be run at the same time.

Figure 5:
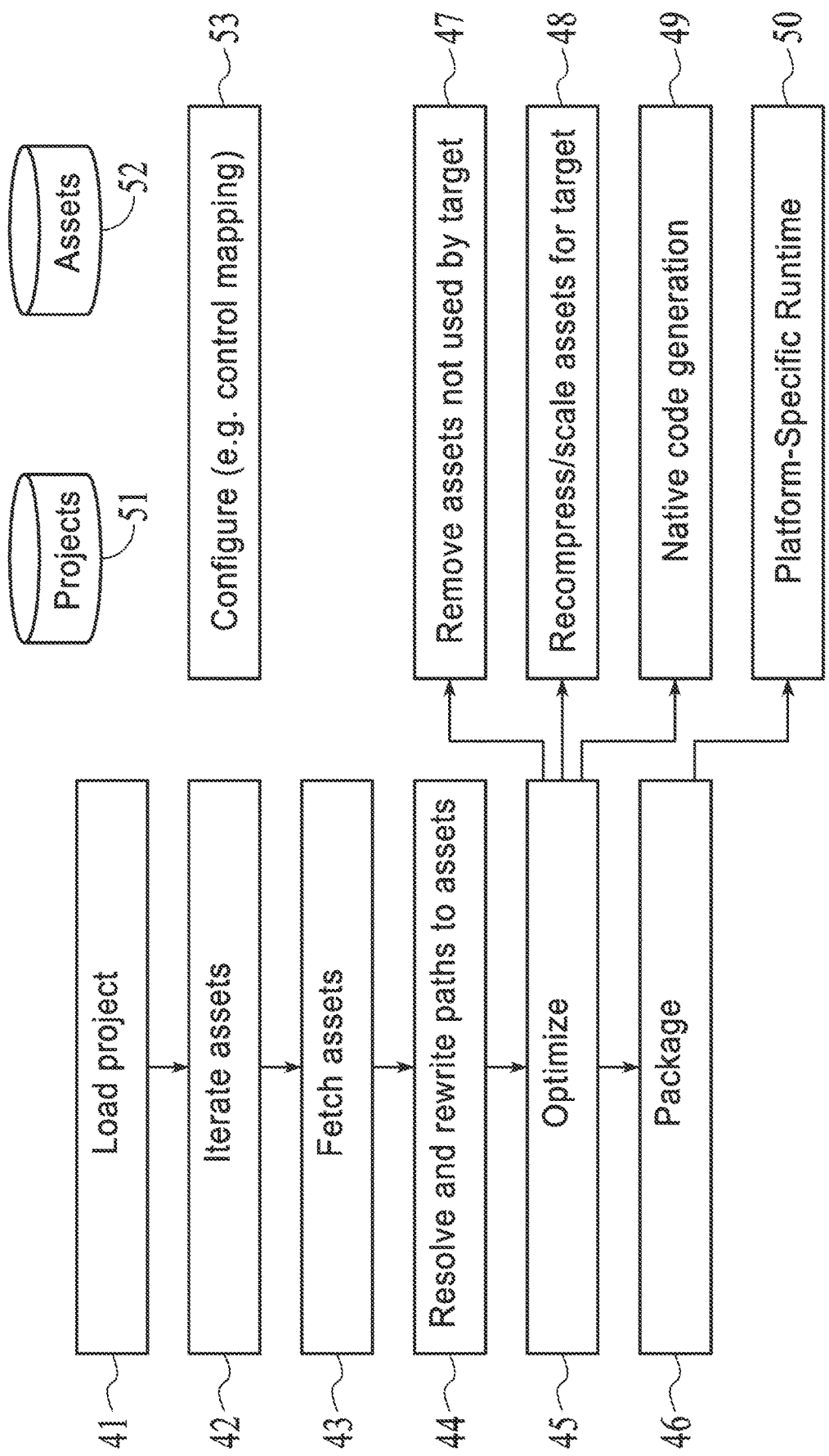
FIG. 5 is a simplified flowchart that describes publication to runtime of a project designed to run within a learning center runtime for the learning center shown in FIG. 1 in accordance with an implementation.

FIG. 5 is a simplified flowchart illustrating learning center workshop 21 publishing a project (learning center program) to learning center runtime 22. As illustrated in FIG. 5, storage for projects 51 and storage for assets 52 are accessed to obtain a project and associated assets. Also configuration (such as user input control mapping, display scaling, desired screen orientation) information 53 is also accessed.

In a block 41, a project is loaded. In a block 42, assets are iterated. In a block 43, assets are fetched from assets storage 52. In a block 44, paths to assets are resolved and rewritten. In a block 45, optimization is performed. For example, the optimization can include removing assets not used by a target, as shown in a block 47. Likewise, the optimization can include recompressing and/or scaling assets for the target, as shown in a block 48. Also, the optimization can include native code generation, as shown in a block 49.

In a block 46 the project is packaged based on a platform specific runtime, as illustrated by a block 50.

Once a computer program (project) is complete, a user can choose to create a lesson module based on the computer program. For example, the user can choose a create lesson option in learning center workshop 21 to activate learning module generator 23.

Learning module generator 23 includes a parser that parses through the computer program that the user built and generates a task list for the lesson module. For example, learning module generator 23 reads through the computer program, identifies all objects and identifies actions to recreate the computer program. Then, different kinds of steps are generated based on the results of parsing the computer program. A list of ordered steps are generated where complex tasks are outlined and grouped together.

Figure 6:
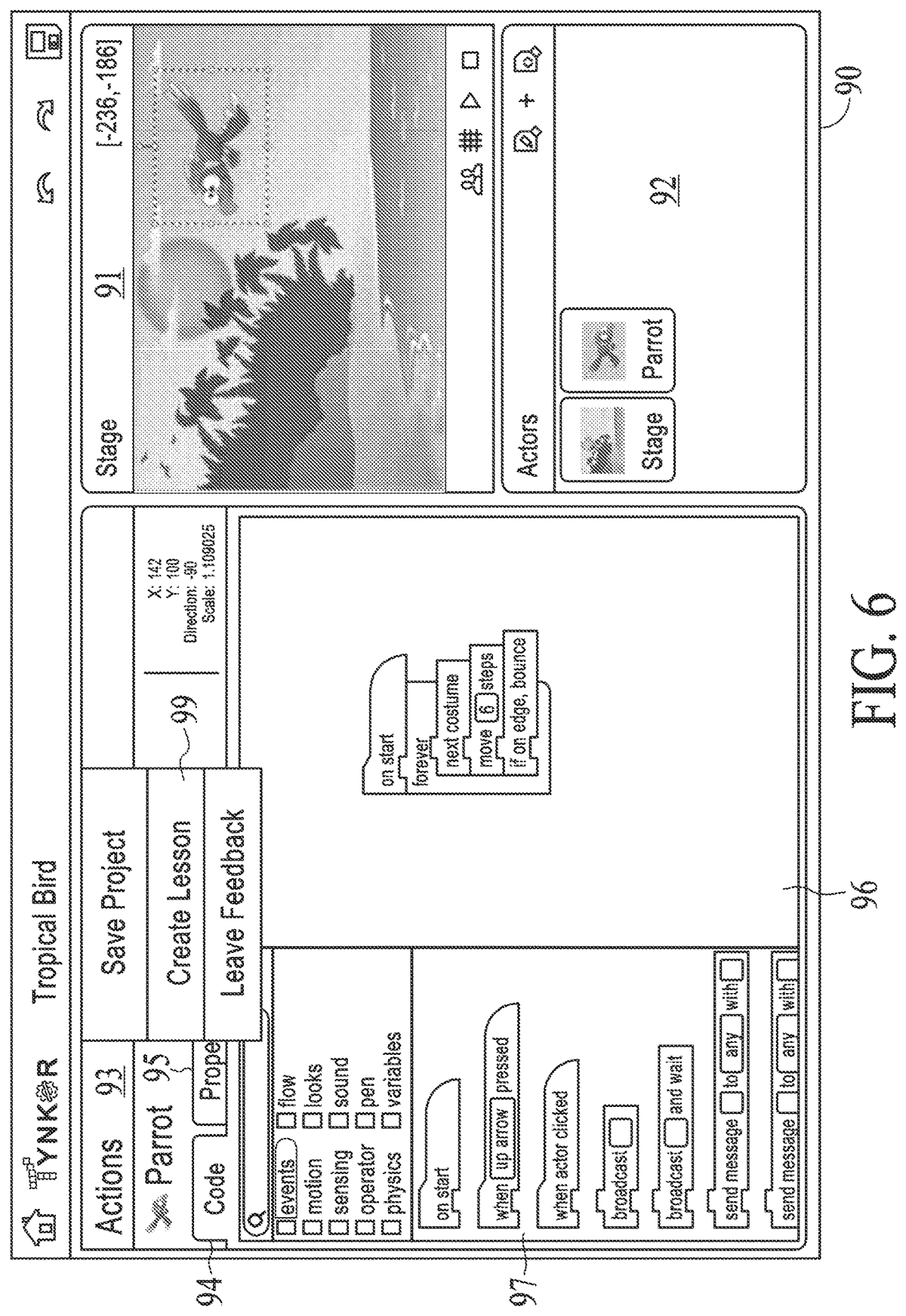

As shown in FIG. 6, a drop down menu 99 accessed by a user from the "Tropical Bird" label on the menu bar of user interface 90 includes a selection to "Create Lesson". As a result, learning module generator 23 (shown in FIG. 2) is invoked and generates a lesson module from the computer program (shown in Table 3) for the flying bird project.

Figure 7:
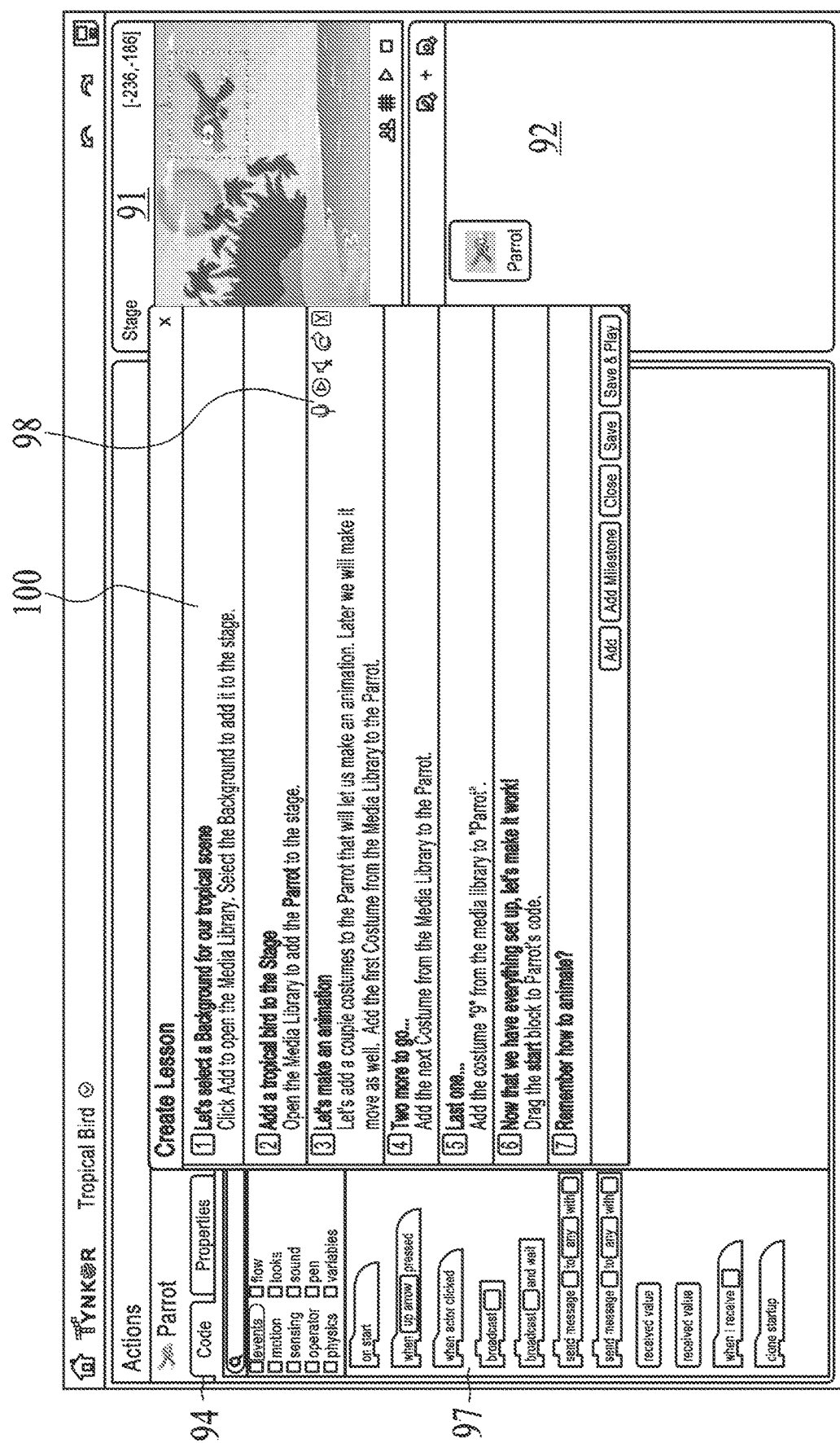

FIG. 7 shows in box 100, appearing as part of interface 90, lesson steps. As discussed above, the author of the lesson module can modify the lesson module generated by changing the order of steps, adding voice over by selecting a voice over button 98, and so on.

Figure 8:
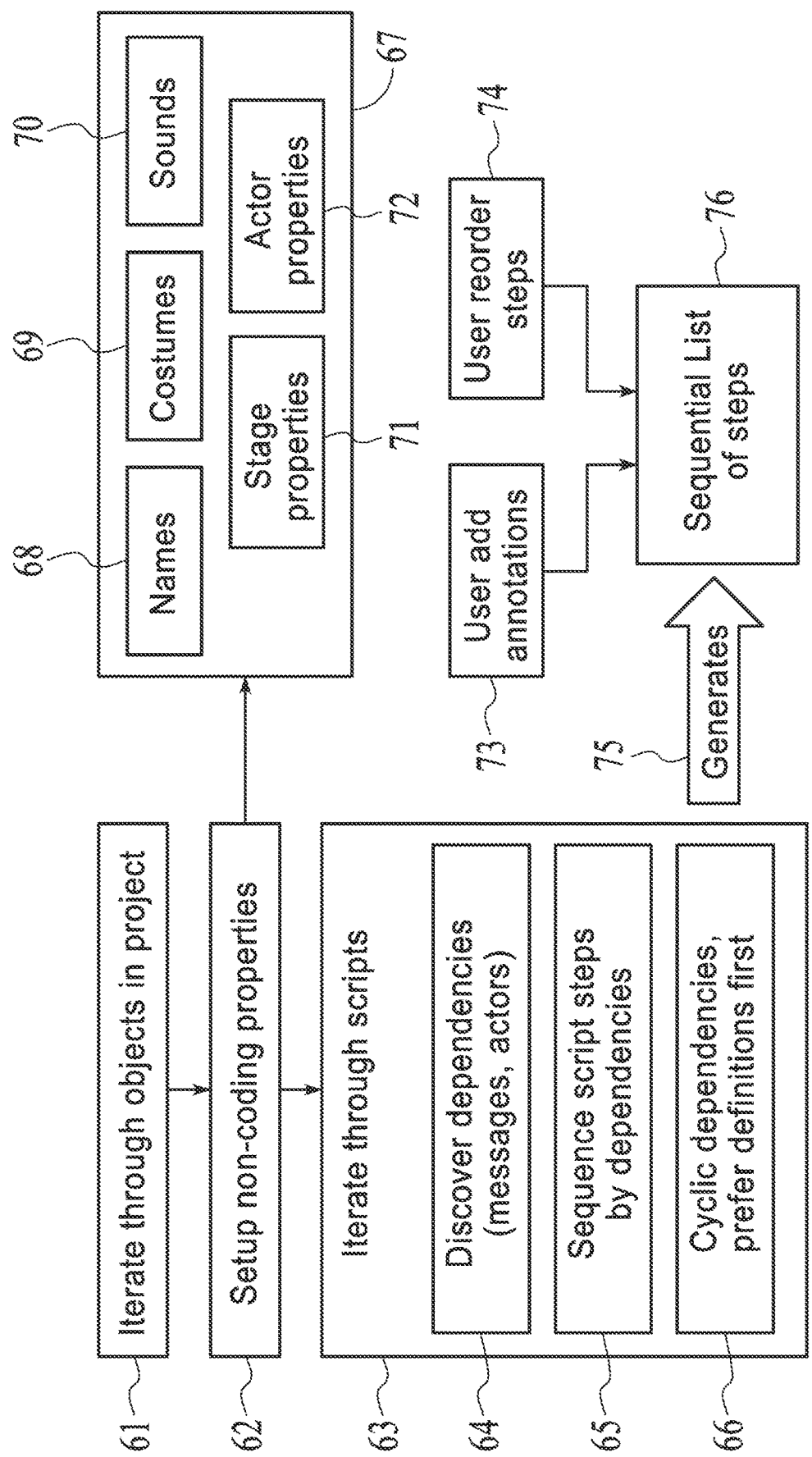
FIG. 8 and FIG. 9 are simplified flowcharts that describe generation of lesson modules for a project designed to run within a learning center runtime in accordance with an implementation.

FIG. 8 is a simplified flowchart showing how learning module generator 23 generates a lesson module from a computer program. In a block 61, learning module generator 23 iterates through objects in the project (computer program). In a block 62, learning module generator 23 sets up non-coding properties 67. Non-coding properties 67 include, for example, names 68, costumes 69, sounds 70, stage properties 71 and actor properties 72.

In a block 63, learning module generator 23 iterates through scripts. This is done, for example, to discover dependencies between messages and actors, etc., as shown in block 64, to sequence script steps by dependencies, as shown in block 65, and to determine cyclic dependencies and establish a preference for definitions, as shown in block 66.

As represented by arrow 75, learning module generator 23 then generates a sequential list of steps 76. As illustrated by block 73, a user can add notations to sequential list of steps 76. As illustrated by block 74, a user can reorder steps within sequential list of steps 76.

Once the list or ordered steps are generated, the user can customize the lesson module. For example, the user can change the order of steps so that the reconstruction of the steps of computer program occurs in a different order than the steps as they originally appeared in the in the computer program when authored. Learning module generator 23 is used to assure that dependencies between steps are accounted for.

For example, learning module generator 23 allows a user to add voice over in each step. The voice over is played back while the lesson module is being run within learning center runtime 22. Similarly, learning module generator 23 allows a user to add video in any step. The video is played back while the lesson module is being run within learning center runtime 22. Also, learning module generator 23 allows additional steps to be added in between the steps for the lesson module originally generated by learning module generator 23. For example, text for the lesson module can be customized. When the user has completed modifications, learning module generator 23 saves the workflow as a lesson module.

Figure 9:
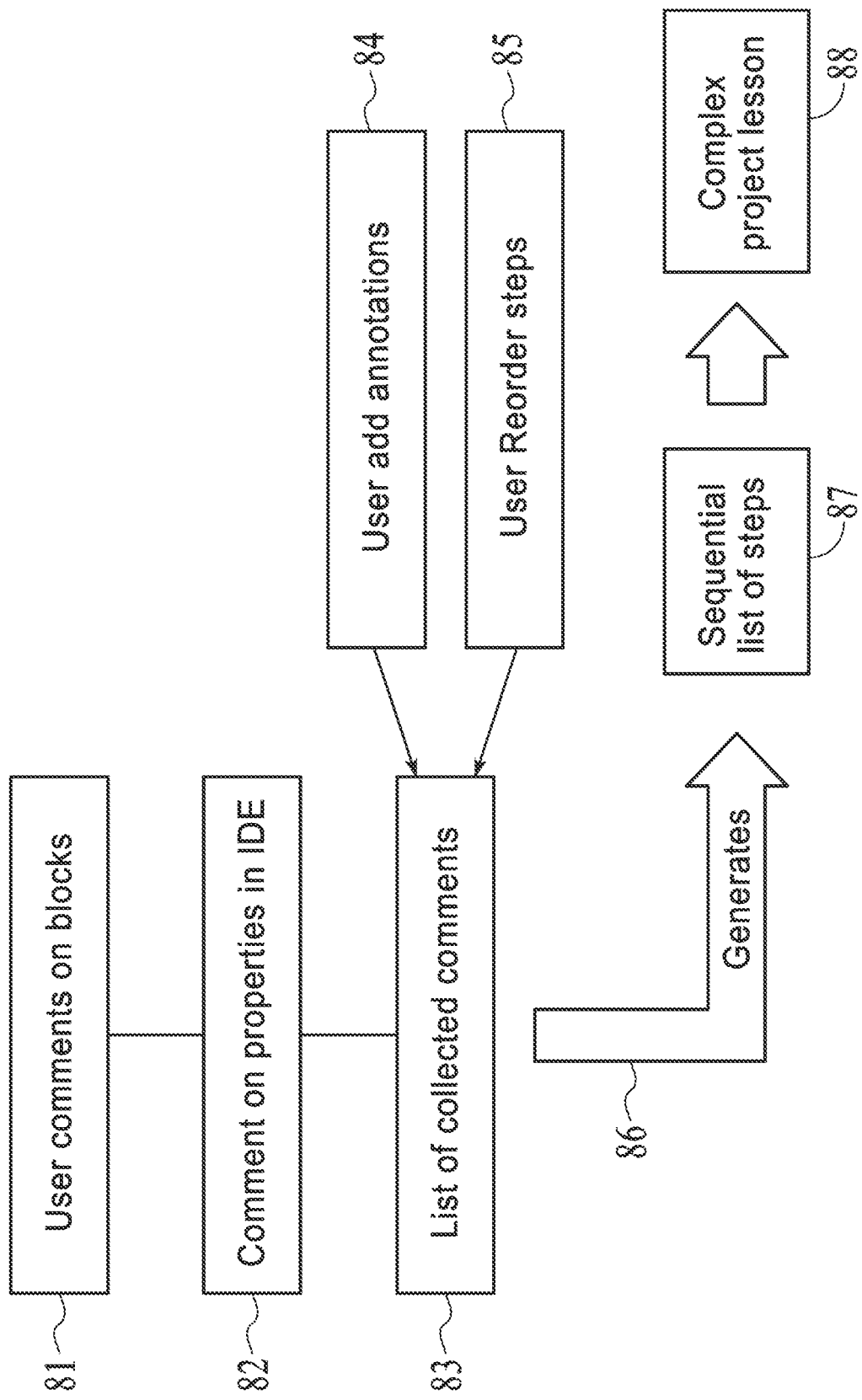

FIG. 9 illustrates an alternative method for generating a lesson module from a computer program. In a block 81, a user comments on blocks of programming code. In a block 82, the user comments on program properties in integrated development environment (IDE). Learning module generator 23 stores a list of collected comments 83 that includes additional user added annotations 84 and reordered steps 85. From list of collected comments 83, learning module generator 23 generates, as illustrated by an arrow 86 a new sequential list of steps 87 used to produce a complex project lesson module 88.

Table 4 shows an example of computer program for a complex project lesson produced based on language blocks from the flying bird project set out in Table 3:

TABLE 4

{"width":-600,"height":-400,"bgtype":"stretch","canvasWidth":480,"canvasHe- ight":320,"name":"Tropical Bird","description":"Help the tropical bird fly out to sea.", resources":[{"count":1,"name":"beach.jpg","img":"\/assets\/Images\/ Backgrounds\/Outdoor\/4fcf9088692f886b16000e53.jpg"},{"count":1,"name":" Bird 1.png","img":"\/assets\/user\/50312c85692f88c95000006b.png"}, {"count":1,"name":"Bird 2.png","img":"\/assets\/user\/ 50312caa692f88ba5000007f.png"},{"count":1,"name":"Bird 3.png","img":"\/assets\/user\/50312cb1692f88d550000075.png"},{"count":1 ,"name":"Bird 4.png","img": "\/assets\/user\/50312cb6692f88e050000078.png"}],"blocks": [{"count":1,"func":"registerFlagTrigger"},{"count":1,"func":"blockControlF- orever "},{"count":1,"func":"blockLooksNextCostume"},{"count":1,"func":"blockCon trolWait"},{"count":1,"func":"blockMotionMove"},{"count":1,"func": "blockMotionBounceOnEdge"}],"notes":[{"block":null,"spriteName":null, "resource":"\/assets\/Images\/Backgrounds\/Outdoor\/4fcf9088692f886b16 000e53.jpg","resourceName":"beach","attached":null,"id":1,"text":" Let's select a Background for our tropical scene<\/h2>Click Add to open the Media Libary. Select the Background to add it to the stage. <\/p><\/div>\n"},{"block":null,"spriteName":"Parrot","resourc- e":"\/assets\/us er\/50312c85692f88c95000006b.png","resourceName":"Bird 1","attached":null,"properFes":{"x":442.77345132738,"y":99.91840277778, "rotation":180,"rotateLock":1,"scale":1.1090254493487},"id":2,"text":" Add a tropical bird to the Stge<\/h2>Open the Media Library to add the Parrot<\/em> to the Stage.<\/p><\/div>\n"},{"block":null,"spriteName": "Parrot","resource":"\/assets\/user\/50312caa692f88ba5000007f.png", "resourceName":"Bird 2","attached":null,"id":3,"text":" Let's make an animation<\/h2> Let's add a couple costumes to the Parrot that will let us make an animation. Later we will make it move as well. Add the first Costume from the Media Library to the Parrot<\/p><\/div>\n"}, {"block":null,"spriteName":"Parrot","resource":"\/assets\/user\/50312cb16- 9 2f88d550000075.png","resourceName":"Bird 3","attached":null,"id":4, "text":" Two more to go...<\/h2> Add the next Costume from the Media Library to the Parrot.<\/p><\/div>\n"},{"block":null,"spriteName":"Parrot","- resource":"\/ass ets\/user\/50312cb6692f88e050000078.png","resourceName":"Bird 4","attached":null,"id":5,"text":" Last one...<\/h2> Add the costume \"9\" from the media library to \"Parrot\".<\/p><\/div>\n"},{"block":"registerFlagTrigger","s- priteName": "Parrot","resource":null,"attached":null,"id":6,"text":" Now that we have everything set up, let's make it work!<\/h2>Drag the start<\/em> block to Parrot's code.<\/p><\/div>\n"}, {"block":"blockControlForever","spriteName":"Parrot","resource":null,"att- ac hed":[registerFlagTrigger",6],"id":7,"text":" Remember how to animate?<\/h2> Just like we did in previous activities, start by adding the forever loop<\/em> block to the start<\/em>block in Parrot's code.<\/p><\/div>\n"},{"block":"blockLooksNextCostume","sprit- eName": "Parrot","resource":null,"attached":["blockControlForever",7,0],"id":8,"t- ext":" Adding animation logic to the Parrot<\/h2> Add the next costume<\/em> block into the forever loop<\/em>block in Parrot's code. This allows us to keep changing costumes to get the animation effect.<\/p><\/div>\n"}, {"block":"blockControlWait","spriteName":"Parrot","resource":null,"attach- ed ":["blockLooksNextCostume",8],"id":9,"text":"

TABLE 4-continued

Adding animation logic to the Parrot<\/h2>
Add the wait<\/em> block to the next costume<\/em>block in Parrot's code.
    Without a wait block, the Parrot flaps it's wings too fast. To get a better effect
    we need to slow it down.<\/p><\/div>\n"},
    {"block":null,"spriteName":"Parrot","resource":null,"attached":["blockCon-trol
    Wait",9,0,".2"],"id":10,"text":"
Adjusting our animation<\/h2>
Set the value of the wait<\/em> block to .2<\/em> in Parrot's code. This will allow
    for a better animation effect by slowing down how fast the costumes
    change.<\/p><\/div>\n"},
    {"block":"blockMotionMove","spriteName":"Parrot","resource":null,
    "attached":["blockControlWait",9],"id":11,"text":"
Now that the Parrot knows how to fly, let's make it move<\/h2>Add the
    move<\/em> block to the wait<\/em> block in Parrot's
    code.<\/p><\/div>\n"},{"block":null,"spriteName":"Parrot","re- source":null,
    "attached":["blockMotionMove",11,0,"6"],"id":12,"text":"
Set the speed of the Parrot<\/h2>
The value of the move block determines the number of steps that the bird makes
    in every cycle of the loop. Set the value of the move<\/em> block to 6<\/em>
    in the Parrot's code.<\/p><\/div>\n"},
    {"block":"blockMotionBounceOnEdge","spriteName":"Parrot","resource": null,
    "attached":["blockMotionMove",11],"id":13,"text":"
Last step, don't let the bird fly away<\/h2>
If we were to run the program right now, the bird would just fly off the Stage. We
    can easily fix this by adding the bounce on edge<\/em>block to the
    move<\/em> block in the Parrot's code. This is the easiest way to make the
    Parrot turn around when it gets to the edge of the
    Stage.<\/p><\/div>\n"}],"ownerid":"4fc97d5d692f883a79004c38",- "details":"
    Watch the bird fly back and forth across the Stage.","concepts":"This project
    combines the forever loop, animation and motion to make the bird fly across
    the Stage. The animation is simulated by using Next Costume<\/em> in the
    forever loop. The Move 6 Steps<\/em> block moves the bird in the direction it
    is pointing. If on edge, bounce<\/em>is the block that detects that the bird
    hits the end of the Stage and turns it around. Used in combination, it appears
    that the bird is flying across the Stage. "}

Learning module engine 24, shown in FIG. 2, is invoked when a user runs a lesson module. For example, a user from a learning center client utilizes learning center workshop 21 through an interface to invoke the lesson module. For example, the interface is a web browser on a computing device such as a personal computer or a tablet. For example, when learning is launched, a user chooses to run the lesson module using a browser. Then, learning module engine 24 takes over and guides the user to complete the lesson within the lesson module.

For example, learning module engine 24 displays a lesson bar that shows the steps that the user must perform. The area of the screen that the user must work on is highlighted and in order to proceed, the user must complete a current task. For example, learning module engine 24 provides the user with real-time help such as a "Hint/Show Me" button. Learning module engine 24 also plays any voice over or video associated with the lesson module. Learning module engine 24 also, for example, provides a user with an option to fast forward several steps in a larger task and an option to step backwards.

For example, learning module engine 24, while the user adds logic, highlights the source and target areas of the task. If the user makes a mistake, learning module engine 24 takes the user back to a known state. Once the user has recreated the original program, the lesson is complete. The user can then use learning module generator 23 to modify the lesson module.

For example, learning module engine 24 can also operate in other modes. For example, learning module engine 24 can include a mode where a user can open a lesson module and learning module engine 24 will animate the lesson module to a certain step. Similarly, learning module engine 24 can include a mode where a lesson module is run in slow motion continuously with voiceover. This mode can be useful, for example, when a user wants to generate a video.

Figure 10:
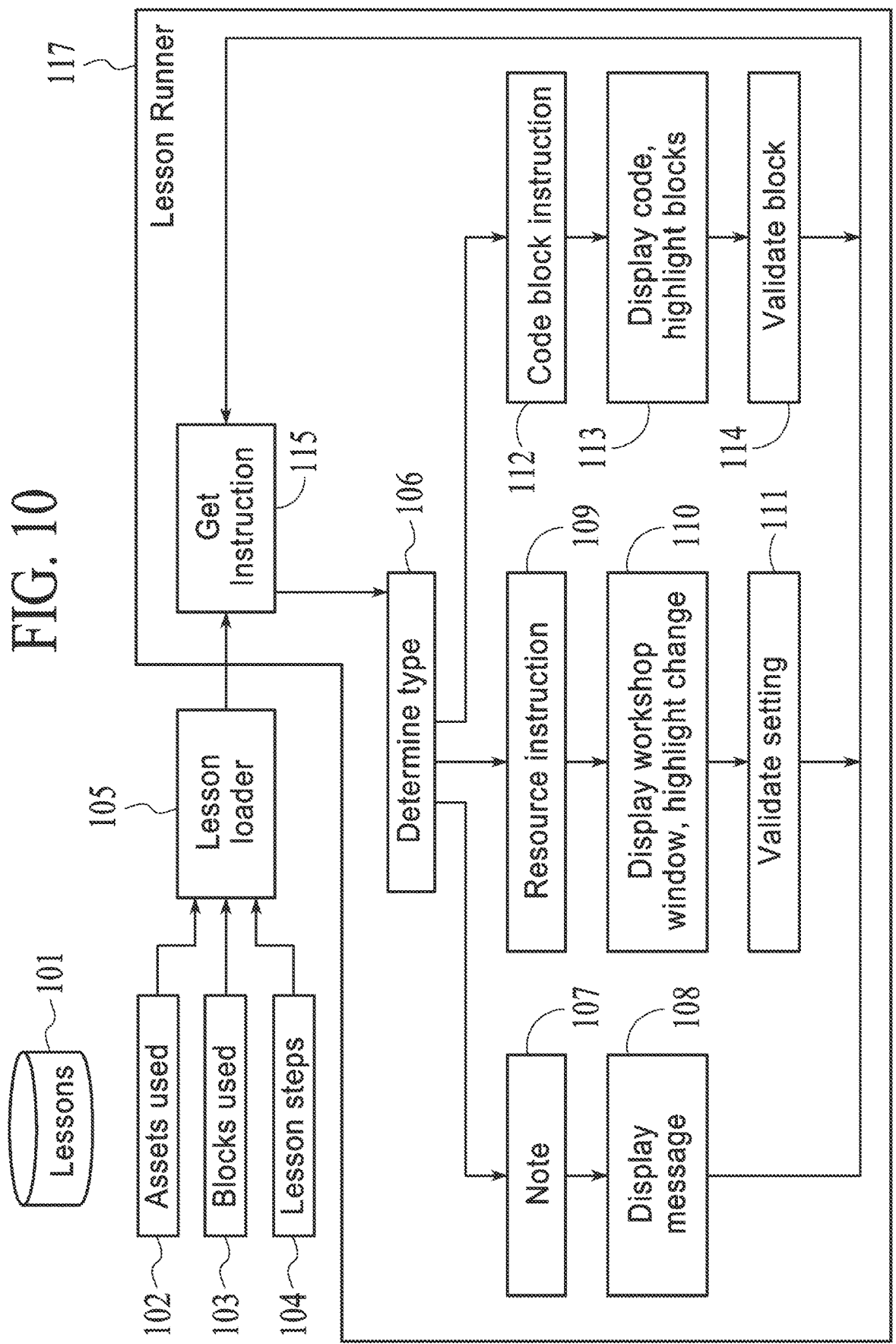
FIG. 10 is a simplified block diagram of a lesson runner architecture that runs lesson modules within a learning center runtime in accordance with an implementation.

FIG. 10 is a simplified block diagram illustrating operation of learning module engine 24. Lessons produced by learning module generator 23 are stored in lessons storage 101. A lesson loader 105 within learning module engine 24 sequentially loads assets, computer programming blocks and lesson steps respectively stored as assets used 102, blocks used 103 and lesson steps 104 within lessons storage 101. Lesson loader loads lesson data and adds to data structures the media assets from assets 102 that will be used. Media assets include, for example, images and sounds.

From within a lesson runner 117, a get instruction block 115 fetches an instruction within the instructions loaded by lesson loader 105. The instruction may include, for example, lessons steps from lesson steps 104, assets from assets 102 and blocks from blocks used 103. Get instruction 115 determines the type of instruction and passes it to the appropriate lesson step handler.

A determine type block 106 within learning module engine 24 sequentially handles instructions from lesson loader 105 and determines instruction type.

For a plain note, the message is displayed and/or spoken. This is an informational message requiring either a timeout or user acknowledgement to continue. This is represented in FIG. 10 where for a note 107, learning module engine 24 displays a message, as represented by a block 108.

When a resource instruction is run, the resources that are to be used when hints are turned on are highlighted. The lesson step instructions are displayed and/or spoken with entered explanations from the lesson creator. A check is performed that the resource was placed in the correct place by checking the associated project data structures for the correct placement. This is represented in FIG. 10 where for a resource instruction 109, learning module engine 24 displays a workshop window and highlights change, as represented by a block 110. Learning module engine 24 also validates settings, as represented by a block 111. A code block instruction, when run, highlights the block to be used when hints are turned on and shows where the block should be placed on the code canvas. The lesson step instructions are displayed and/or spoken with entered explanations from the lesson creator. A check is made that the block was placed in the correct place by checking the associated project code data structures. If validation is not successful, a message appears offering some hints. For example, the hints might include such things as animating actions, highlighting location on the display or masking location on the display.

Users are optionally allowed to proceed to the next step, in which case the lesson runner performs the action on behalf of the user. If validation was successful, the next lesson step is executed. This is represented in FIG. 10 where for a code block instruction 112, learning module engine 24 displays code and highlight blocks, as represented by a block 113. Learning module engine 24 also validates programming blocks, as represented by a block 114. After an instruction is processed, in a block 115, a next instruction is obtained. The lesson proceeds until no more steps, at which point the runner can offer additional activities or the user (lesson creator) can embed additional activities that can be done.

Figure 11:
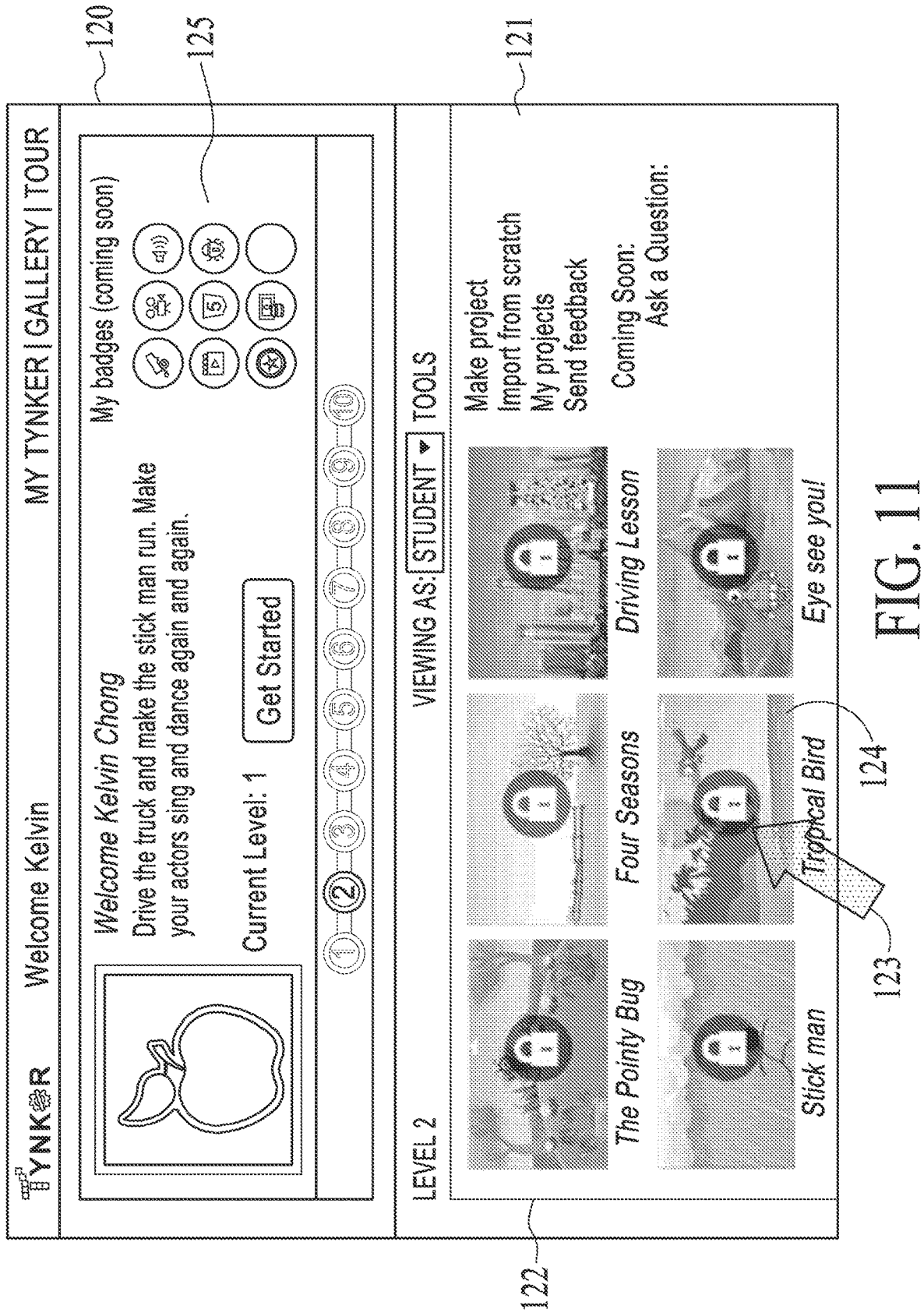

FIG. 11 shows a welcome window interface 120. An area 125 provides announcements to a user. An area 121 allows the user to select an action. An area 122 allows the user to select a project (computer program) to run. In FIG. 11, a cursor 123 illustrates the user selecting an icon 124 for the tropical bird lesson. Selection of icon 124 brings up an interface for the tropical bird and activates learning module engine 24 to run a project lesson for the tropical bird, as illustrated by FIG. 12.

Figure 12:
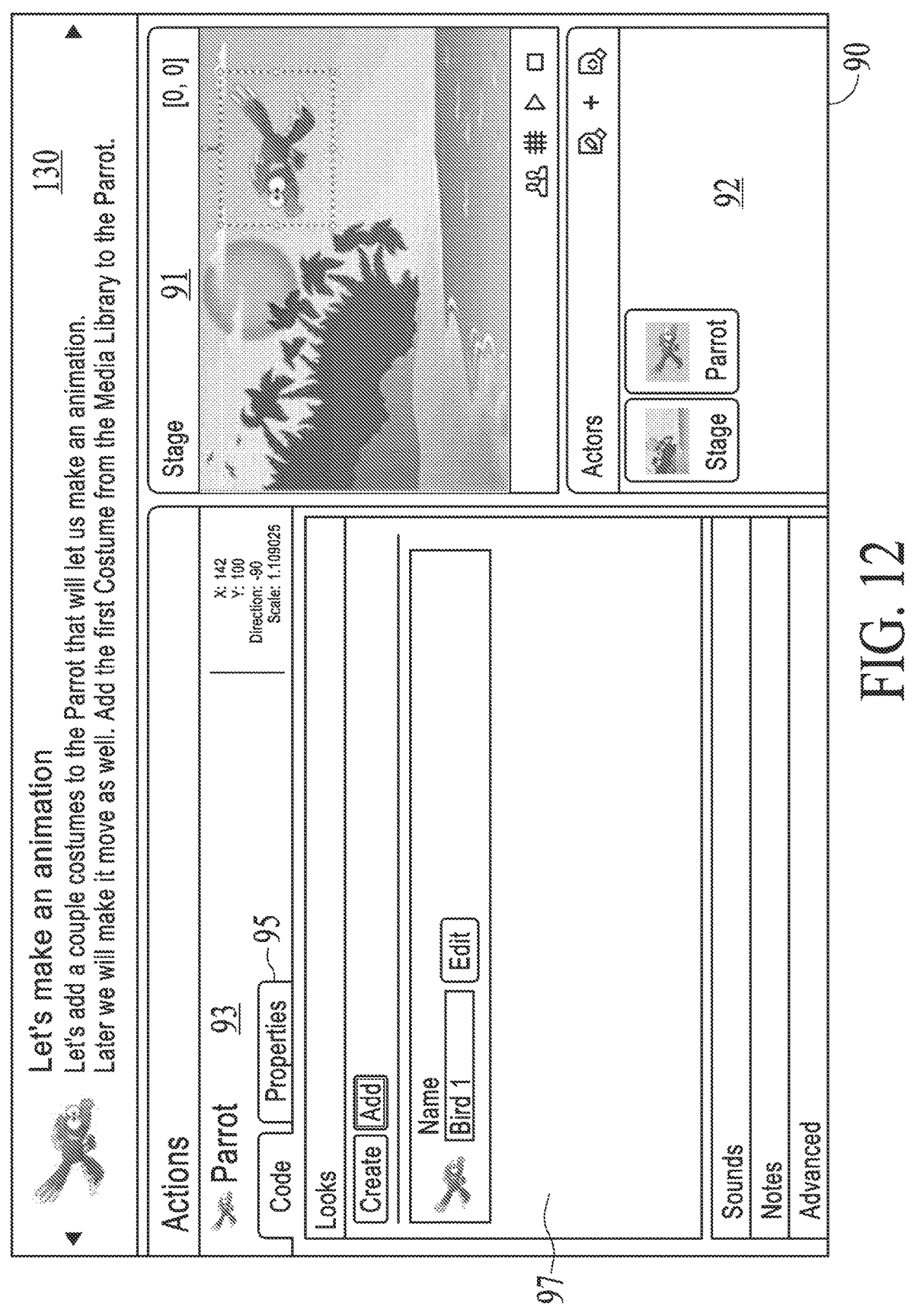
Figure 13:
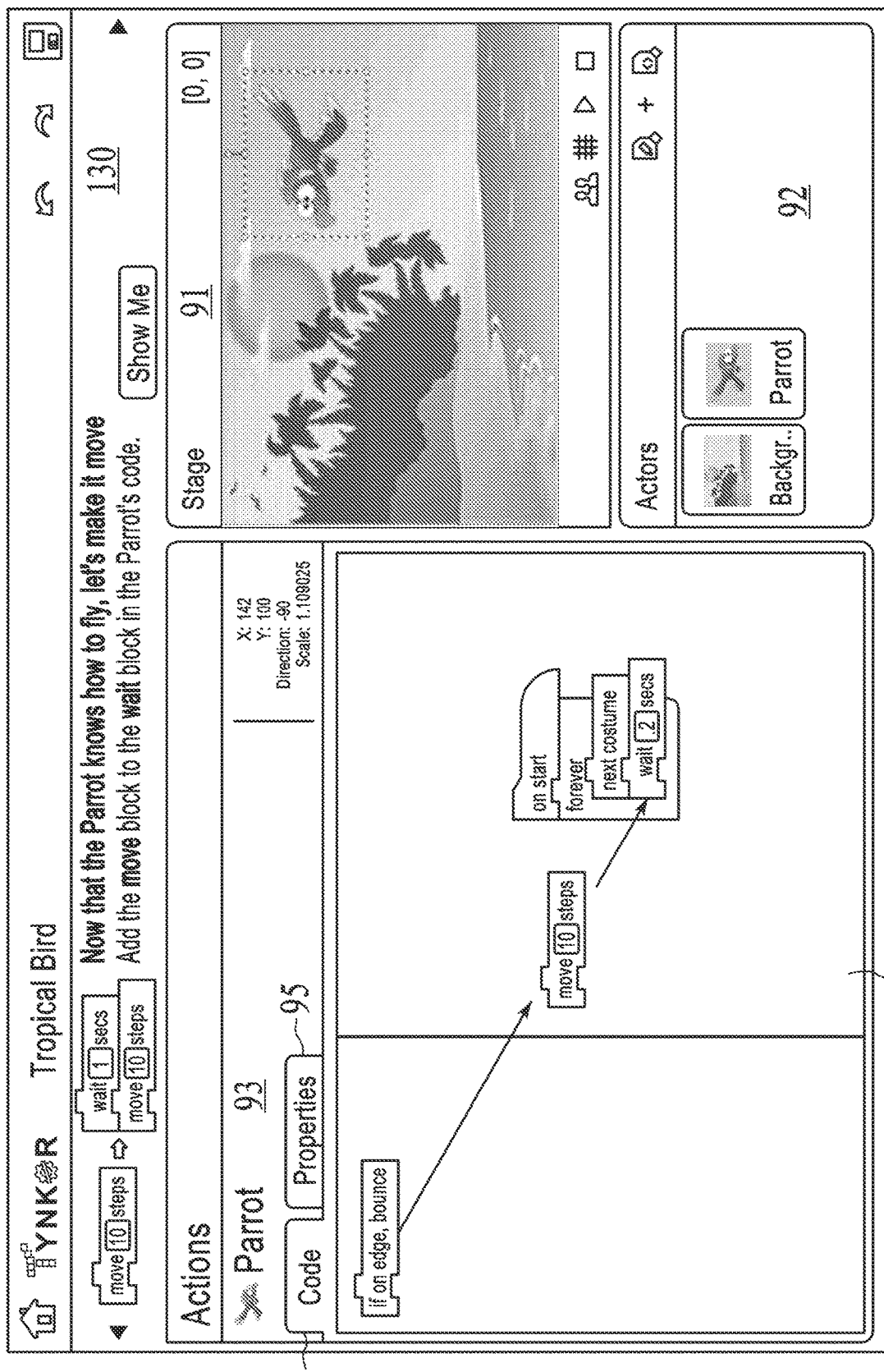

FIG. 12 shows user interface 90 with the added addition of a bar 130 through which learning module engine 24 communicates with the user. As illustrated by FIG. 13, learning module engine 24 communicates to the user next steps in the lesson and also can provide visual instruction by adjusting entities within work area 96 and code block area 97. For example, when a user selects the "Show Me" button within learning bar 130 as shown in FIG. 13, learning module engine 24 provides animation of the move block in code block area 97 being added to the wait block shown in work area 96.

For example, the Learning Center also allows the creation and running of puzzle type lessons with system validating success and failure type triggers. That is, a puzzle is an example of a special kind of lesson that has built in validation. For example, the puzzle has a specific success criteria that the author defines, such as: "Make the robot go to the green square."

The author of a puzzle lesson module builds the project (computer program) using learning center workshop. When building the lesson modules, the author uses two special blocks of code: a success criteria block and a failure criteria block. The author uses the blocks to define success and failure and to indicate the consequences of success and failure. The author then uses learning module generator 23 to generate a lesson module for the project.

When a user opens the project in a lesson running mode, upon a user completing an action, learning module engine 24 will check whether the success or failure criteria are valid. Learning module engine 24 will then execute the consequences of success or failure, as appropriate. This is illustrated in FIG. 14.

Figure 14:
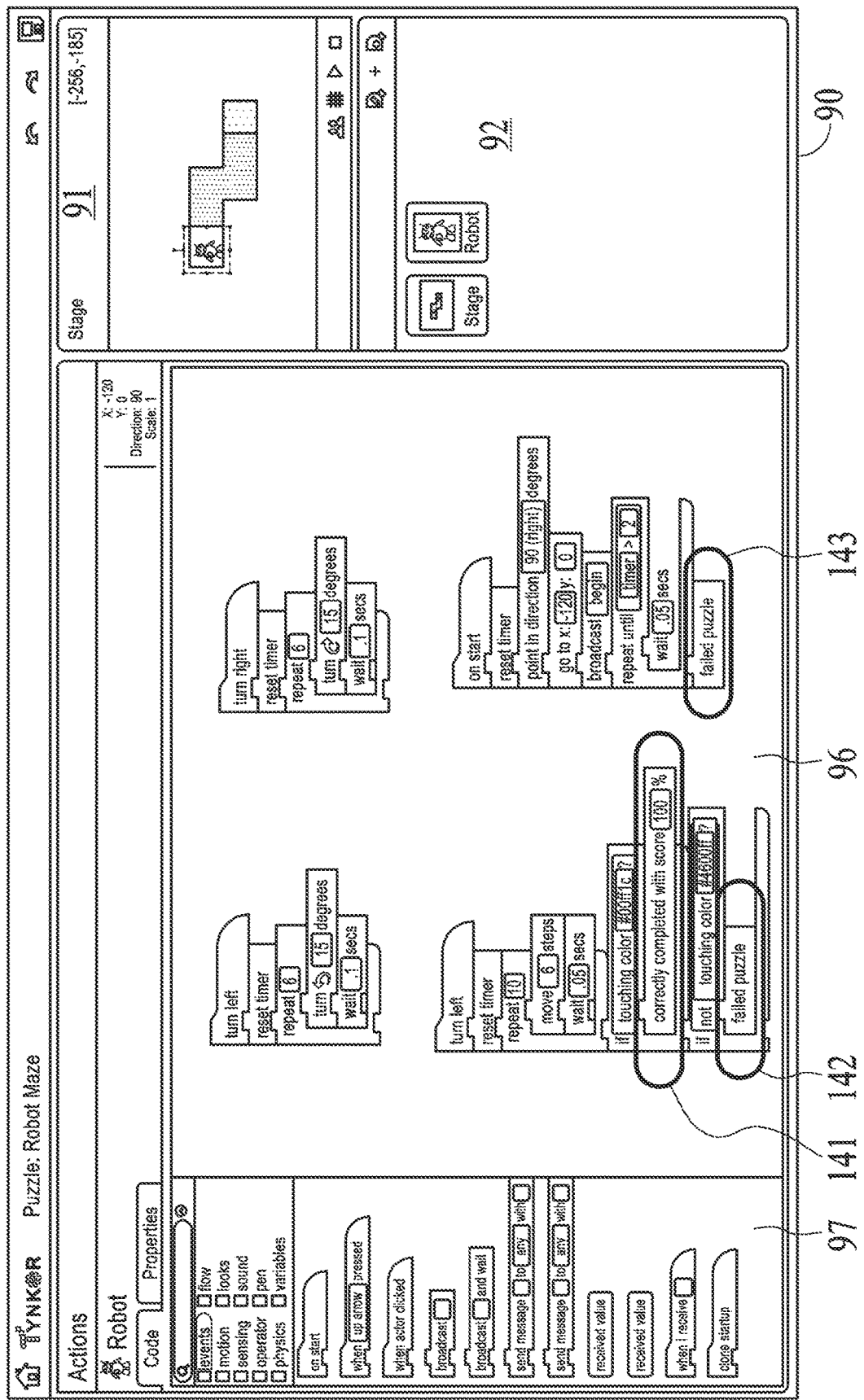
FIG. 14 shows a success criteria block and a failure criteria block as displayed by a graphics user interface used to create lesson modules within a learning center runtime in accordance with an implementation.

FIG. 14 shows how a lesson creator can define a success criteria block 141, a failure criteria block 142 and a failure criteria block 143 within work area 96 of interface 90 while creating a lesson or puzzle with using learning center workshop 21.

Figure 15:
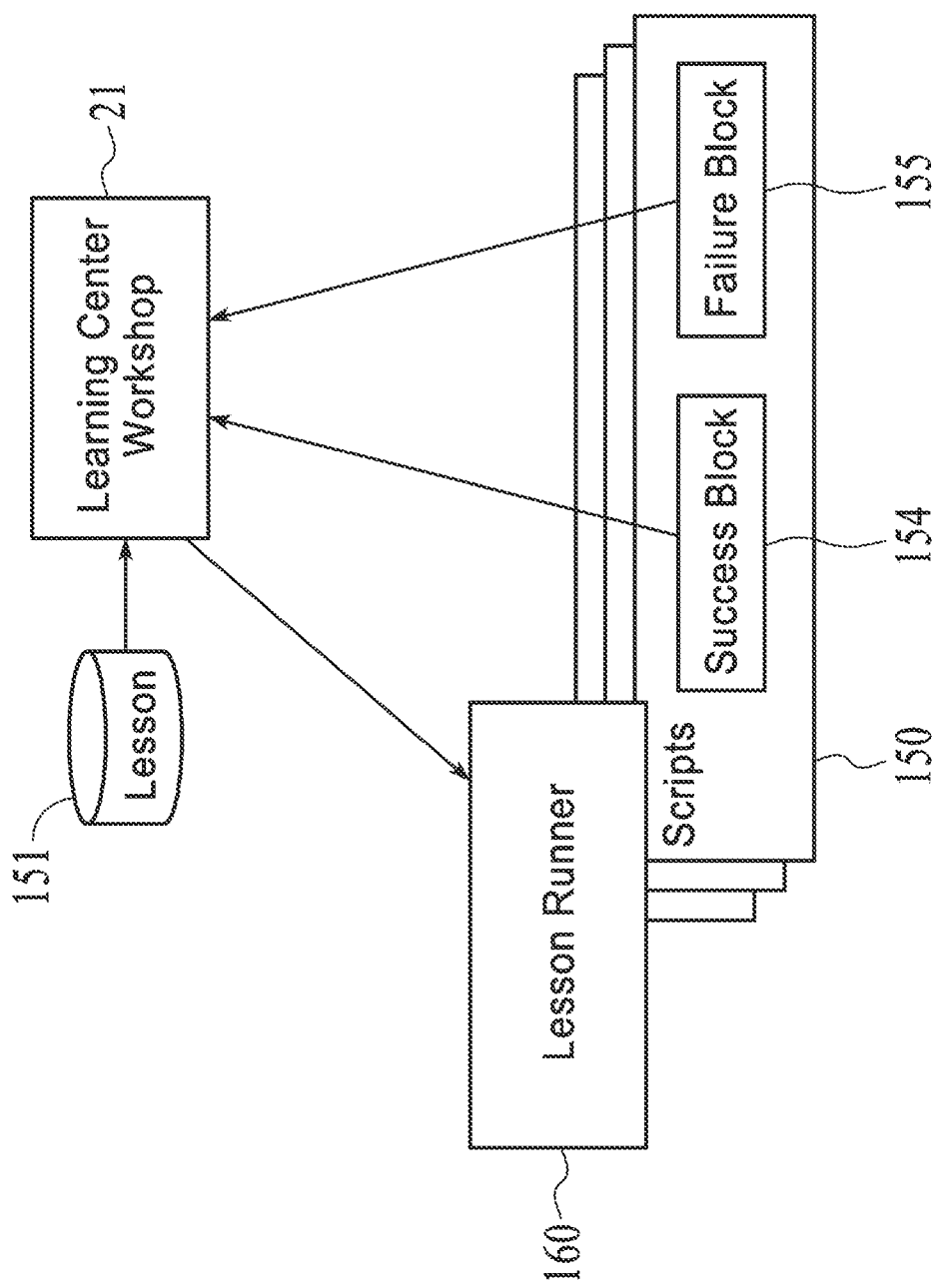
FIG. 15 and FIG. 16 are simplified block diagrams illustrating validation of a project within a learning center runtime in accordance with an implementation.

FIG. 15 is a block diagram that illustrates a lesson module 151 that includes scripts 150 that include a success block 154 and a failure block 155. These are utilized by learning center workshop 21 to construct a project to be run by a lesson runner 160 to run the lesson.

For example, the learning center allows a user to define activities that can be automatically validated by the learning runtime. For example, a task is presented to the student to accomplish a goal such as to write code to move a golf ball into a hole. The student creates the code. In order to check whether the code accomplishes the task, code blocks that the student has added can be checked to see that the code blocks are in the correct order. Alternatively, a trigger methodology can be used to determine whether the task was accomplished.

For example, a trigger is assigned to the objects that a user manipulates. The trigger is based on whether a criteria placed within the computing program has been satisfied. For example the objects are a ball and a hole. The triggers are hidden from the user. The triggers are code instructions that check for the criteria, as delineated by parameters. If the parameters are satisfied, the trigger is fired, and the process that checks that the code can determine whether the user accomplished the task. For example, a geometric criteria specifies that a ball must travel a certain distance. For example, a hole trigger checks that the ball is within the bounds of the hole.

In addition, other types of criteria can be used. For example, a time-based criteria indicates whether a task is completed within a specified amount of time. For example, did a mouse finish a maze in under 8 seconds? A code based criteria determines whether code used to accomplish a task is within predetermined parameters. For example, was a lesson completed using under 8 code blocks and without using recursion? Value-based criteria determine whether a particular value was reached. For example, was a score greater than 25? Event criteria determine whether a certain event criteria was received. For example, was a message sent by one of the actors? A physics based criteria indicates a physical property or phenomena occurred. For example, did a cannon ball reach a velocity of at least 25 meters per second? An external physical criteria indicates some real activity outside the program occur. For example, did a sensor on a physical stage robot move 10 feet?

Figure 16:
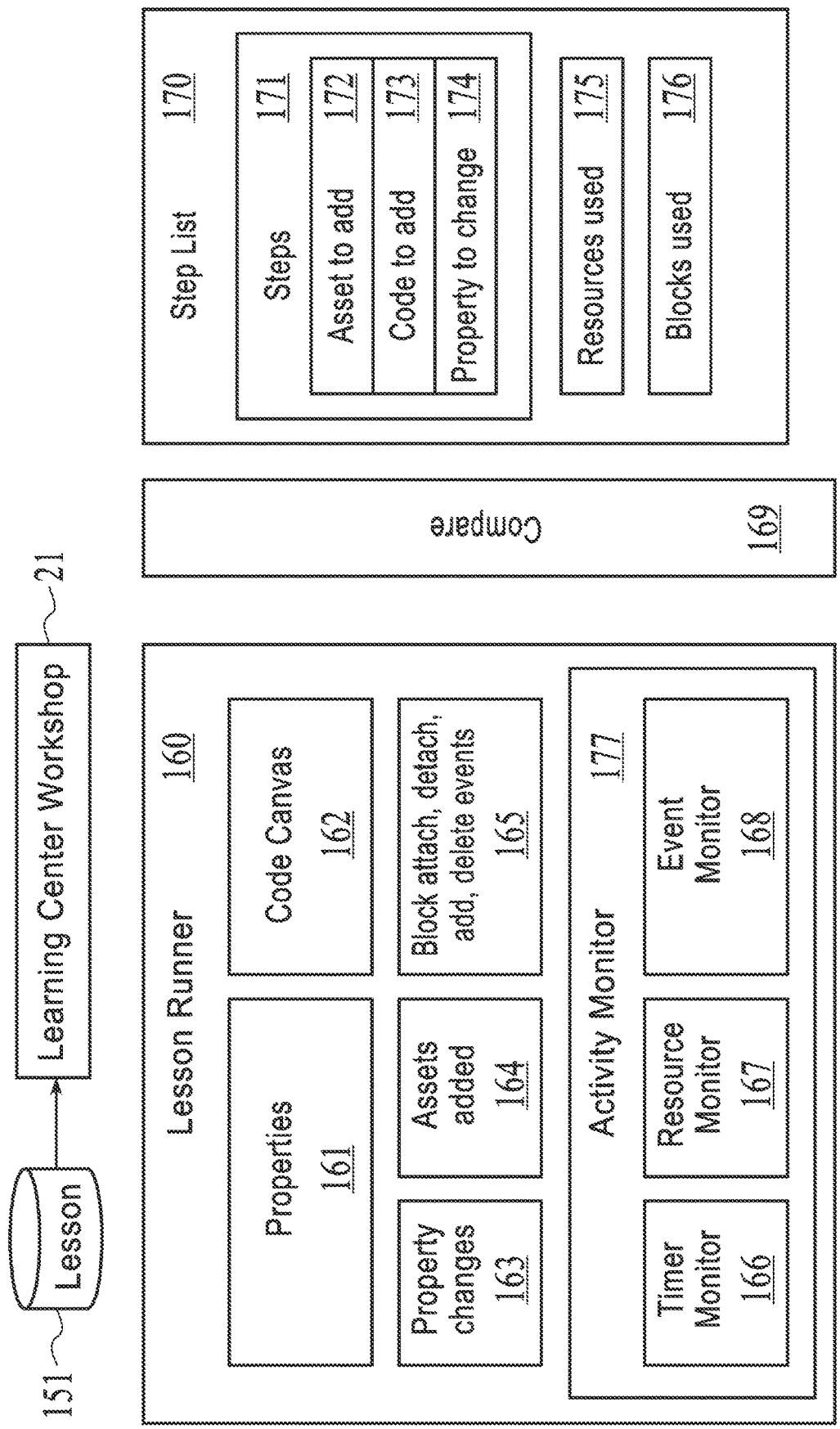

FIG. 16 illustrates validation during a lesson runtime. For example, lesson module 151 is run within learning center workshop 21 that calls lesson runner 160 to run the lesson module. Lesson runner 160 includes properties 161 and a code canvas 162. Actions on properties 161 or code canvas 162 triggers property changes 163, assets added events 164 and block events 165. Block events 165 include, for example, block attach events, block detach events, block add events and block delete events.

An activity monitor 177 within lesson runner 160 includes a timer module 166, a resource monitor 167 and an event monitor 168. Lesson runner 160 performs a compare function 169 with a step list 170. Step list 170 includes steps 171, resources used 175 and blocks used 176. Each of steps 171 may be an asset to add step 177, a code to add step 173 or a property to change step 174.

Figure 17:
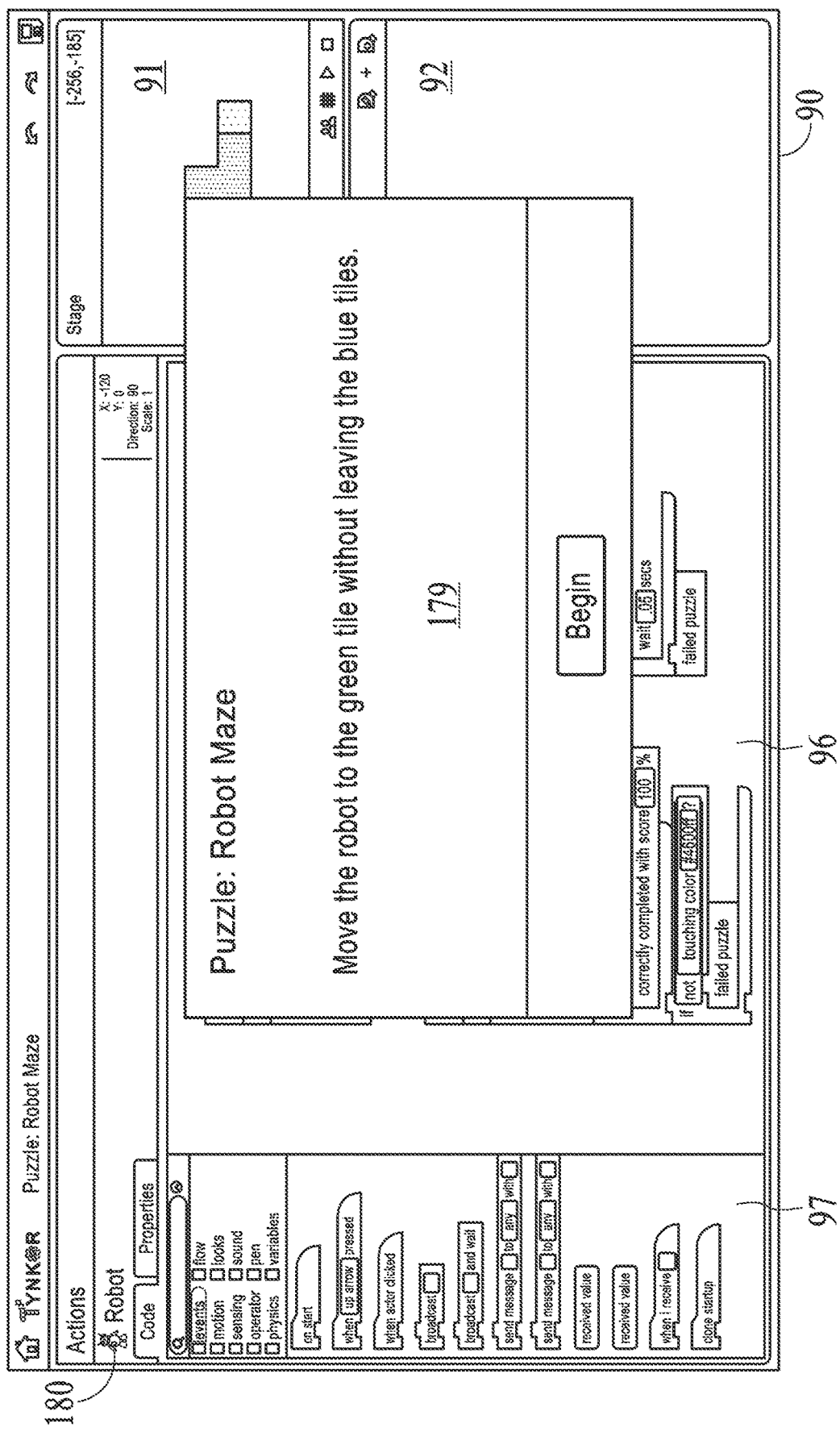
FIG. 17, FIG. 18 and FIG. 19 are simplified diagrams illustrating operation of a graphics user interface providing runtime feedback to a user within a lesson running in a puzzle mode within a learning center runtime in accordance with an implementation.

FIG. 17 gives an example of a window 179 that may appear over interface 90 that gives instructions for a lesson module that includes validation.

Figure 18:
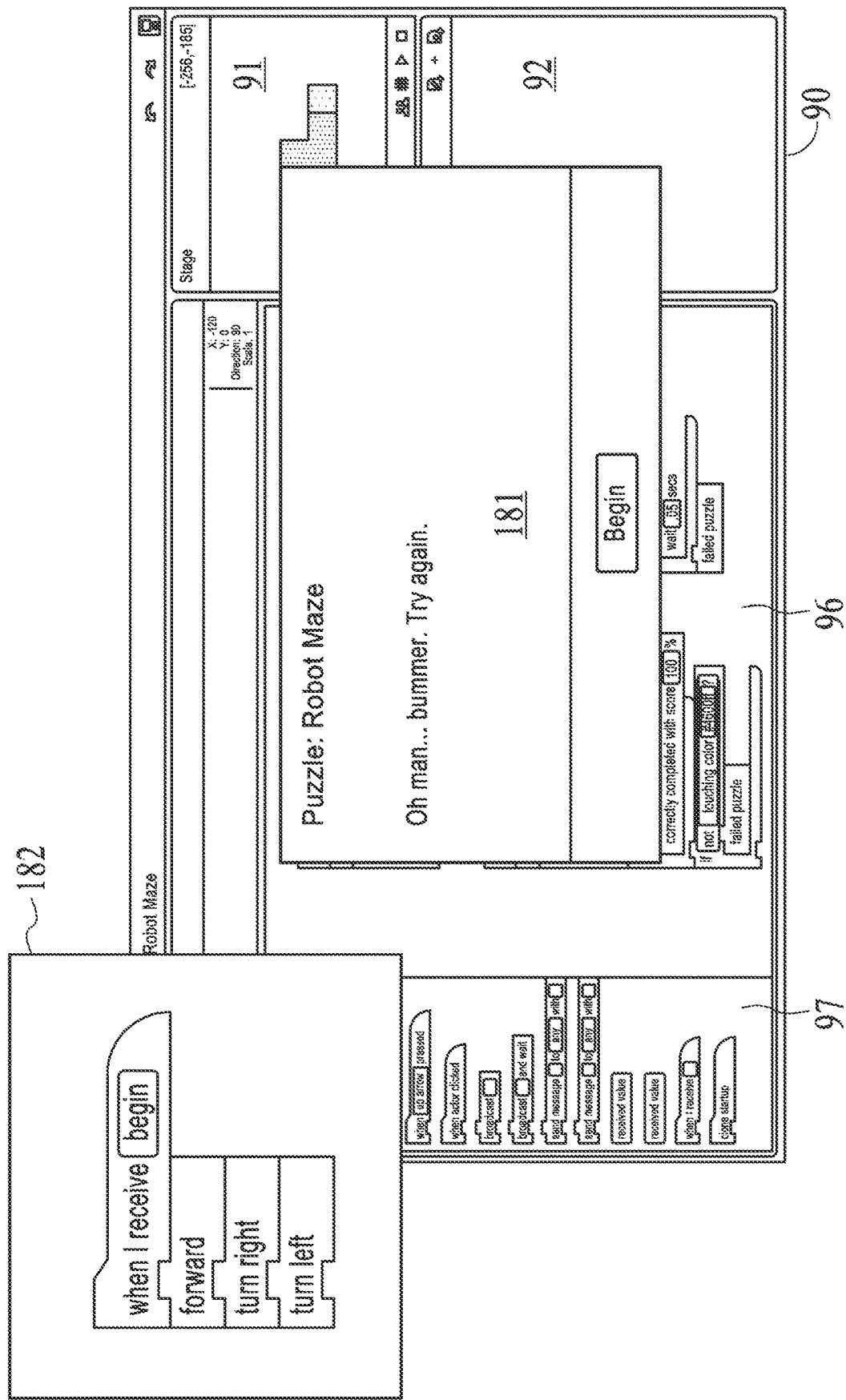

FIG. 18 gives an example of a window 181 that appears over interface 90 when a user fails to perform a lesson properly. Blow up section 182 of work area 96 shows the incorrect code blocks.

Figure 19:
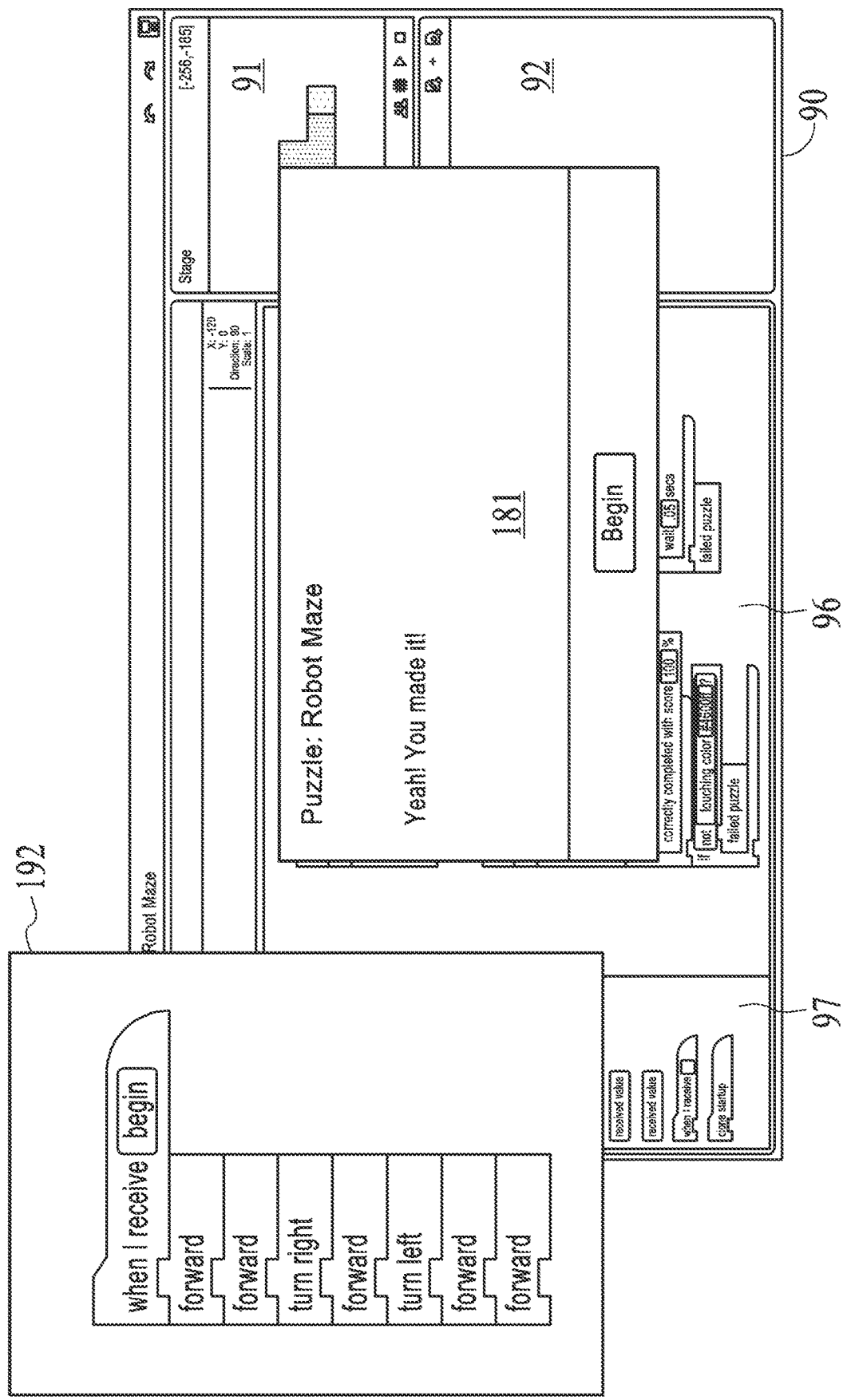

FIG. 19 gives an example of a window 191 that appears over interface 90 when user performs a lesson properly. Blow up section 192 of work area 96 shows the correct code blocks.

After a project author generates a lesson module within learning center server 12, the author can make the lesson module available to other users of learning center server 12. For example, other users are charged a fee for using a lesson module made available by an author and the author receives a portion of the fee, based, for example, on the number of other users that use the lesson module.

For example, an author is reimbursed based on tracking the number of times another user views or completes a lesson authored by the author. For example, an author gets paid $2 for every 1000 lesson views inside a paid course authored by the author. Alternatively, an author can sell a lesson for a flat fee.

Goal-Based Lesson Module Generation

Embodiments of the present disclosure can be used to generate lessons of varying scope to teach different programming aspects to students. In exemplary embodiments, students may select one or more programming goals they'd like to learn from a list of possible programming goals presented to the user via the user interface 90. Goals presented in this manner may include pre-written projects and/or lesson modules that can be parsed by the learning module generator 23 to generate a list of tasks to teach the concepts, skills, and techniques associated with the goal.

Alternatively, a student may identify a software program (such as a game) or portion thereof that the student wishes to learn how to write, thereby presenting the student's own goal (learning to write a similar program) to the learning center workshop 21 or other software implementing functionality of the embodiments of the present disclosure. In such cases, systems and methods of the present disclosure can analyze the program and (based on pre-identified goals, skills, concepts, and code blocks) identify the goals, skills, techniques, and concept involved in writing the program, then generate a lesson module accordingly.

The programming goal identified by a student may pertain to any desired subject matter, programming language, functional effect, hardware component(s), or other characteristic. Exemplary goals may include creating a cartoon with sound, designing a game, creating an animated greeting card and many others. A variety of techniques and skills may be associated with each goal, and each technique or skill may in turn be associated with various core programming concepts.

For example, one possible goal that a user may select is to learn how to build a single-player side-scrolling game. This goal could be selected from a gallery of possible goals, or by the user identifying a side-scrolling game the user wishes to emulate. Associated with this goal may be one or more skills and techniques, such as animation, interactivity, general game building, sound handling, and others. Each skill or technique, in turn, may have one or more associated lower level (i.e., more detailed or fundamental) concepts. Each skill, technique, and/or concept may be taught using one or more lessons as described in more detail herein.

Figure 21:
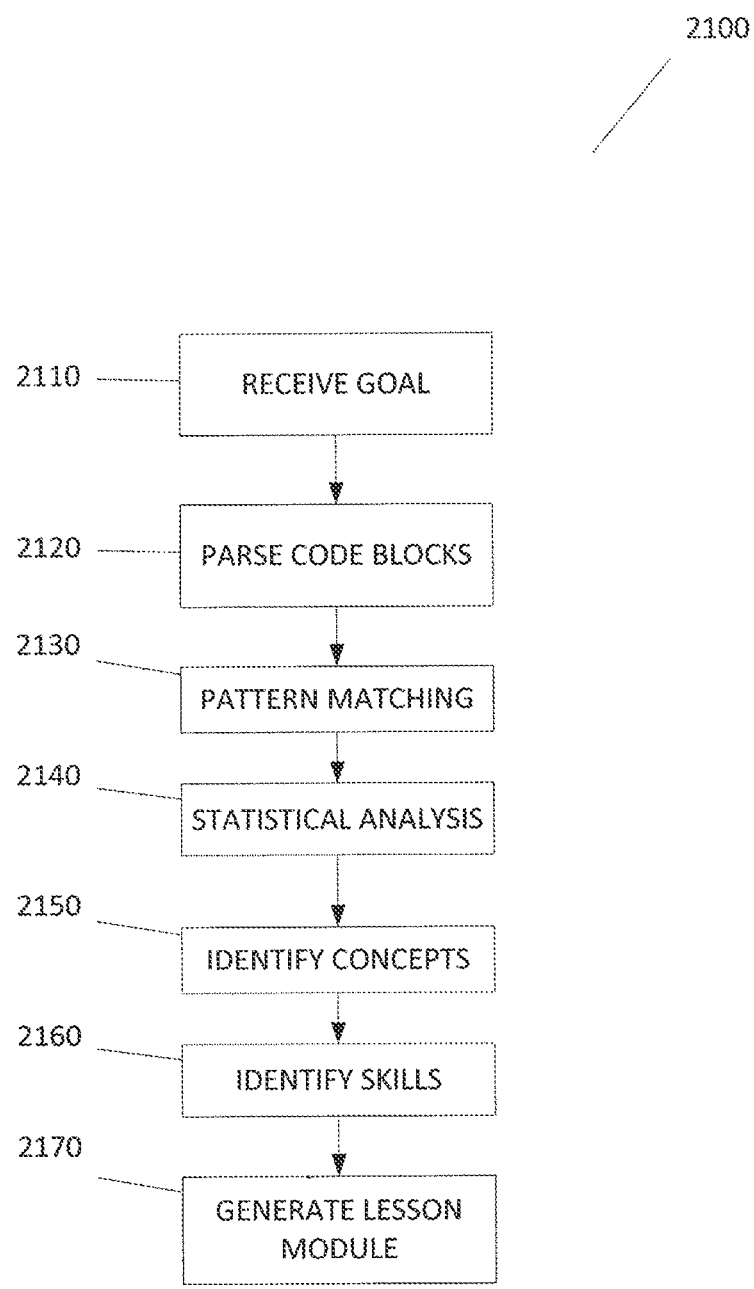
FIG. 21 is a flow diagram of an exemplary process in accordance with various aspects of the present disclosure.

FIG. 21 depicts an exemplary process for generating a lesson module based on an identified goal according to various aspects of the present disclosure. Embodiments of the present disclosure may perform more or fewer steps than those shown in FIG. 21, and may perform the steps of method 2100 in any order and in conjunction with steps of other processes. Furthermore, exemplary method 2100 is described as being implemented by learning center workshop 21 below, however this method (and others) may be implemented, in whole or in part, by any other combination of hardware or software components operating in conjunction with the present disclosure. Additionally, while various interactions are described with reference to a "student," it is to be understood that other users (such as teachers and parents) may likewise interact with the embodiments disclosed herein.

In the exemplary method 2100, a programming goal is received (2110). Where the goal is associated with a learning workshop project external computer program, or other software, such software can be parsed to identify code blocks (2120), and a statistical (2130) and pattern matching (2140) analysis performed on the code blocks to identify the concepts (2150) and skills/techniques (2160) associated with the goal. Alternatively, or in addition, the identification of concepts (2150) and skills (2160) may be performed by retrieving concepts, skills, code blocks, and/or lesson modules stored in conjunction with the goal in a database. A lesson module is generated (2170) in accordance with the identified skills, techniques, and concepts, for presentation to a student.

The programming goal may be received (2110) by the learning center workshop 21 in any suitable manner. For example, a student may select the programming goal from a list of possible programming goals presented to the user via the user interface 90. A list of goals may be presented using graphics, icons, buttons, pulldown menus, and/or any desired user interface feature. The student may also input one or more keywords to perform a search to find a goal associated with the one or more keywords. In this case, the goal and its associated skills, techniques, concepts, and projects/programs may be stored in a database accessible by the learning center workshop 21, learning center server 12, and/or other hardware or software component implementing methods of the present disclosure. Alternatively, the programming goal may be received (2110) by the student identifying a program (or portion thereof) that the student wishes to learn how to emulate.

The identification of higher-level programming skills and techniques associated with a goal (2160) or lower-level programming concepts associated with skills and techniques (2150) may be identified using similar (or different) techniques, and according to any desired criteria. Any number of skills and techniques may be associated with any particular goal, just as any number of core concepts may be associated with each individual skill/technique. Goals, skills, techniques, and concepts may be associated with identifying "tags." Such tags can be defined and assigned to code blocks, programs, goals, skills, techniques, and concepts stored in a database in communication with the learning center workshop 21. As discussed below, this repository can in turn be used to tag code blocks, programs, goals, skills, techniques, and concepts for new programs (e.g., identified by a student as part of a programming goal the student wishes to achieve).

The goals, skills, techniques, and concepts may have a hierarchal relationship with each other. For example, a goal (at the highest level of the hierarchy) may have a plurality of associated skills at a lower level in the hierarchy, with each associated skill associated with one or more programming concepts at an even lower level. In this context "low level" refers to a lower level of abstraction (and thus a higher level of detail), whereas "high level" refers to a higher level of abstraction (and thus a lower level of detail) associated with a goal, skill, technique, or concept. Accordingly, a low-level concept might be associated with mathematical operators, while a relatively higher-level concept or skill might be associated with geometric art that includes the use of mathematical operators, as well as other lower-level concepts.

In response to the selection of a goal, the learning center workshop 21, may identify one or more concepts (2150) and/or skills (2160) necessary for the student to achieve the goal, as well as skills or techniques associated with the goal in any other desired manner. Skills may be identified in response to the goal selection in real-time or near-real-time, or they may be predefined. For example, in a case where the student selects a programming goal from a list, the skills, techniques, and concepts may be pre-defined and stored (e.g., in a relational database record) in conjunction with a pre-generated lesson module.

In another example, in a case where the student identifies his or her goal by identifying a computer program the student wishes to learn how to write or emulate, the learning workshop 21 may analyze the program entered by the student to identify the goals, programming skills, techniques, concepts, and code blocks associated with the identified program. The student can identify a computer program in any desired manner, such as by uploading source code or object code for the program into the learning center workshop 21 or by providing a link to the program. The student may identify an entire complete program as well as portions of a program (such as individual functions or code fragments) associated with a programming goal the student wishes to achieve.

The code identified by a student is parsed (2120) to identify one or more code blocks within the code. Each identified code block is compared to code blocks known to the learning center workshop 21 (e.g., stored in a database and associated with one or more concepts, skills, and/or goals). Based on the similarity between the identified code block and one or more known code blocks, concepts, skills, and techniques can thus be assigned to the overall code.

In the exemplary method 2100, one or more code blocks may be compared to known code blocks based on similar patterns. Such patterns may include, or be based upon sequences of instructions, variable names, function calls, interactions with other program elements, and any other desired features or criteria. A pattern may be identified for one or more lines of code, as well as for one or more code blocks.

Embodiments of the present disclosure may determine the functionality of blocks of code in an identified program. Among other things, this may aid in comparing the identified blocks to known coding blocks with similar functionality. Functionality of one or more code blocks may be determined in any suitable manner. For example, an identified code block may be executed using a virtual machine (i.e. a software simulator that emulates the functionality of a real-world system) and the functionality of the block determined based on the execution. The functionality of the identified code block can then be compared to the functionality of known code blocks associated with one or more goals, skills, techniques, and/or concepts. The functionality of a code block may include, for example, user input, output to a user, modification of one or more states by a user, an environmental restart (e.g., characters in a game are reset to their initial state), and combinations thereof. Among other things, use of a virtual machine to execute code blocks allows embodiments of the present disclosure to analyze code executable across a variety of different hardware platforms and operating systems without having to test the code blocks on each actual platform.

The code identified by a student may have any number of different identified code blocks associated with it. Additionally, some code blocks may be associated with multiple goals, skills, concepts, and/or techniques, and therefore may not (by themselves) be determinative in identifying a particular concept (2150) or skill (2160) for the identified code. Embodiments of the present disclosure may perform any desired analysis or other procedure to help ensure a lesson module (or multiple lesson modules) is generated that correctly addresses the subject matter associated with a student's goal.

For example, embodiments of the present disclosure may perform a statistical analysis (2140) to identify concepts and skills associated with a program. The statistical analysis (2140) may include calculating the probability that an identified code block (or group of code blocks) is associated with a skill, concept, or goal based on the known code blocks and the skills, concepts and goals with which they are associated. A particular skill or concept can be assigned to the code identified by the student in response to such a probability meeting or exceeding a predetermined threshold. Probabilities for any number of different code blocks can be calculated in any desired manner, such as by calculating, for each of a plurality of identified code blocks, a probability that each respective identified code block is associated with each respective skill from the one or more skills.

In one example, a program identified by a student may be parsed (2120) and the code blocks within the code identified, via pattern matching (2130) to known code blocks, as having the following skill and concept tags associated with the code:

(animation)
(motion)
(keyboard_interaction)
(score_tracking)
(programmatic_music)

This sequence of skills and concepts can then be compared to the skills and concepts associated with known programs (e.g., stored in a database in communication with learning workshop 21) that are representative of programs associated with the various skills and concepts.

In this example, the probability each concept or skill is associated with a particular type of program (specifically a "game") is as follows:

(animation)—0.9
(motion)—0.9
(keyboard_interaction)—0.9
(score_tracking)—0.9
(programmatic_music)—0.1

In this example, out of all programs in the database identified with the "game" tag, 90% of the time, there is an "animation" sequence, but only 10% of the time is there a "programmatic_music" sequence. Embodiments of the present disclosure may calculate probabilities in any desired manner, such as by utilizing a Bayesian calculation. Continuing the previous example, the probability that a sequence associated with a skill or concept is in the program identified by the student may be calculated using the following equation:

probability_of_sequence_type_in_program=
probability_of_being_program_type_given_sequence/(probability_sequence_appears_in_program_type+probability-_sequence_appears_in_other_program_types)

Additionally, the probabilities for all the block sequences as a whole can be determined. The respective probabilities for each sequence are in a given type of program can be combined in an extension of a Bayesian equation as follows:

probability_of_program_type=(p1*p2* ... *pn)/
((p1*p2* ... *pn)+((1−p1)*(1−p2)* ... * (1−pn)))

Using the above exemplary equations, the program identified by the student in this example would have a probability of 0.999 (99.9%) that is a "game" program. In embodiments where: the learning center workshop 21 assigns a tag for a goal, skill, or concept to a program when the probability that one or more code blocks are associated with the same goals, skills, or concepts assigned to one or more known code blocks or programs meets or exceeds a threshold of, for example, 90%, the program would be assigned the "game" tag in this example. In the same manner, the probability that the code block sequences in the program are associated with another type program may be used to determine the identified code or identified code blocks are not associated with a particular goal, skill, or concept. For example, if the individual probabilities that the code block sequences are associated with a music program are:

(animation)—0.3
(motion)—0.1
(keyboard_interaction)—0.2
(score_tracking)—0.0
(programmatic_music)—0.9 then the program will have a very low probability of being a "music" program because "music" programs have more programmatic music elements rather than animation, motion, keyboard integration, and score tracking.

The statistical analysis (2130) may include other calculations and analyses as well. For example, embodiments of the present disclosure may be configured to generate alerts in response to one or more calculated probabilities that a goal, skill, and/or concept associated with a particular code block, group of code blocks, or program being below a predetermined threshold. Using the example above, an alert might be generated in response to the individual probabilities for three of the five identified concepts and skills being below 40%. In other cases, an alert could be generated in response to the probabilities associated with each of any desired number or percentage of identified code blocks being below a predetermined threshold.

Embodiments of the present invention may determine complexity metrics associated with the identified code. The complexity metric can be determined for individual code blocks as well as for the identified code as a whole. Among other things, the complexity metric can help students and teachers determine whether the difficulty of a particular programming goal or project. Exemplary complexity metrics may include: a type associated with a code block, the number of code blocks in the code, a level of nesting in a code block, a number of devices (e.g., input/output devices, communication hardware) interfacing with the code, a type of media (e.g., sounds, images, video) used by the code, functionality of the code, and combinations thereof.

The lesson module is generated (2170) in accordance with the identified goal, skills, techniques, and concepts as described above. While method 2100 is described in accordance with generating a lesson module for a single goal, the learning center workshop 21 may generate a lesson module that includes steps for teaching a student about any number of different goals, skills, techniques, and concepts. For example, for each skill, technique, or concept identified, the learning center workshop 21 may generate a respective step (or set of steps) in the ordered list of steps in the lesson module particularly tailored to teach a student the respective skill, technique, or concept. A lesson module may also be generated for each individual skill, technique, or concept associated with a goal. Additionally, any number of lesson modules may be generated for a given goal, skill, technique, or concept.

Figure 22:
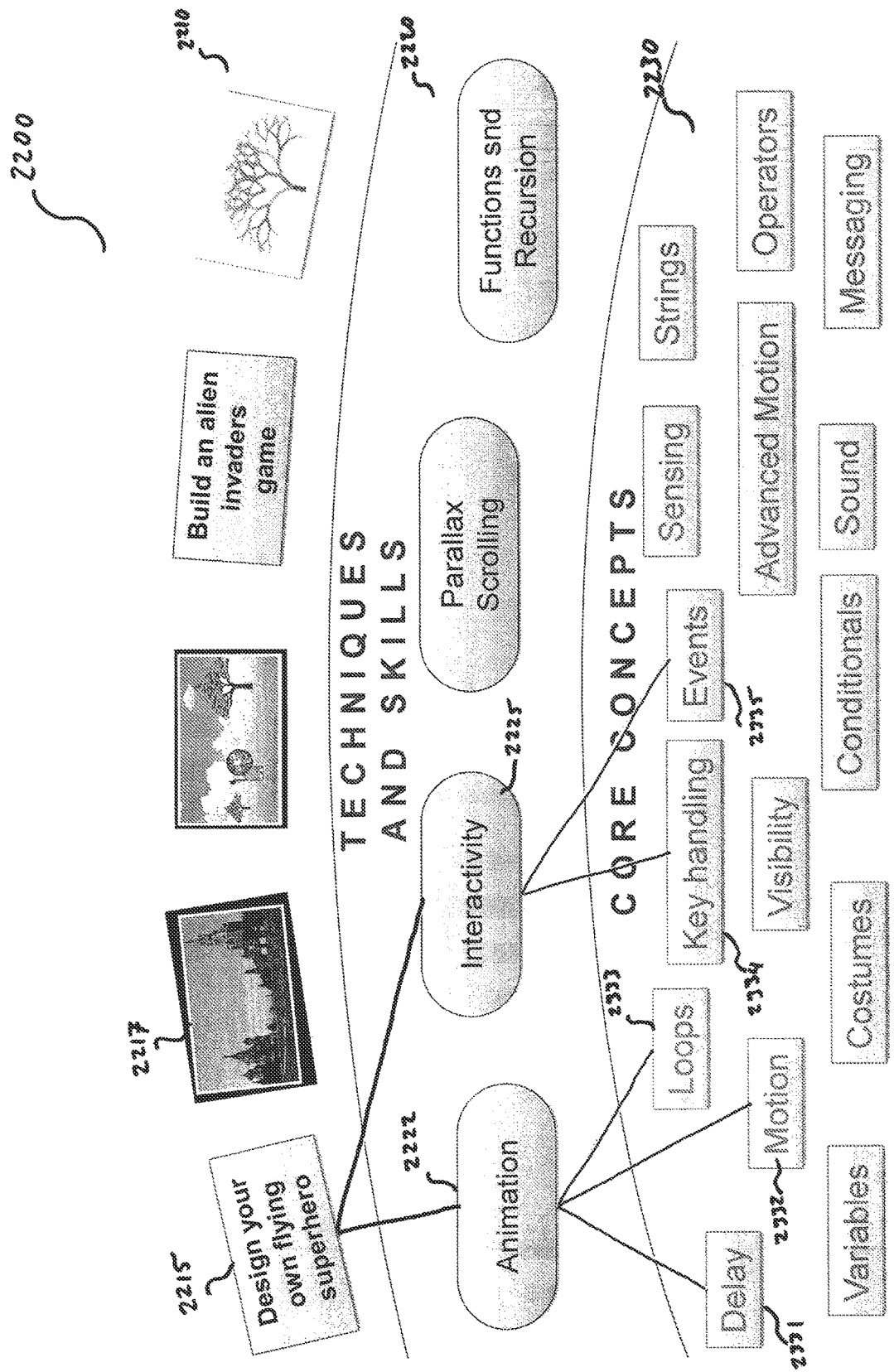
FIG. 22 is a block diagram illustrating exemplary relationships between programming goals, programming techniques and skills, and programming concepts in accordance with various aspects of the present disclosure.

Referring now to FIG. 22, diagram 2200 illustrates a hierarchal view showing the relationships between various exemplary goals 2210, techniques and skills 2220, and core concepts 2230. As described previously, a goal may be described in text (as with goal 2215), represented by an image (such as goal 2217 representing a goal of animating a drawing), or in any other desired manner. In accordance with diagram 2200, the learning center workshop 21 may identify two skills/techniques 2220 associated with goal 2215, namely animation 2222 and interactivity 2225. In turn, animation 2222 may be associated with the core concepts of delay 2331, motion 2332, and loops 2333 while interactivity may be associated with the concepts key handling 2334 and events 2335. While animation 2222 and interactivity 2225 are illustrated as each being associated with different concepts, goals 2210, techniques/skills 2220, and concepts 2230 may be associated with each other in any suitable manner, including multiple techniques/skills 2220 being associated with the same concept 2230.

Customized Lesson Creation and Application

Embodiments of the present disclosure can be used by users supervising students (such as parents and teachers), or the students themselves, to construct custom courses to teach students various concepts (including concepts related to computer programming). As described above, lesson modules (also referred to herein as "learning modules") may be created and stored in a database to teach various skills and concepts. Additionally, as described below, these lesson modules may be customized and personalized to a particular student or group of students. The lesson module may be applied (i.e. provided) to a student and the progress of the student in completing the lesson module may be monitored to further customize the lesson module (or future modules) to the specific capabilities and needs of the student.

Figure 23:
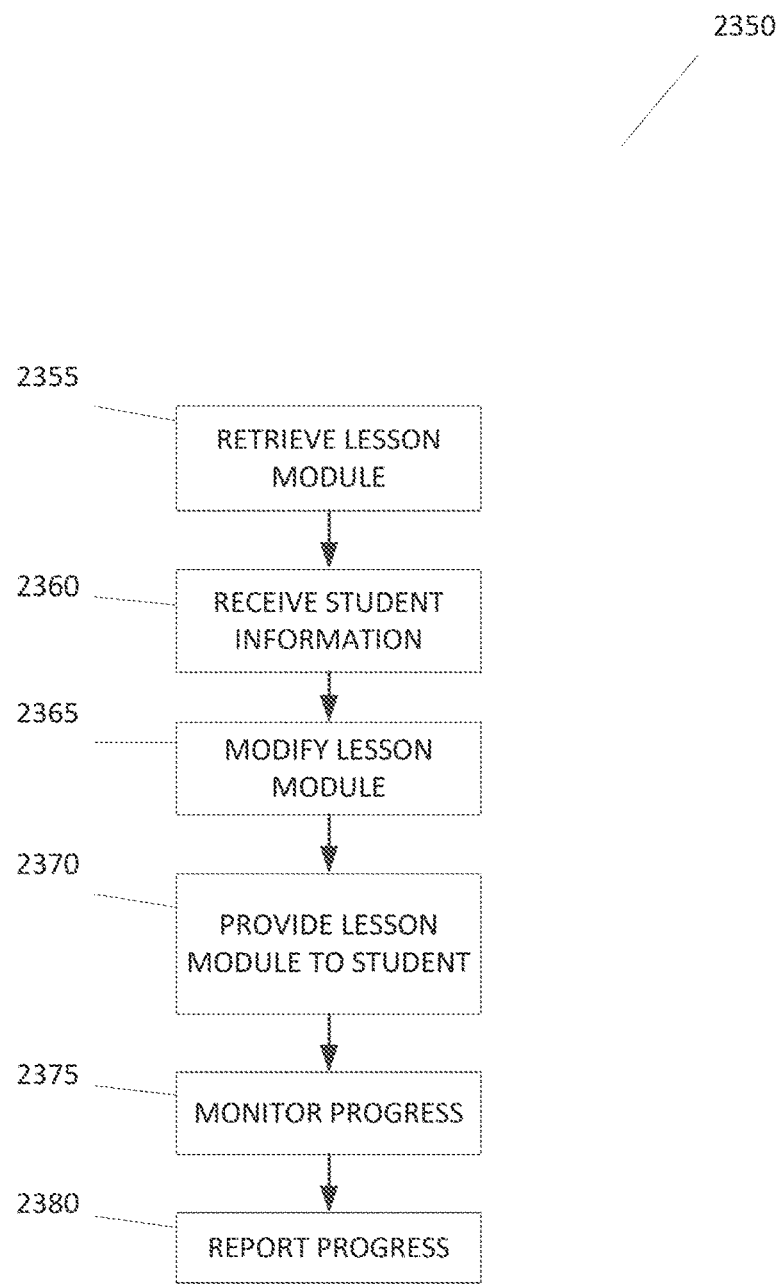
FIG. 23 is a flow diagram of an exemplary process in accordance with various aspects of the present disclosure.

FIG. 23 depicts an exemplary method for automatically customizing and applying a lesson module according to various aspects of the present disclosure. In this example, method 2350 includes retrieving a lesson module from a database (2355), receiving information regarding a student (2360), modifying the lesson module based on the student's information (2365), providing the lesson module to the student (2370), monitoring the student's progress in completing the lesson module (2375), and reporting the student's progress (2380).

Learning modules may be retrieved (2370) from any suitable database or other source such as, for example, the learning center server 12 depicted in FIGS. 1 and 2, described above. Learning modules may be directed to teaching any desired skill, technique, and concept. Learning modules may include a variety of different content, such as quizzes, puzzles, slide shows, video, audio, graphics, text, and any other desired content. The learning modules may be parameterized to deliver different forms of content, and may include various plug-ins.

Figure 24:
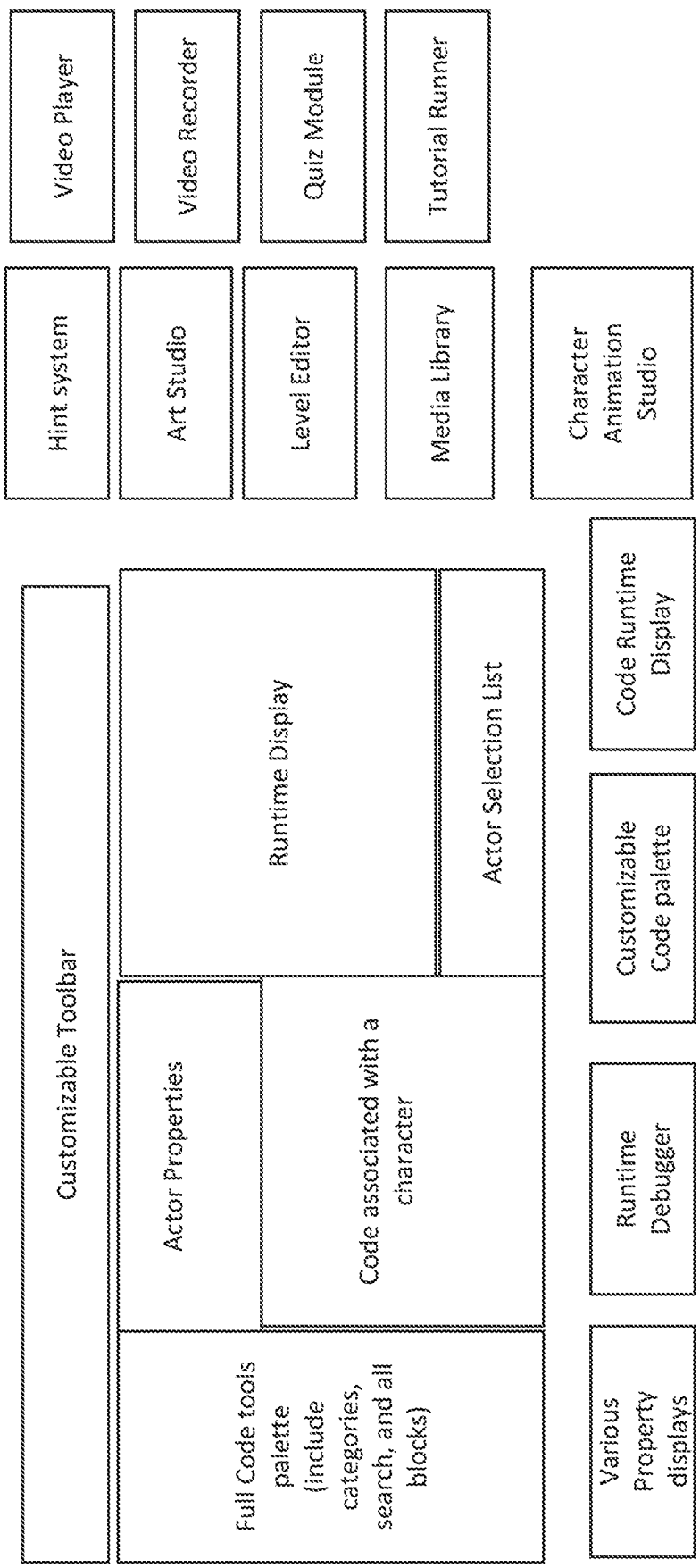
FIG. 24 is a block diagram depicting various configurable lesson modules and other components that may be provided to a student in accordance with various embodiments of the present disclosure.

FIG. 24 depicts an exemplary collection of learning modules and other plug-in components for display to a student. In this example, a scripting language may be used to customize the components and define which set of plug-ins to display to the student. In this manner, course developers and other users may use a scripting language, such as Extensible Markup Language ("XML"), Javascript Object Notation "JSON," and the like to build customized lessons for retrieval (2355) from a database, and a lesson plan generator of other software component may parse the XML and deliver the customized lesson module and associated components to the student (2370). Among other things, components configured using a scripting language allows embodiments of the present disclosure to dynamically configure lesson plans (at runtime) based on a student's current progress, the student's measured ability, and other criteria.

Figure 26A:
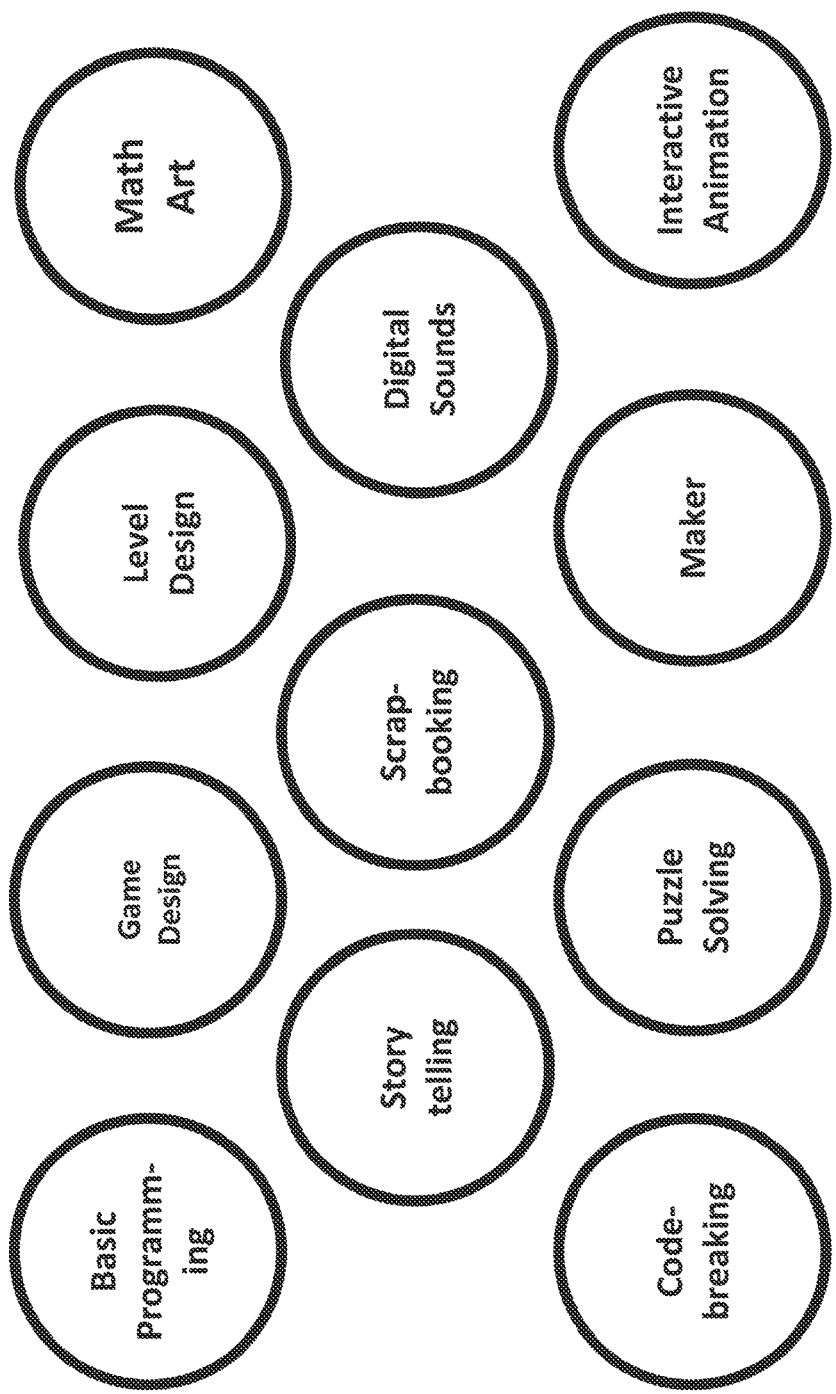
FIGS. 26A-26C illustrate exemplary aspects of providing learning modules to a student based on a goal identified for the student.
Figure 26B:
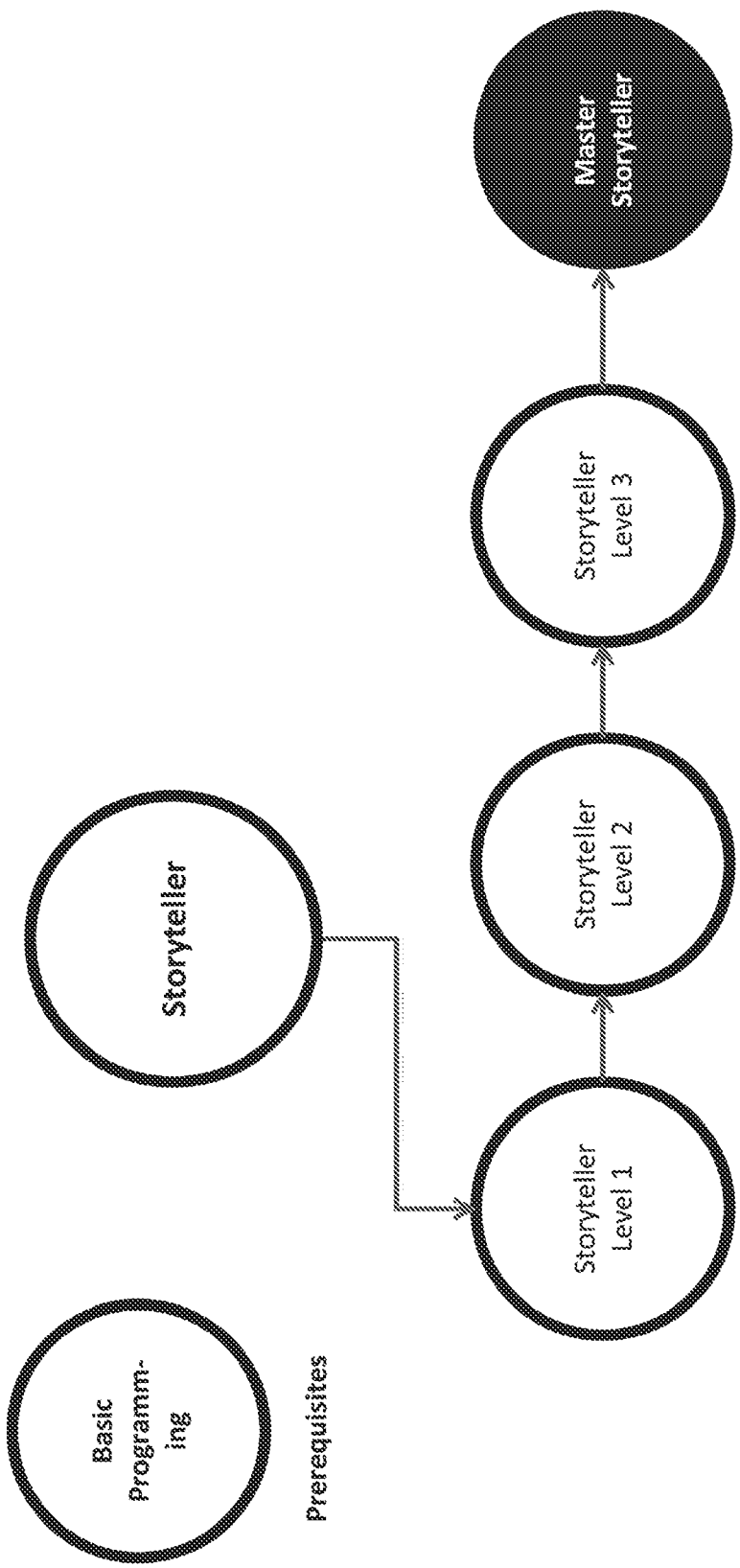
Figure 26C:
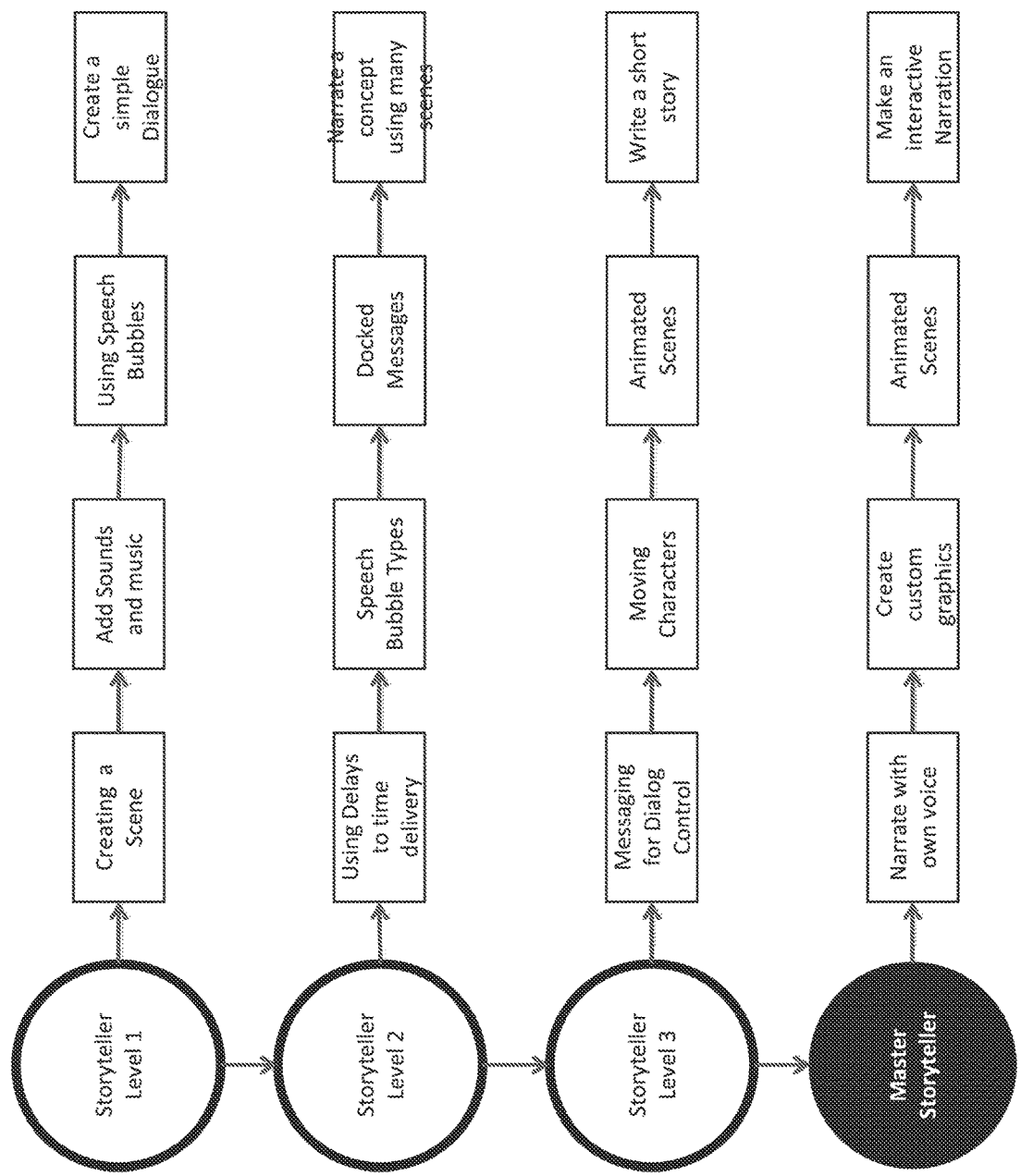

As described above, learning modules may be retrieved (2355) based on a goal identified for the student (2360). Goals may include any desired objective or set of objectives for a student, such as learning one or more programming concepts, or obtaining an award (such as a badge or certificate) for completing a particular lesson modules and/or completing a lesson module with at least a predetermined level of proficiency. FIGS. 26A-26C illustrate exemplary aspects of providing learning modules to a student based on a goal identified for the student. FIG. 26A illustrates an exemplary group of programming goals that the student may choose or have chosen for them by a teacher, parent, or other user.

Figure 26D:
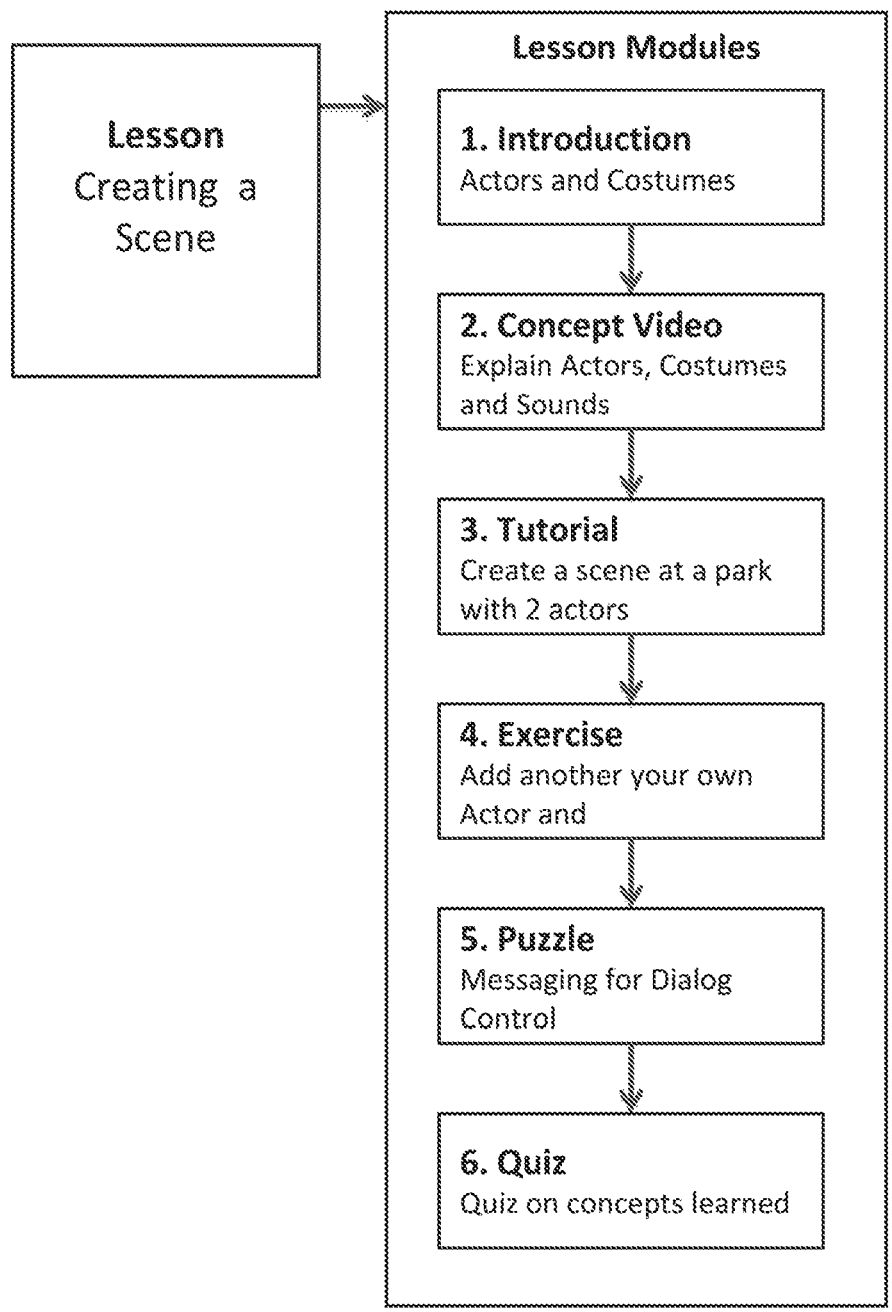
FIG. 26D illustrates an exemplary set of lesson modules provided to a student in conjunction with a lesson.

FIG. 26D illustrates an exemplary set of lesson modules provided to a student in conjunction with a lesson, "creating a scene" from the goal "Storyteller Level 1" in FIG. 26C. In this example, the lesson modules include presenting an introduction to the student (module 1), providing a video to introduce concepts of the lesson (module 2), providing a tutorial of the concepts (module 3), giving the student an exercise to perform that utilizes the concepts of the lesson (module 4), giving the student a puzzle to solve that uses the concepts of the lesson (module 5), and quizzing the student on the concepts in the lesson (module 6).

In some exemplary embodiments, learning modules may be retrieved (2355) based on a determination of dependencies between lesson modules. In some embodiments, a student may be prevented from accessing some or all of a second lesson module until the user has completed a second lesson module upon which the first lesson module depends. For example, a first lesson module may be retrieved, modified, and provided to a student that teaches one or more fundamental concepts upon which more advanced concepts are based. Upon successfully completing some or all of the first lesson module, a second lesson module directed to the advanced concepts may be presented to the student.

In FIG. 26B, for example, a goal of "Storyteller" is identified for a student, which is based on the fundamental concepts associated with the goal of "Basic Programming." Additionally, the "Storyteller" goal has four sub-goals (Storyteller Levels 1-3 and Master Storyteller). As shown in FIG. 26C, each sub-goal has a lesson plan comprising multiple lesson modules, and a student may be prevented from accessing a later lesson module (e.g., "Using Speech Bubbles" in Level 1) until the student has completed an earlier lesson module (e.g., "Creating a Scene" in Level 1). Likewise, a student may be prevented from accessing lesson modules in a later (e.g., Level 2) sub-goal until the student successfully completes the lesson modules from an earlier sub-goal (e.g., Level 1). Determinations of "successful" and "unsuccessful" completion of learning modules and goals may be made in any desired manner, including those described in more detail below.

Figure 27A:
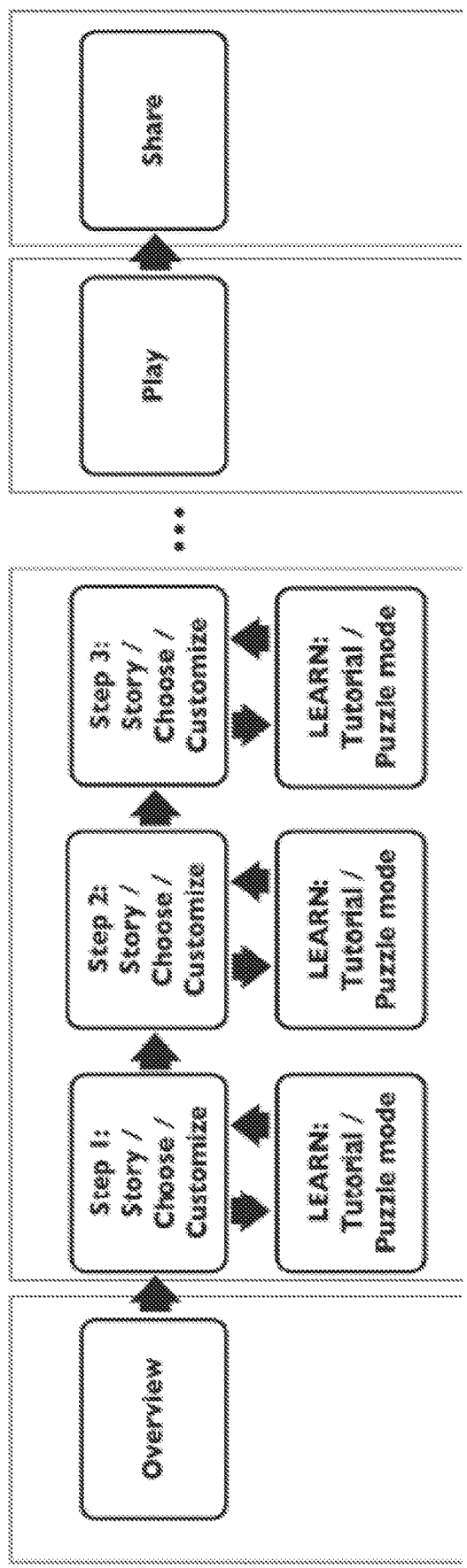
Figure 27B:
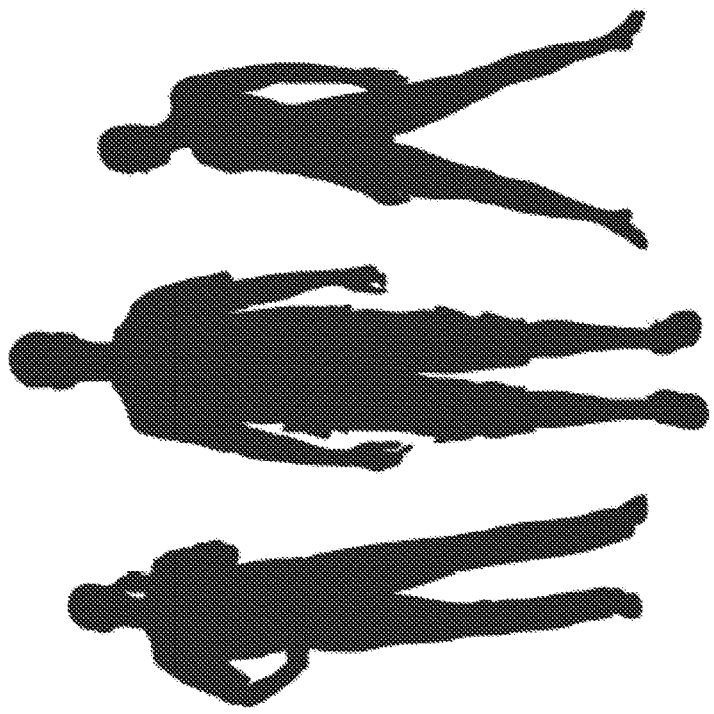
Figure 27C:
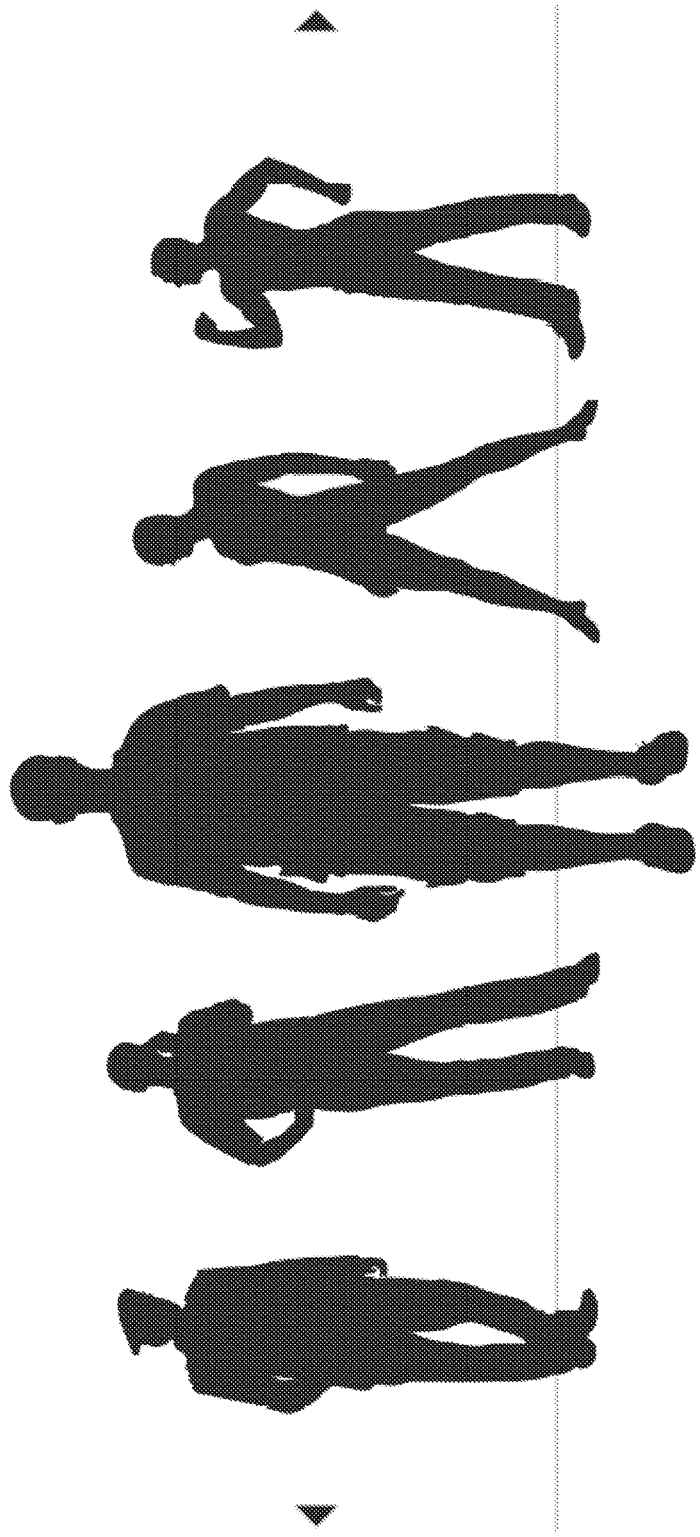
Figure 27D:
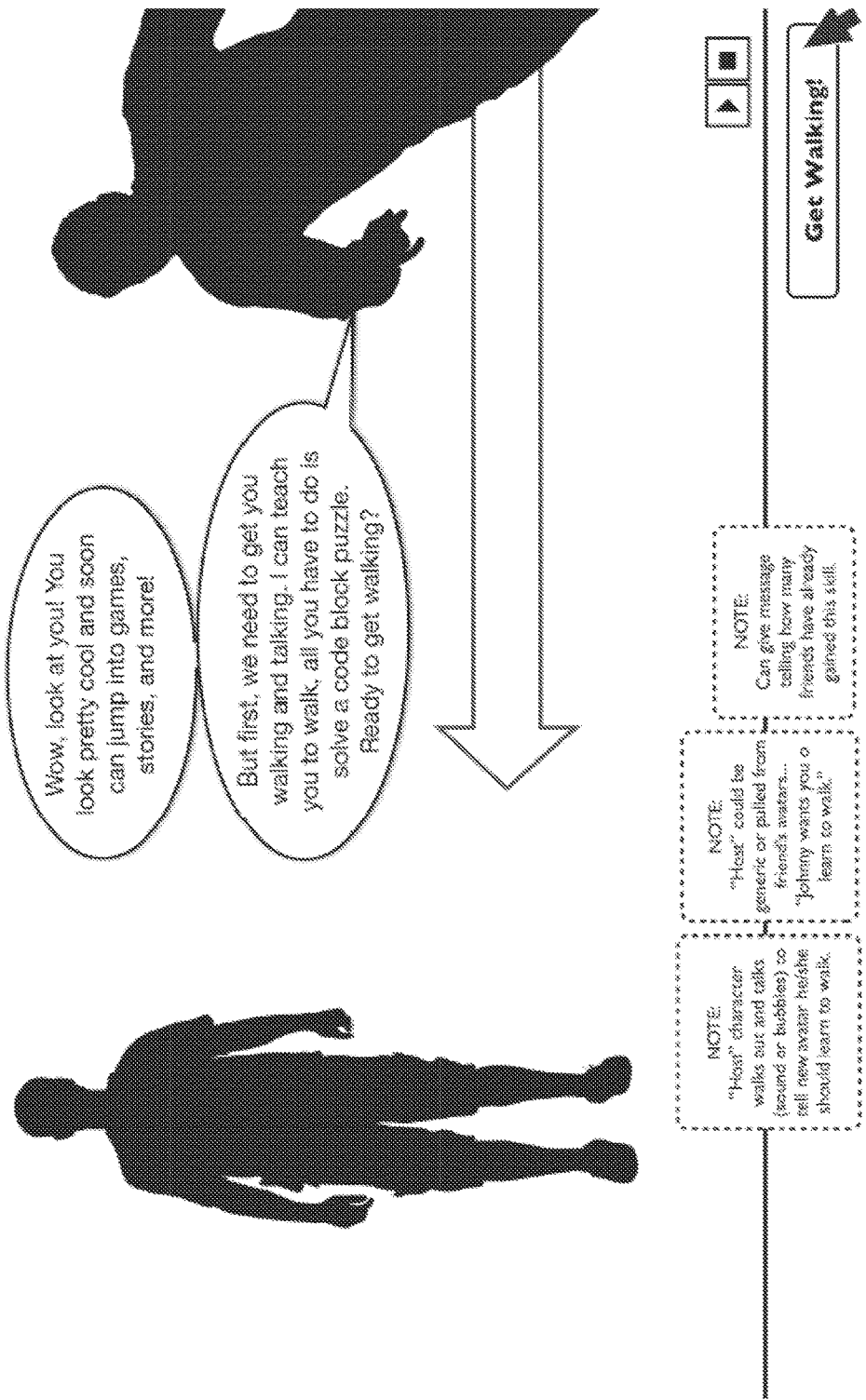

FIGS. 27A-27F illustrate another example of providing a customized lesson plan based on an identified goal for the student. FIG. 27A is a flow diagram showing an exemplary process for providing a customized lesson plan. In this example, a student is given a description of an activity that sets the context for the lesson and gives highlights of core actions to be taken (Overview). FIG. 27B is an exemplary screenshot of an Overview for creating a character (i.e., an "avatar") that the student controls by creating one or more software applications. Referring again to FIG. 27A, the student may be provided with one or more lessons. As depicted, the student is presented with three lessons that each provide the student with an opportunity to choose and customize aspects of the student's avatar (e.g., the avatar's "story"), as well as to access tutorials and puzzles to reinforce the learning of various programming concepts used in customizing the avatar. While three lessons are shown in FIG. 27A, embodiments of the present disclosure may provide more, or fewer, lessons to a student as appropriate. FIG. 27C depicts an exemplary screenshot presented as part of one of the "Choose/Customize" blocks in FIG. 27A, while FIG. 27D is an exemplary screenshot presented as part of one of the "Tutorial/Puzzle mode" blocks in FIG. 27A.

Figure 27E:
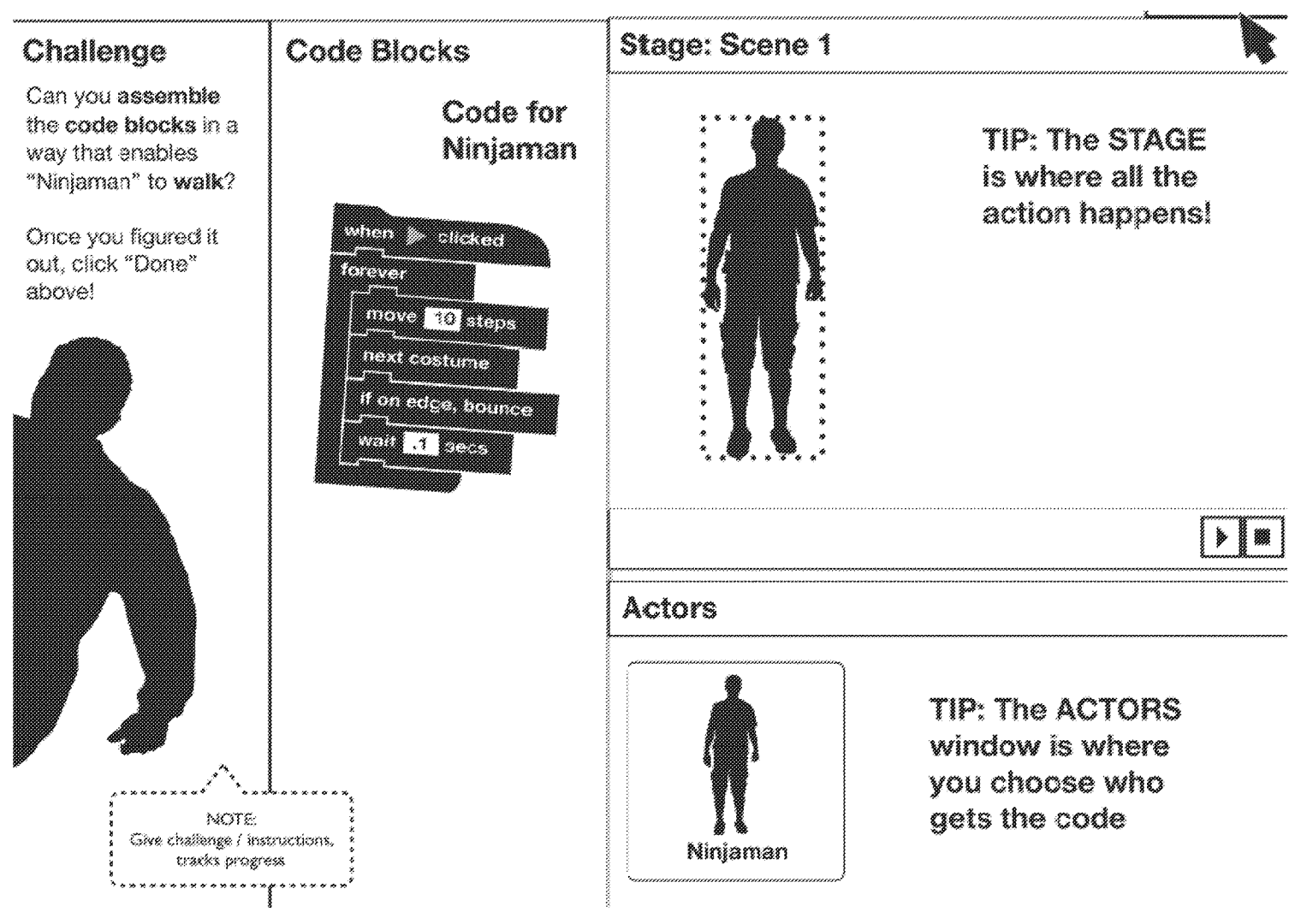
Figure 27F:
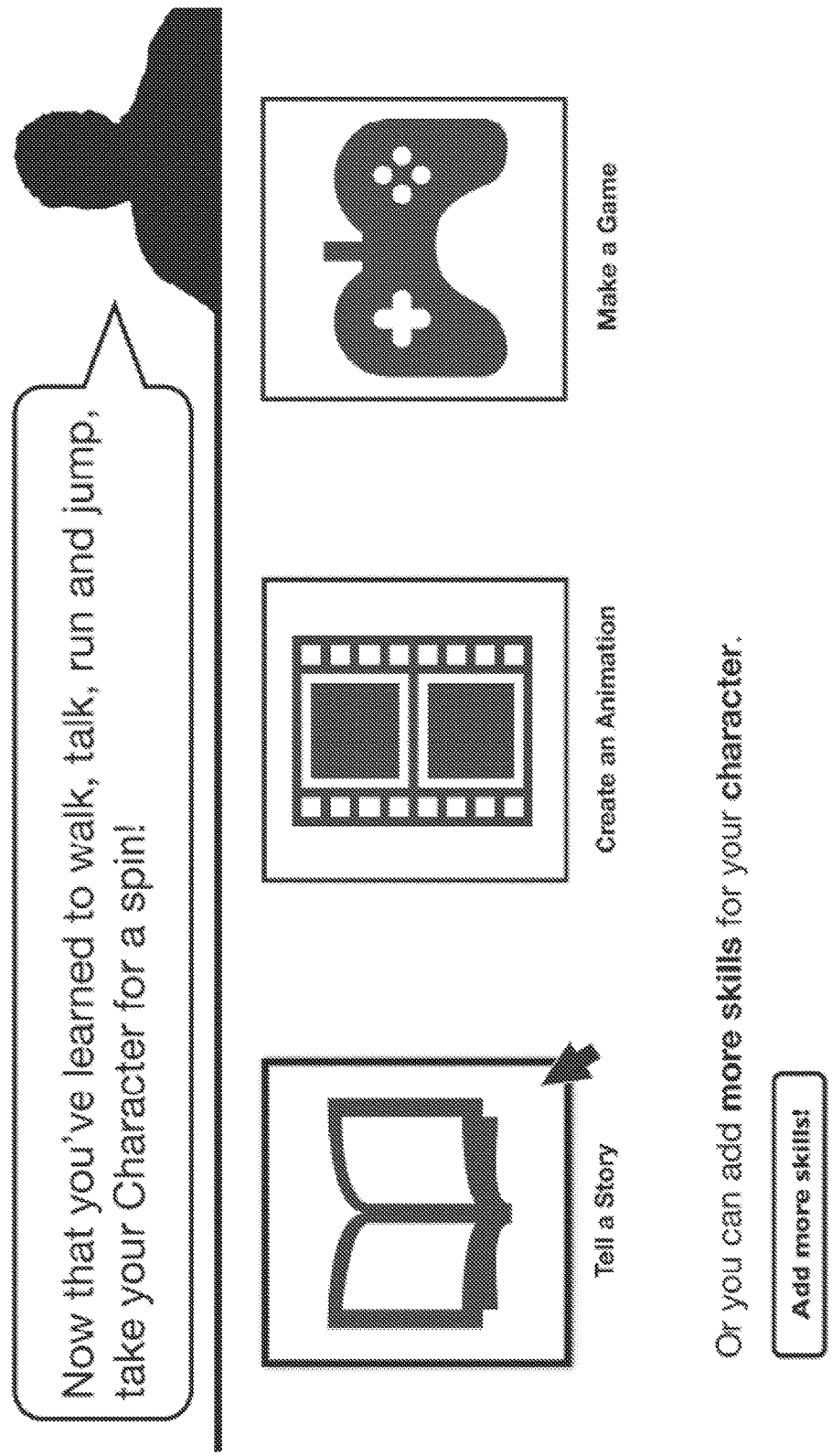

FIG. 27E illustrates a student being given puzzle (as part of the "Tutorial/Puzzle mode" block in FIG. 27A). In this example, the puzzle involves providing the student with an objective of programming a character ("Ninjaman") to walk (shown in the "Challenge" section), programming the character (shown in the "Code Blocks" section), and being given tips and tutorials (shown in the "Stage: Scene 1" and "Actors" sections). FIG. 27F depicts an exemplary screenshot allowing a student to select additional projects and goals for his or her avatar, such as using the avatar to "Tell a Story," "Create an Animation," or "Make a Game."

In various embodiments of the present disclosure, a student may be allowed to skip a first learning module to complete a second learning module dependent on the first learning module. If the student is successful in completing some or all of the second learning module, the first learning module may be marked as successfully completed. Additional learning modules (such as quizzes or tests) may be provided to the student upon successful completion of the second learning module before the first learning module is marked as successfully completed. Successful completion of a learning module. In this manner, advanced students can skip ahead to learn concepts that are more challenging, while still ensuring that the student has an acceptable level of knowledge of all concepts taught in a course of learning modules.

In exemplary method 2350, information regarding a student is received (2365) in order to tailor lesson modules to that student. Such information may be obtained from any desired source, such as from the student or an individual supervising the student, such as a teacher or parent. Information regarding a student may also be retrieved from a database, determined based on a student's past assignments, tests, and/or history in completing other learning modules. In some embodiments, for example, information regarding a student may include the student's age, grade level, and information on the student's performance with regards to other learning modules. The student's performance may be provided in view of one or more other students, such as students having the same (or similar) age, grade level, or demographics as the student. Information on a student's performance may be received in real-time or near-real-time as a student progresses through a group of lesson modules, thereby allowing embodiments of the present disclosure to continuously adapt the content and/or difficulty of the lesson modules (likewise in real-time or near-real-time) based on the student's current ability and/or progress.

Information regarding a student may include information regarding a student's interests. A student's personal interests may be age-related, gender-related, and/or based on any other desired criteria. Such information may be used to personalize lesson modules based on each student's interests, thereby presenting information to students in a manner that is entertaining and interesting to each individual student. For example, the personal interests for a second-grade boy may include "dinosaurs," while the personal interests for a second-grade girl may include "unicorns." A lesson module to teach a concept (such as animation) may thus be customized to involve the animation of dinosaurs for the boy, and the animation of unicorns for the girl.

A lesson module may be modified (2365) based on a student's information to customize the learning module to that student. The lesson module can be modified in any desired manner according to any desired criteria. For example, a student's performance history in completing previous lesson modules can be analyzed to identify a concept, skill, or technique that the student is adept in, and modify a lesson module to remove content that the student has already demonstrated mastery of. Likewise, a student's performance history may be analyzed to identify a concept, skill, or technique for which that the student has demonstrated a lack of proficiency or understanding. Supplemental content may then be added to a learning module to help the student achieve a better level of proficiency or understanding in the concept, skill, or technique.

A lesson module may be modified by adding a parameter to the lesson module, removing a parameter from the lesson module, and/or modifying a parameter in the lesson module. Likewise, a lesson module may be modified by adding a plug-in to the lesson module, removing a plug-in from the lesson module, and/or modifying a plug-in in the lesson module.

Lesson modules may also be modified and delivered to students in conjunction with any desired mode or format. FIGS. 25A-25G, for example, are block diagrams illustrating exemplary modes that may be utilized in different circumstances to deliver various lesson modules.

Figure 25A:
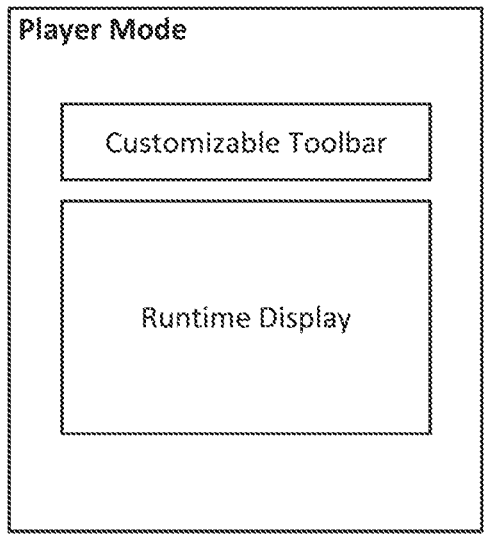
FIGS. 25A-25G depict different exemplary presentation modes for providing lessons to a student.
Figure 25B:
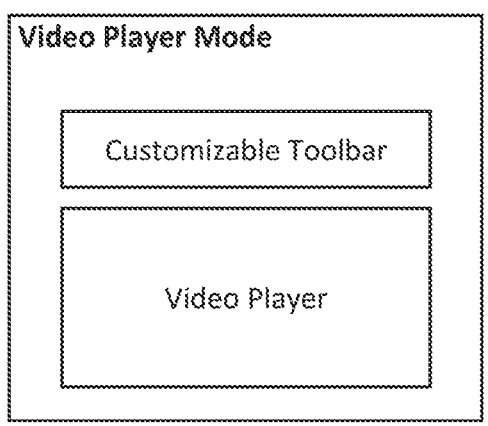

FIG. 25A depicts an exemplary "player mode" format that can be used to, for example: present an introduction to concepts being taught in a lesson, run a software application to demonstrate a fully working project that the student can examine to see how it works, and to provide a summary of material taught in a lesson. FIG. 25B depicts a "video player mode" that can be used for, among other things, showing an instructional video during a lesson.

Figure 25C:
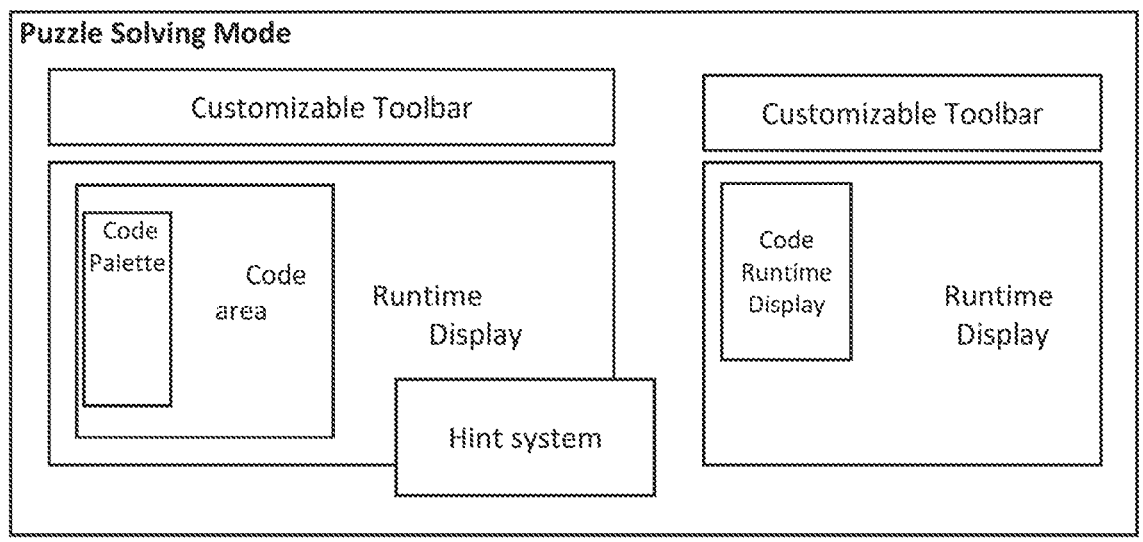

FIG. 25C illustrates a "puzzle-solving mode" where various puzzles (such as programming puzzles) can be delivered to the student. In this example, two sub-modes are depicted, a "puzzle solver" mode (on the left) and a "puzzle runner" mode (on the right). In the "puzzle solver" mode, users may select code blocks from the code palette into the code area and arrange them to create a software application, such as an application that programs a character to solve a problem presented. In the "puzzle runner" mode, the code of the application created by the student executes and, if the user correctly implemented the application, the puzzle is solved. For instructional purposes, the code runtime display may show a step-by-step execution of the specific visual coding block that is being executed by the runtime. One example of a puzzle a student may be asked to program a solution to might be: "program your spaceman character to avoid the aliens in his path and get the power cell" (see FIG. 25H).

Figure 25D:
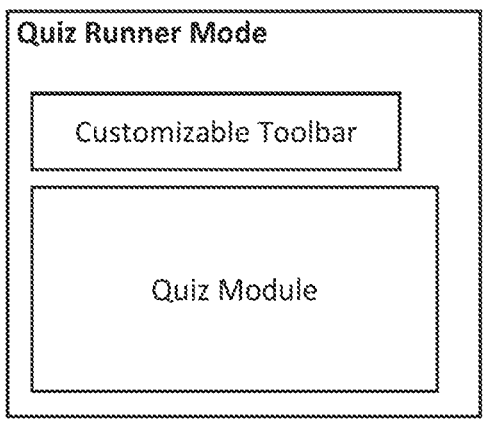
Figure 25E:
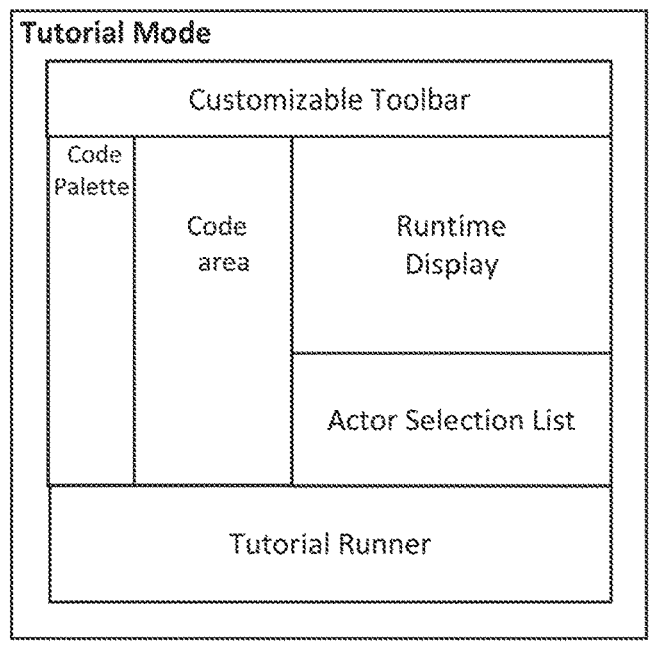
Figure 25F:
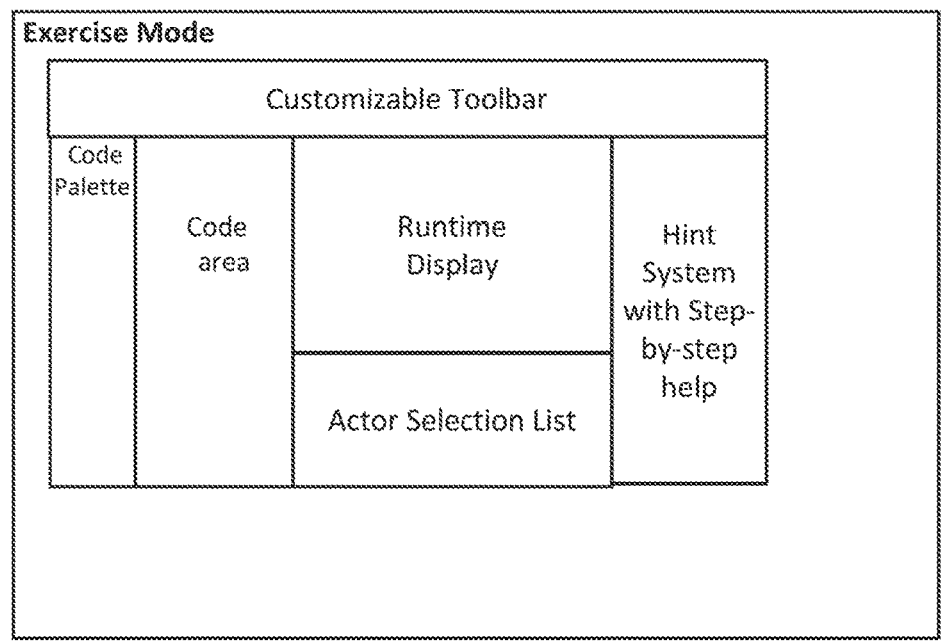

FIG. 25D depicts a "quiz runner mode" that can be used to deliver a set of quiz questions in a quiz learning module. FIG. 25E illustrates a "tutorial mode" that can be used to deliver a tutorial to a student, such as showing a student how to create a software application step-by-step from the beginning. FIG. 25F depicts an "exercise mode" whereby students can be presented with hints during a learning exercise (such as writing a software application).

Figure 25G:
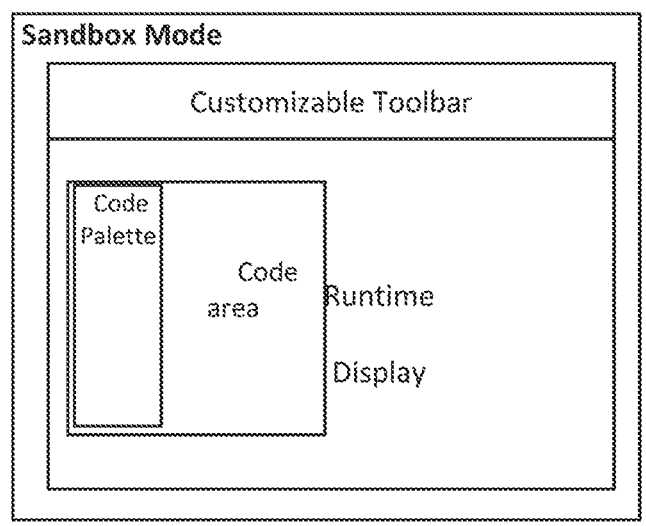

FIG. 25G illustrates a "sandbox mode" that comprises a plurality of visual code blocks related to a computer programming concept that the student can manipulate. Among other things, the sandbox mode can be used gradually introduce students to sets of code blocks without overwhelming them with all code blocks being available all at once. Lessons and lesson modules may be presented using any other desired format and/or mode of presentation.

Figure 25H:
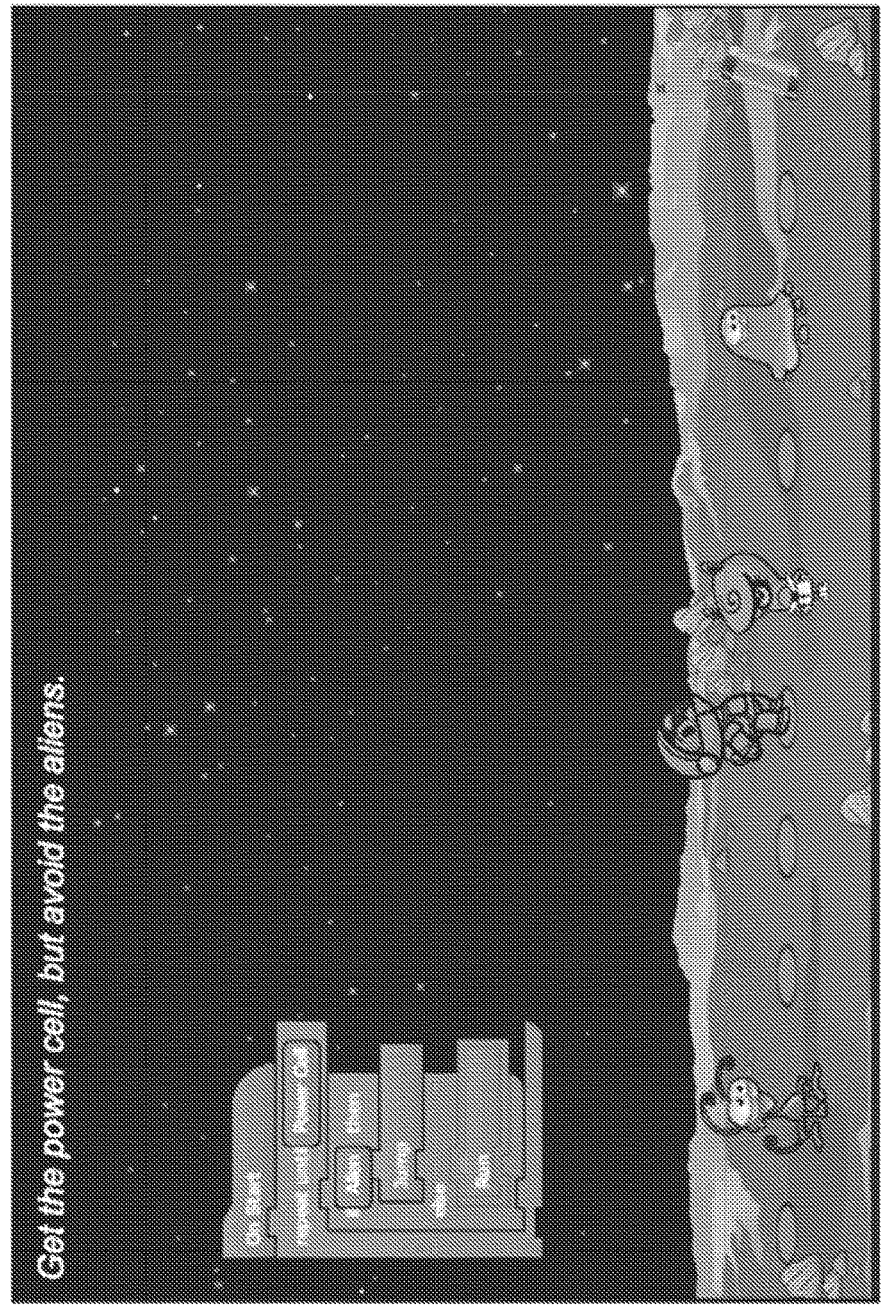
FIGS. 25H-25L are exemplary screens that may be presented in conjunction with the modes shown in FIGS. 25A-25G.
Figure 25I:
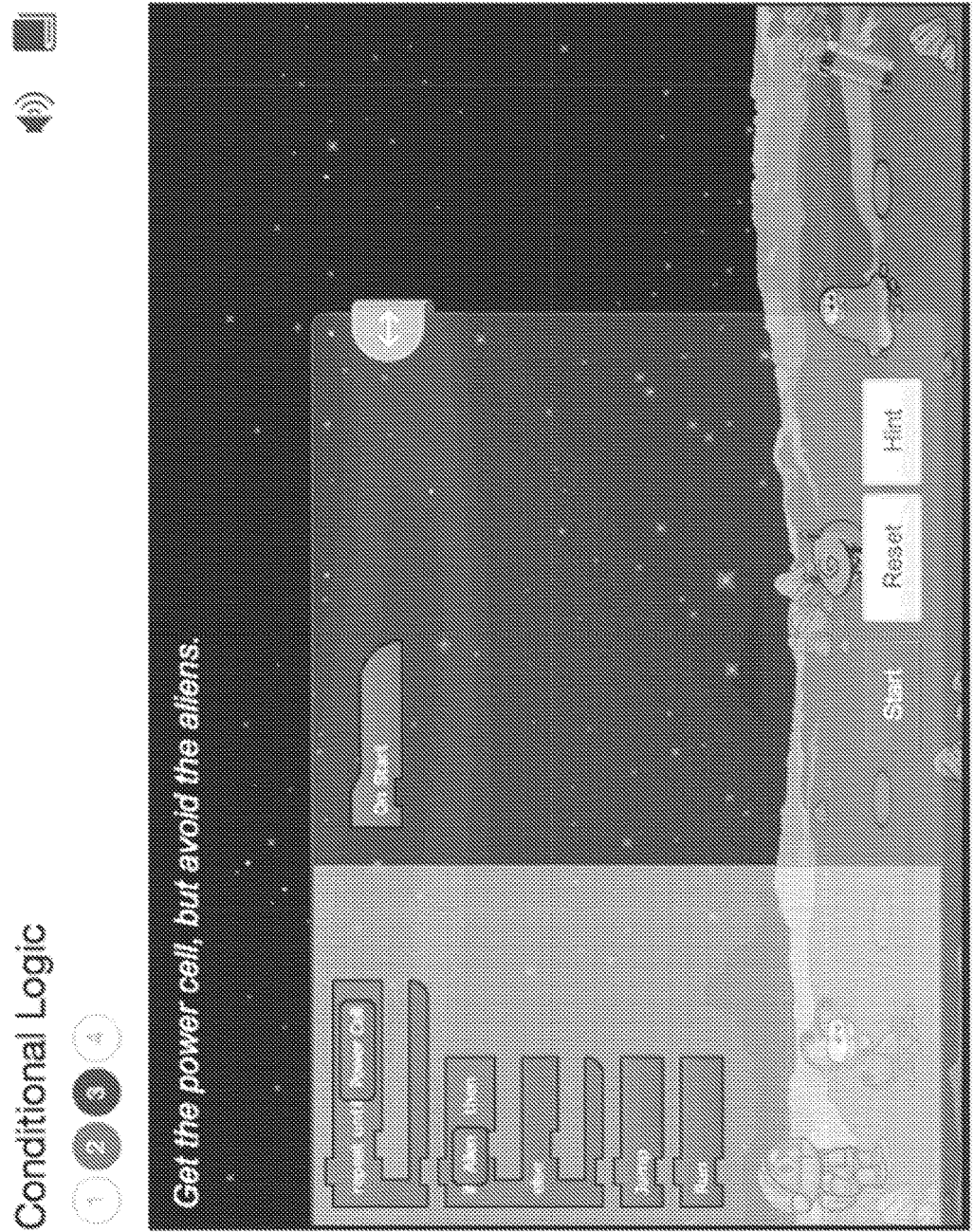
Figure 25J:
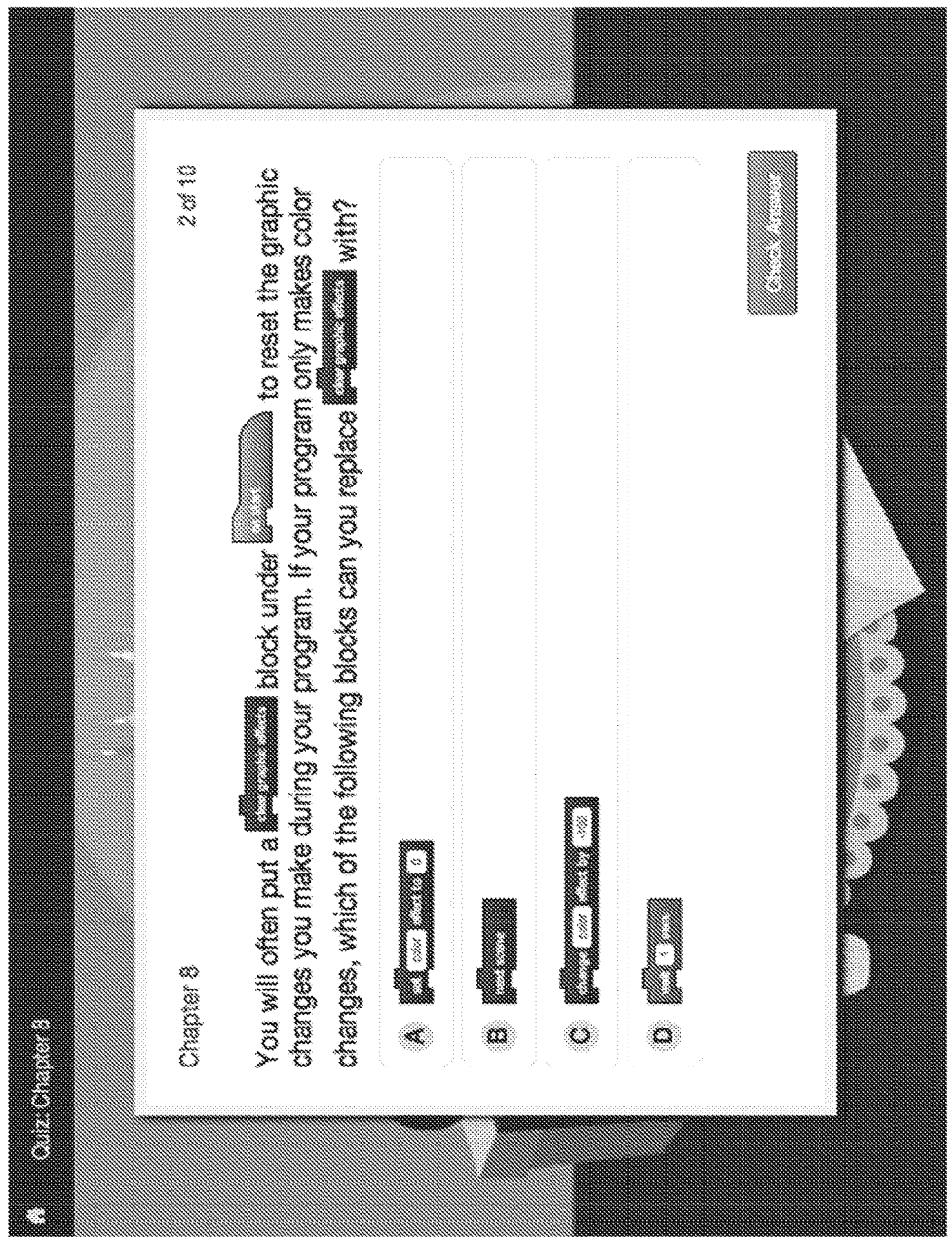
Figure 25K:
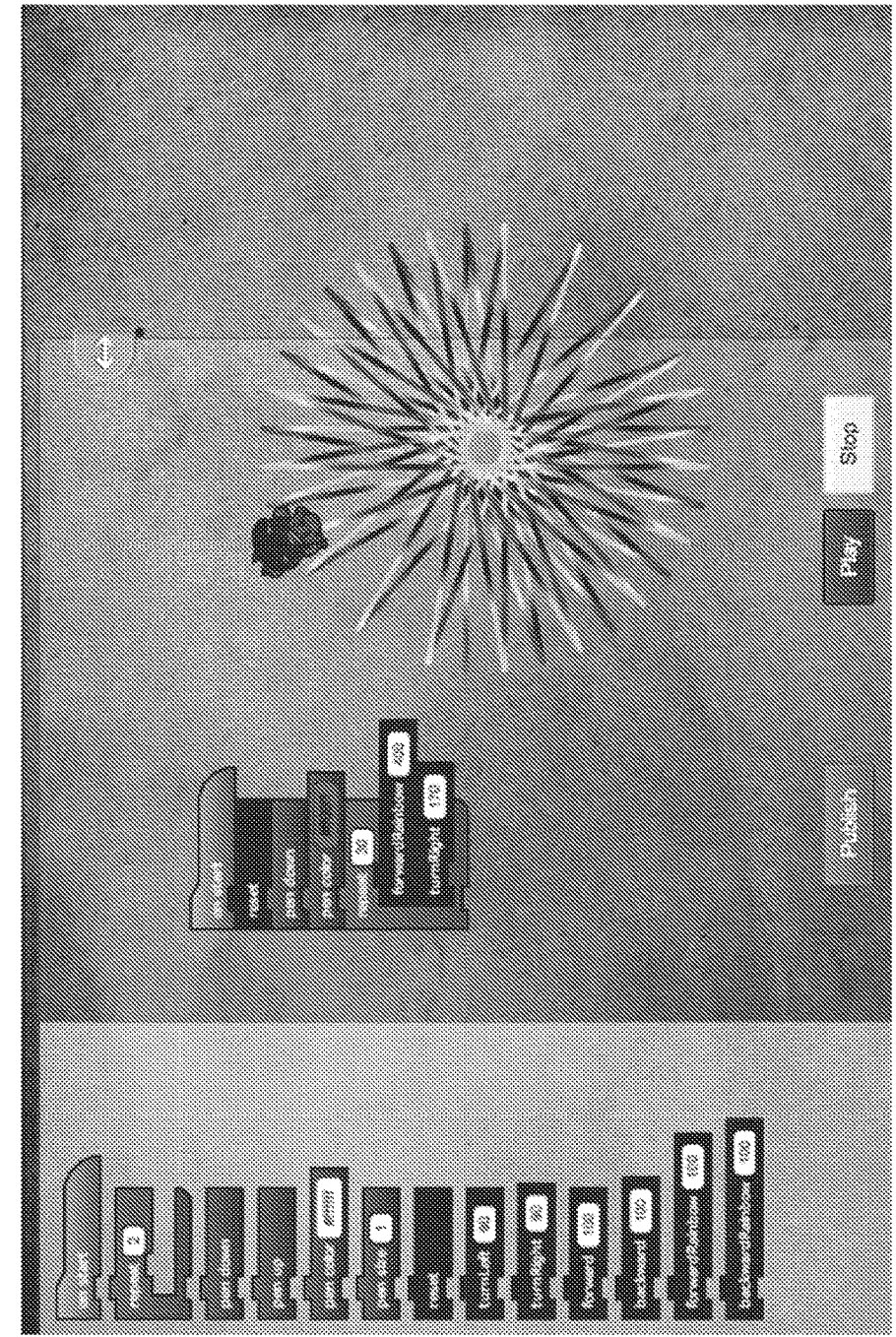
Figure 25L:
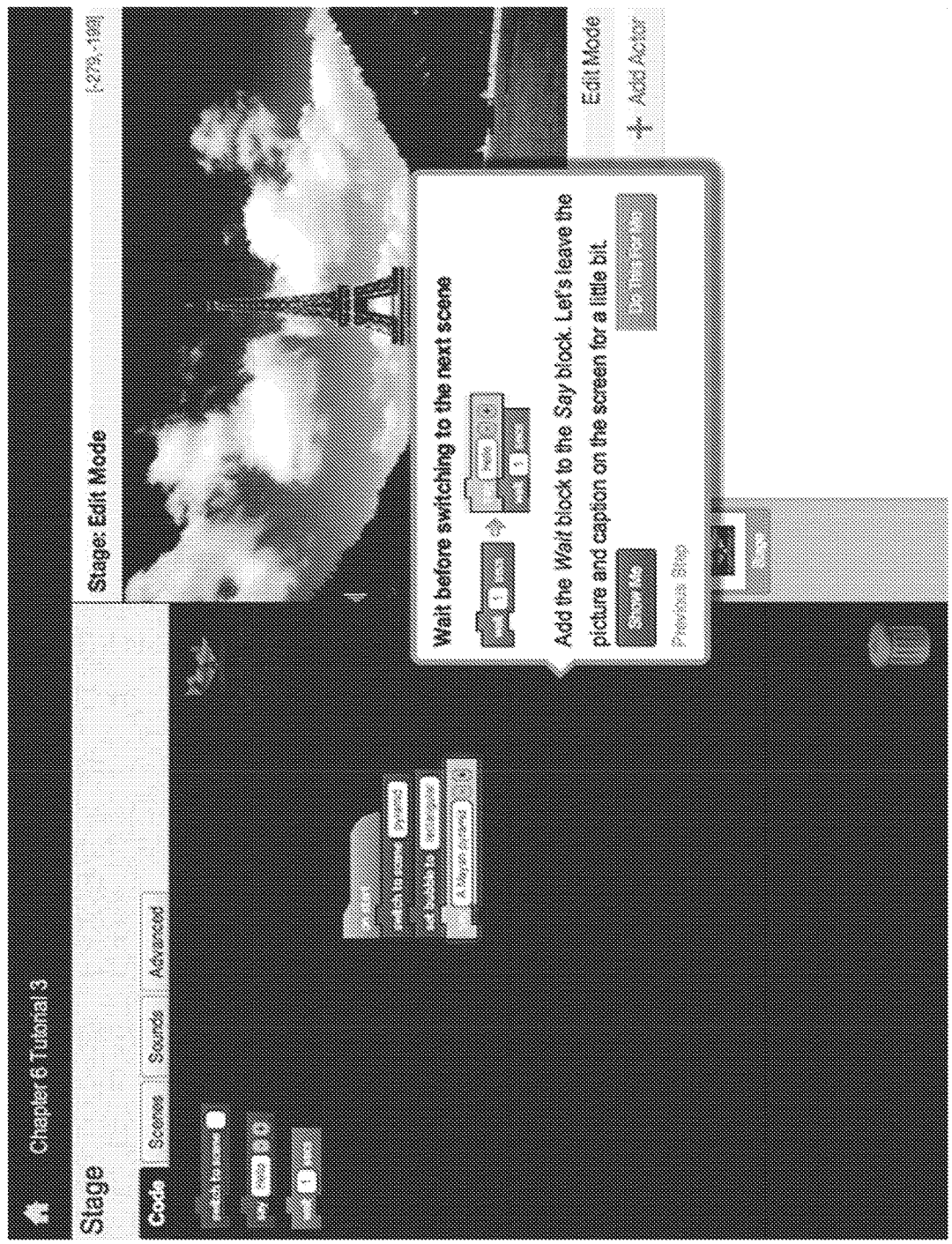

FIGS. 25H-25L illustrate exemplary screenshots that may be used in conjunction with the different modes described in FIGS. 25A-25G. FIG. 25H, for example, depicts an introductory screen that may be presented as part of the "puzzle runner" mode from FIG. 25C, while FIG. 25I depicts a screen that may be presented as part of the "puzzle solver" mode shown in FIG. 25C. FIG. 25J depicts an exemplary quiz module that may be shown in conjunction with the "quiz runner mode" from FIG. 25D. FIG. 25K depicts a screen that may be presented in conjunction with the "sandbox mode" from FIG. 25G. FIG. 25L depicts a screen that may be presented in conjunction with the "tutorial mode" from FIG. 25E.

A lesson module may be modified by generating an activity for the student to perform in accordance with the lesson module. For example, where a lesson module relates to teaching a computer programming concept, such as animation, the lesson module may be modified to generate a coding puzzle, a debugging puzzle, and/or a quiz that helps teach (and/or tests the student's knowledge of) the concept of animation.

In exemplary method 2350, the lesson module is provided to a student (2370) and the student's progress in completing the lesson module is monitored (2375). The student's progress may be monitored in any desired manner, including determining how much of a lesson module the student has completed, grading the student's performance on one or more portions of the lesson module, comparing the student's progress and/or aptitude in completing the lesson module to that of other students, and others.

In some exemplary embodiments, monitoring the student's progress includes determining whether the student is successful in completing a lesson module. Determining whether a student is successful in completing a lesson module may be based on any desired criteria, and such criteria may vary from student to student. For example, a student may be determined to be successful in completing a lesson module where: the student completes at least a portion of the lesson module within a predetermined period of time, the student answers at least a predetermined number of questions in the lesson plan correctly, and/or the student performs the lesson module at least as well as one or more other students. Determining whether a student is successful in completing a lesson module may be based on any other desired criteria, such as whether they complete all the exercises in a module, whether the student availed himself/herself of hints to complete a lesson module, and/or whether they applied concepts learned in other projects or lessons. In one exemplary embodiment, for a lesson module that included one or more puzzles, a student's success or failure in completing the puzzle(s) may be evaluated based on whether the student solved some or all of the puzzles optimally or sub-optimally (e.g., the solution was correct, but the number of lines of code was more than the minimum blocks required to solve the problem).

Based on how each student fares in the lesson (e.g., based on the above criteria), a personalized lesson plan may be created with suitable lessons provided to the student until the student achieves his/her goal. In response to determining that the student is successful in completing a lesson plan the student may be provided with a second lesson module that includes one or more concepts that are dependent on one or more concepts in the completed lesson module.

A student need not be entirely successful in completing a lesson module to advance to a subsequent lesson module, or for the completed lesson module to be considered "successfully" completed. For example, where a student is determined to be partially successful in completing a lesson module, the student may still be provided with a second lesson module that includes concepts dependent on concepts in the completed lesson module. As with measures of "success," measures of "partial success" may be determined according to any desired criteria, and may vary from student to student. In one exemplary embodiment, a lesson module may contain multiple concepts. A student may successfully complete (or demonstrate sufficient understanding of) all but one concept in the lesson module. In such cases, the student's performance may be considered good enough to proceed to more advanced lesson modules. Alternatively, embodiments of the present disclosure may identify the concept(s) the student failed to demonstrate sufficient understanding of, and provide the student with a supplemental lesson module that reinforces the concept(s) the student failed to demonstrate an understanding of. In this manner, embodiments of the present disclosure can dynamically provide additional support and instruction for students in areas they need the most help in understanding.

A student may be determined to be unsuccessful in completing a lesson module based on any desired criteria, such as by completing at least a portion of the lesson module beyond a predetermined period of time, answering at least a predetermined number of questions in the lesson plan incorrectly, and/or underperforming the lesson module compared to one or more other students. For example, for a lesson module directed to teaching a computer programming using visual code blocks, a student who uses more code blocks to complete an exercise than other students in his or her class may be deemed to have failed to successfully complete the lesson module based on the relative inefficiency of the student's solution, even when the student's solution works. In this manner, a student's performance may be graded on more than a simple pass/fail on whether the student provides a working solution to a problem, thereby helping to teach the student concepts such as programming efficiency.

In cases where the student is determined to be unsuccessful, the student may be required to repeat the failed lesson module, given another lesson module based on the student's personal interests, or given a second lesson module that reinforces all of the concepts taught in the failed lesson module, thereby giving the student a different perspective on the same concepts. In one exemplary embodiment, a student may be given a second lesson module that is personalized (as described above) based on the student's personal interests. In this manner, lesson modules may be customized for each student to help hold the student's attention and to teach subject matter using themes the student finds interesting. In another exemplary embodiment, a student may be provided with a lesson module that was previously completed by one or more other students. The one or more students may be similar to the unsuccessful student in one more ways, such as having the same or similar demographics, being in the same grade, or exhibiting the same or similar performance in completing lesson modules.

Embodiments of the present disclosure may report (2380) students' progress to a teacher, parent, or other user supervising a student. The student's progress may be monitored and reported at any point while the student works to complete the lesson module. For example, a teacher, parent, or other user supervising the student may view a student's progress in completing a lesson module in real-time. In one example, a group of students may be running software on a group of networked computers implementing embodiments of the present disclosure and are given a project to complete that includes writing a computer program using visual code blocks. As the students work on the project, a teacher may view each student's progress (including identifying which and how many code blocks each student is using) in real-time via the teacher's computer system networked to the computer systems of the students. In this manner, the teacher can quickly, efficiently, and immediately identify those students that are struggling with the task, identify those students for whom the task is "too easy," and/or identify concepts that the group of students as a whole may benefit from further instruction.

Various embodiments of the present disclosure may be implemented in computer hardware, firmware, software, and/or combinations thereof. Methods of the present disclosure can be implemented via a computer program instructions stored on one or more non-transitory computer-readable storage devices for execution by a processor. Likewise, various processes (or portions thereof) of the present disclosure can be performed by a processor executing computer program instructions. Embodiments of the present disclosure may be implemented via one or more computer programs that are executable on a computer system including at least one processor coupled to receive data and instructions from, and to transmit data and instructions to, a data storage system, at least one input device, and at least one output device. Each computer program can be implemented in any suitable manner, including via a high-level procedural or object-oriented programming language and/or via assembly or machine language. Systems of the present disclosure may include, by way of example, both general and special purpose microprocessors which may retrieve instructions and data to and from various types of volatile and/or non-volatile memory. Computer systems operating in conjunction with the embodiments of the present disclosure may include one or more mass storage devices for storing data files, which may include: magnetic disks, such as internal hard disks and removable disks; magneto-optical disks; and optical disks. Storage devices suitable for tangibly embodying computer program instructions and data (also called the "non-transitory computer-readable storage media") include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

Changes and modifications may be made to the disclosed embodiments without departing from the scope of the present disclosure. These and other changes or modifications are intended to be included within the scope of the present disclosure, as expressed in the following claims.

What is claimed is:

1. A method, comprising:
modifying a lesson module, by a computer system,
wherein modifying the lesson module comprises generating an activity, and
wherein the activity comprises a coding puzzle and a puzzle runner mode; and
in the puzzle runner mode, displaying an indication that the coding puzzle is solved after the coding puzzle is solved and displaying a code runtime area showing a step-by-step execution of manipulated code of the lesson module.

2. The method of claim 1, wherein the manipulated code comprises visual code blocks.

3. The method of claim 1, wherein the manipulated code comprises source code.

4. The method of claim 1, wherein the activity comprises a debugging puzzle.

5. The method of claim 1, wherein the activity comprises a quiz.

6. The method of claim 1, wherein modifying the lesson module comprises adding a parameter to the lesson module.

7. The method of claim 1, wherein modifying the lesson module comprises removing a parameter from the lesson module.

8. The method of claim 1, wherein modifying the lesson module comprises modifying a parameter in the lesson module.

9. The method of claim 1, comprising monitoring, by the computer system, progress by a user in using the lesson module,
wherein the monitoring of the progress of the user comprises determining the user is successful in using the lesson module and providing the user with a second lesson module, and
wherein a concept taught in the second lesson module is relates to a concept taught in the lesson module.

10. The method of claim 9, wherein determining that the user is successful in using the lesson module is based on one or more of: the user using at least a portion of the lesson module within a predetermined period of time, and the user answering at least a predetermined number of questions in a lesson plan of the lesson module correctly.

11. The method of claim 9, wherein the monitoring of the progress of the user comprises determining the user is unsuccessful in using the lesson module.

12. The method of claim 11, wherein determining that the user is unsuccessful in using the lesson module is based on one or more of: the user using at least a portion of the lesson module beyond a predetermined period of time, and the user answering at least a predetermined number of questions in a lesson plan of the lesson module incorrectly.

13. The method of claim 11, wherein the lesson module is provided to the user to repeat in response to the determination that the user is unsuccessful in using the lesson module.

14. The method of claim 11, wherein in response to the determination that the user is unsuccessful in using the lesson module, the user is provided with an additional lesson module to use that is customized based on a personal interest of the user identified in corresponding user information.

15. The method of claim 11, wherein in response to the determination that the user is unsuccessful in using the lesson module, the user is provided with an additional lesson module used by one or more other users.

16. The method of claim 11, wherein a second module is provided to the user in response to the determination that the user is unsuccessful in using the lesson module, wherein the second module reinforces at least some concepts taught in the lesson module.

17. The method of claim 9, wherein the monitoring of the progress of the user comprises identifying a number of visual code blocks used by the user in using a portion of the lesson module.

18. The method of claim 9, comprising reporting the progress of the user to a second supervising the user.

19. A system comprising: at least one processor; and memory in communication with the at least one processor and storing instructions that are executable by the at least one processor to cause the at least one processor to:
modifying a lesson module,
wherein modifying the lesson module comprises generating an activity, and
wherein the activity comprises a coding puzzle and a puzzle runner mode; and
in the puzzle runner mode, display an indication that the coding puzzle is solved after the coding puzzle is solved and displaying a code runtime area showing a step-by-step execution of manipulated code of the lesson module.

20. A non-transitory computer-readable medium storing instructions that when executed cause a computing device to:
modifying a lesson module,
wherein modifying the lesson module comprises generating an activity, and
wherein the activity comprises a coding puzzle and a puzzle runner mode; and
in the puzzle runner mode, display an indication that the coding puzzle is solved after the coding puzzle is solved and displaying a code runtime area showing a step-by-step execution of manipulated code of the lesson module.

* * * * *